(12) United States Patent
Kaplan et al.

(10) Patent No.: US 12,526,646 B2
(45) Date of Patent: Jan. 13, 2026

(54) Wi-Fi NETWORKS WITH MULTIPLE PARTY CONTROL AND MANAGEMENT

(71) Applicant: Plume Design, Inc., Palo Alto, CA (US)

(72) Inventors: Seth Kaplan, Santa Barbara, CA (US); Paul White, Burlingame, CA (US); Robert Miller, Menlo Park, CA (US); Primoz Verdnik, Ljubljana (SI); Mark Prichard, Menlo Park, CA (US); Rod Woodman, Sunnyvale, CA (US); Rik Williams, Reading (GB)

(73) Assignee: PLUME DESIGN, INC., Palo Alto, CA (US)

( * ) Notice: Subject to any disclaimer, the term of this patent is extended or adjusted under 35 U.S.C. 154(b) by 393 days.

(21) Appl. No.: 17/952,624

(22) Filed: Sep. 26, 2022

(65) Prior Publication Data

US 2023/0025898 A1    Jan. 26, 2023

Related U.S. Application Data

(63) Continuation-in-part of application No. 17/101,301, filed on Nov. 23, 2020, now Pat. No. 11,496,902.
(Continued)

(51) Int. Cl.
| | | |
|---|---|---|
| *H04W 16/18* | (2009.01) | |
| *H04W 84/18* | (2009.01) | |
| *H04W 88/08* | (2009.01) | |

(52) U.S. Cl.
CPC ............ *H04W 16/18* (2013.01); *H04W 84/18* (2013.01); *H04W 88/08* (2013.01)

(58) Field of Classification Search
CPC ...... H04W 16/18; H04W 84/18; H04W 88/08
(Continued)

(56) References Cited

U.S. PATENT DOCUMENTS

| | | |
|---|---|---|
| 7,574,202 B1 | 8/2009 | Tsao et al. |
| 8,122,251 B2 | 2/2012 | Santos et al. |
(Continued)

FOREIGN PATENT DOCUMENTS

| | | |
|---|---|---|
| CN | 103618617 A | 3/2014 |
| CN | 106452917 A | 2/2017 |
(Continued)

OTHER PUBLICATIONS

Feb. 15, 2019, International Search Report for International Application No. PCT/US2018/051348.
(Continued)

*Primary Examiner* — Dant B Shaifer Harriman
(74) *Attorney, Agent, or Firm* — Nicholas Martin; Greenberg Traurig, LLP

(57) ABSTRACT

Systems and methods of managing a plurality of Wi-Fi networks via a cloud service include communicating to a plurality of access points in the plurality of Wi-Fi networks, wherein the plurality of access points are deployed in a location that includes any of a multi-dwelling unit (MDU), office space, retail space, mixed-use space, and common areas; providing end user management access to a plurality of end users each associated with one of the plurality of Wi-Fi networks; providing property manager management access to a property manager associated with the location and with any additional locations; and providing service provider management access to a service provider associated with the location.

20 Claims, 42 Drawing Sheets

Related U.S. Application Data which is a continuation-in-part of application No. 15/825,242, filed on Nov. 29, 2017, now Pat. No. 11,689,925.

(60) Provisional application No. 62/565,418, filed on Sep. 29, 2017.

(58) Field of Classification Search
USPC .......................................................... 726/4
See application file for complete search history.

(56) References Cited

U.S. PATENT DOCUMENTS

| | | | |
|---|---|---|---|
| 8,180,328 B2* | 5/2012 | Van De Groenendaal | ................... H04W 12/37 455/406 |
| 8,467,355 B2* | 6/2013 | Herscovici | .......... H04W 12/088 370/360 |
| 8,855,065 B2 | 10/2014 | Welch et al. | |
| 10,834,523 B1 | 11/2020 | Rao | |
| 11,451,978 B2* | 9/2022 | Maria | ................... H04W 76/12 |
| 2002/0022483 A1* | 2/2002 | Thompson | .............. H04L 61/35 455/433 |
| 2002/0062252 A1 | 5/2002 | Van Zoest et al. | |
| 2002/0138843 A1 | 9/2002 | Samaan et al. | |
| 2005/0260973 A1* | 11/2005 | van de Groenendaal | ................... H04M 1/67 455/411 |
| 2007/0286195 A1 | 12/2007 | Ilnickl et al. | |
| 2007/0288319 A1 | 12/2007 | Robinson et al. | |
| 2008/0159302 A1 | 7/2008 | Tu et al. | |
| 2011/0030037 A1 | 2/2011 | Olshansky et al. | |
| 2012/0122424 A1* | 5/2012 | Herscovici | ............ H04L 63/162 455/411 |
| 2012/0167185 A1 | 6/2012 | Menezes et al. | |
| 2013/0052992 A1 | 2/2013 | Lee et al. | |
| 2013/0115915 A1 | 5/2013 | Tipton et al. | |
| 2013/0173702 A1 | 7/2013 | Lang et al. | |
| 2014/0074896 A1 | 3/2014 | Bushman et al. | |
| 2014/0215583 A1 | 7/2014 | Ding | |
| 2014/0232522 A1* | 8/2014 | Schmidt-Lackner | .... G07C 9/30 340/5.2 |
| 2014/0247941 A1 | 9/2014 | Gu et al. | |
| 2014/0289049 A1 | 9/2014 | Van Boucq | |
| 2014/0351392 A1 | 11/2014 | Baker et al. | |
| 2015/0023338 A1 | 1/2015 | Welch et al. | |
| 2015/0095989 A1* | 4/2015 | An | .......................... H04L 63/10 726/4 |
| 2015/0221149 A1 | 8/2015 | Main et al. | |
| 2015/0249580 A1* | 9/2015 | Cory | ................... H04L 41/0896 709/226 |
| 2015/0302479 A1 | 10/2015 | Cheng | |
| 2016/0192289 A1* | 6/2016 | Visuri | ................. H04W 12/068 455/450 |
| 2016/0198501 A1* | 7/2016 | Verkaik | ................... H04W 8/04 370/329 |
| 2016/0218937 A1 | 7/2016 | Millington et al. | |
| 2016/0219112 A1 | 7/2016 | Millington et al. | |
| 2016/0234179 A1 | 8/2016 | Gatewood et al. | |
| 2016/0270101 A1 | 9/2016 | Lee et al. | |
| 2017/0118644 A1 | 4/2017 | Le Moan | |
| 2017/0272317 A1 | 9/2017 | Singla et al. | |
| 2017/0311249 A1* | 10/2017 | Lopes | ................. H04W 36/302 |
| 2018/0077025 A1* | 3/2018 | Helvey | ................. H04L 41/046 |
| 2018/0092151 A1* | 3/2018 | Liu | ....................... H04W 24/02 |
| 2019/0027255 A1* | 1/2019 | D'Amelia | .............. G08B 31/00 |
| 2019/0104411 A1 | 4/2019 | Hotchkiss et al. | |
| 2019/0246347 A1* | 8/2019 | Lopes | ..................... H04W 8/26 |
| 2020/0127972 A1 | 4/2020 | Aldossary et al. | |
| 2021/0076216 A1 | 3/2021 | Hotchkiss et al. | |
| 2021/0185534 A1 | 6/2021 | Vankieken | |
| 2024/0267997 A1* | 8/2024 | Dressendofer | ........ H04W 88/16 |

FOREIGN PATENT DOCUMENTS

| | | |
|---|---|---|
| WO | 2004084458 A2 | 9/2004 |
| WO | 2016/176422 A1 | 11/2016 |

OTHER PUBLICATIONS

Apr. 4, 2022, European Search Report issued for European Application No. EP 21 20 9919.6.

Extended European Search Report to corresponding EP Appln. No. 24159123.9, mailed Jul. 9, 2024 (9 pages).

Opensync.lo: "OpenSync 3.4 Northbound APO," retrieved from the internet: URL:https://static1.squarespace.com/static/5bbce542d7819e023f203f03/t/63987e5bdbfffe6a9876edcf/1670938205501 (2022).

* cited by examiner

Guest pastes in the password.
or types it in manually.

Wi-Fi NETWORKS WITH MULTIPLE PARTY CONTROL AND MANAGEMENT

CROSS-REFERENCE TO RELATED APPLICATION(S)

The present patent/application is a continuation-in-part of U.S. patent application Ser. No. 17/101,301, Nov. 23, 2020, and entitled "Access to Wi-Fi networks via two-step and two-party control," which is a continuation-in-part to U.S. patent application Ser. No. 15/825,242, filed Nov. 29, 2017, and entitled "CONTROLLED GUEST ACCESS TO WI-FI NETWORKS," which claims priority to U.S. Provisional Patent Application No. 62/565,418, filed on Sep. 29, 2017, and entitled "CONTROLLED GUEST ACCESS TO WI-FI NETWORKS," the contents of each are incorporated by reference in their entirety.

FIELD OF THE DISCLOSURE

The present disclosure generally relates to wireless networking systems and methods. More particularly, the present disclosure relates to Wi-Fi networks, such as operated in multi-dwelling units (MDU), office space, retail space, mixed-use space, common areas, etc., with multiple party control and management.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

In Wi-Fi networks, similar to wired Local Area Network (LAN) networks, once a user device is connected (or plugged into a LAN), the user device has full access on the network. Thus, any connected user device can access any device or resources on the network. For example, when a user device is connected to a Wi-Fi network through its a Service Set Identifier (SSID) (network ID) that user device can access any device or resource also on the SSID. There is a use case for so-called guest access to Wi-Fi networks where user devices can connect to the Wi-Fi network for limited purposes, such as Internet access only, access to select devices or resources, etc.

The conventional approach to guest access in Wi-Fi networks utilizes a separate SSID and password for guest access. For example, the main Wi-Fi network can be HOME whereas a separate SSID is setup for HOME_GUEST. However, this approach has disadvantages including the use of multiple SSIDs, inability to offer selective access to guest user devices to devices or resources on the main Wi-Fi network, etc.

Also, businesses deploy Wi-Fi networks in their offices, stores, warehouses, and the like, for customers, employees, contractors, etc. Enterprise Wi-Fi systems are available but tend to require full-time management by the business. This is typically acceptable in large businesses, with full-time Information Technology (IT) personnel on staff, but not for a small or medium size business where often the business owner is tasked with managing IT. In this situation, enterprise Wi-Fi systems are often overkill in terms of functionality and management requirements. It is not feasible for a business owner to allow/block every user that gets on the business's Wi-Fi network. Their objective is running the business, not performing IT. There is a need for a Wi-Fi network that meets the needs and objectives of small and medium-sized businesses. That is, an approach that balances security and ease of operation.

In additional, there are opportunities to deploy Wi-Fi networks in high-density locations such as multi-dwelling units (MDUs). An MDU can be residential duplexes, triplexes, fourplexes, apartment buildings, condominiums, mobile home parks, trailer courts, or similar types of multiple dwelling unit arrangements on one parcel of land. Since Wi-Fi is by nature a shared medium, there are opportunities for landlords of the MDUs to offer Internet access to their residents. In the United States, MDUs make up over 25% of housing and such numbers are even larger internationally. Conventional MDU-based Wi-Fi systems provide fragmented approaches that make shared, MDU-based Wi-Fi perform poorly, have high build out costs, poor user experience, and managerial complexity,

BRIEF SUMMARY OF THE DISCLOSURE

The present disclosure relates to Wi-Fi networks, such as operated in multi-dwelling units (MDU), office space, retail space, mixed-use space, common areas, etc., with multiple party control and management. The present disclosure includes a single management entity for a Wi-Fi system that can cover residential, commercial, common areas, and the like. With the present disclosure, landlords can offer Wi-Fi services, increase tenant satisfaction and retention, reduce cost and complexity, and increase operational efficiency. A Wi-Fi network based on the present disclosure can include load clusting, personalized tenant experiences, property wide Wi-Fi connectivity, and tenant lifecycle management.

In an embodiment, a method managing a plurality of Wi-Fi networks via a cloud service includes communicating to a plurality of access points in the plurality of Wi-Fi networks, wherein the plurality of access points are deployed in a location that includes any of a multi-dwelling unit (MDU), office space, retail space, mixed-use space, and common areas; providing end user management access to a plurality of end users each associated with one of the plurality of Wi-Fi networks; providing property manager management access to a property manager associated with the location and with any additional locations; and providing service provider management access to a service provider associated with the location.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
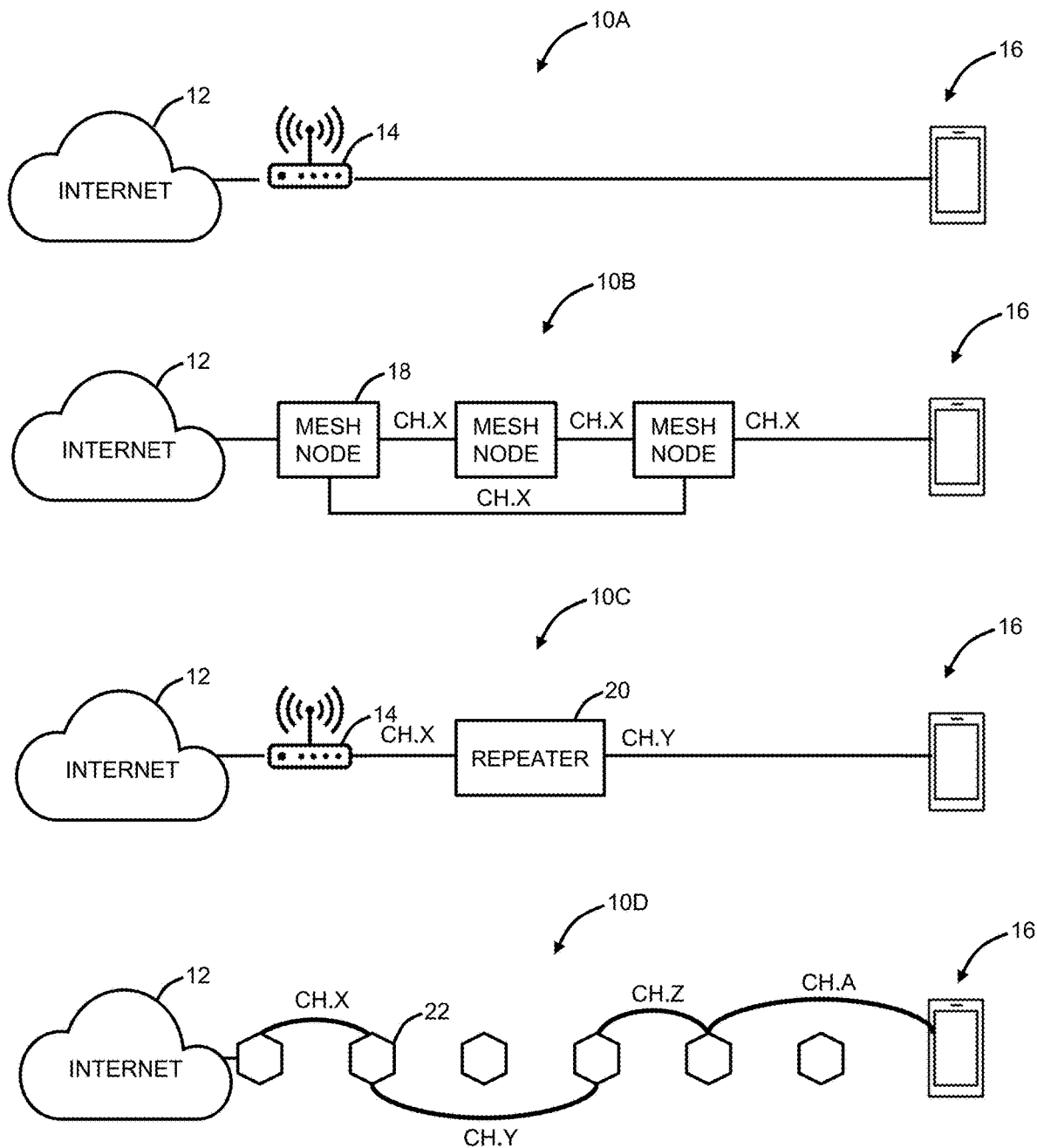
FIG. 1 is a network diagram of various Wi-Fi network topologies for connectivity to the Internet.

Again, the present disclosure relates to Wi-Fi networks, such as operated in multi-dwelling units (MDU), office space, retail space, mixed-use space, common areas, etc., with multiple party control and management. The present disclosure includes a single management entity for a Wi-Fi system that can cover residential, commercial, common areas, and the like. With the present disclosure, landlords can offer Wi-Fi services, increase tenant satisfaction and retention, reduce cost and complexity, and increase operational efficiency. A Wi-Fi network based on the present disclosure can include load clusting, personalized tenant experiences, property wide Wi-Fi connectivity, and tenant lifecycle management.

Also, the present disclosure relates to access to Wi-Fi networks, such as operated by businesses, by two-step and two-party control. The controlled access includes multiple zones with access privileges and with convenient ways for user devices to connect to the appropriate zones. For example, the zones can include a secure zone, an employee zone, and a guest zone, each can include a unique SSID or the same SSID. Each zone can include a password along with the SSID for security. Once in the corresponding zone, a user device is placed in a holding area ("purgatory") where a notification is sent and/or a listing is provided in a User Interface (UI) for a network manager. As described herein, the network manager is an administrator, business owner, etc. tasked with managing the Wi-Fi network. The network manager has the option of approving, disapproving, or taking no action with respect to the client device. Approving can provide the user device full access to the zone, i.e., "heaven," whereas disapproving can keep the user device connected, but with no access rights at all, i.e., "hell." Further and conveniently, the user device can remain in the holding zone in perpetuity having some minimal access rights, such as limited Internet access only in the employee zone and the guest zone, but no access in the secure zone. This approach can include remembering user devices for consistent application of policy as they come and go. This approach is referred to as two-step, namely SSID+password and the holding zone, and two-party, namely the user entering the SSID+password and the network administrator addressing the holding zone. Additionally, the present disclosure includes a concept of pin holing where a particular device in one zone is granted some access to another zone. Advantageously, the systems and methods include an approach that is easy to operate and manage while balancing security and user experience.

Also, in various embodiments, the present disclosure relates to systems and methods for controlled guest access to Wi-Fi networks. The systems and methods utilize a single SSID for all users including home (full access) and guest (selective access) users. Specifically, the password for a user serves as a token for the access level, instead of the different SSID. The administrator can set up different zones which are equivalent to an access level. The zones are different sets of devices enabled for different sets of users. For example, a guest user on a home Wi-Fi network may have Internet access and access to a printer, but no access to a door lock, thermostat, etc. in a particular zone. Thus, the Wi-Fi network has a single SSID (e.g., HOME) with multiple different passwords each with an associated access level (zone). Advantageously, the systems and methods use a single SSID with multiple passwords to provide user-level access control to specific devices and resources. Of note, this controlled guest access is typically used for home Wi-Fi networks, hence the use of the single SSID. The controlled access to Wi-Fi networks operated by businesses described herein can utilize various aspects of the zones and configuration for home Wi-Fi networks, but in the context of business Wi-Fi networks. One difference can be the use of separate SSIDs for the different zones as this increases security.

In an embodiment, the systems and methods can be implemented in a distributed Wi-Fi system such as a multiple access point system, a mesh system, an access point and repeater(s) system, etc. Additionally, the systems and methods provide granular control for all users include traffic limits, time limits, geographic limits, prioritization, self-destructing/terminating, application limits, and combinations thereof. The traffic limits can include setting thresholds for upload/download including absolute traffic, ongoing traffic, etc. The time limits can be used to prevent access at certain times of the day such as at night for children, etc. The geographic limits can be useful in the distributed Wi-Fi system or any other multiple access point system to require access through specific access points, or restriction to the use of particular devices in specific regions of the house, or even access to various devices depending on where the guest is located at the time of desired access. The prioritization can set priorities for different users. The self-destructing/terminating includes setting a time when access ends for a particular user, zone, etc. Finally, the application limits can block certain application use on the Wi-Fi network. An example would be to block video or certain types of Internet gaming, while allowing Web page access in a particular zone.

The password and/or SSID are used by the Wi-Fi network to designate the access level using, for example, OpenFlow rules in an OpenFlow Virtual Switch (OVS). For example, the access level is provided using frame forwarding rules based on Software Defined Networking (SDN) in the OVS. The access points or other devices in the Wi-Fi network are configured as a programmable switch (OVS) and are programmed between devices based on device Media Access Control (MAC) addresses. The OVS can be cloud-controlled where a cloud-based controller configures the rules in a database in each device. The control of the user access can be via an application ("app") on a mobile device or the like that provisions the rules and communicates to the cloud-based controller. In a distributed Wi-Fi network, the access level configuration can explicitly set routing between devices.

The cloud-based controller and associated app can provide log information to the administrator. For example, if a guest user performs actions (or attempts to) in contravention of their access level, this information can be logged. A captive portal can be used to communicate with the guest if they attempt to use services that have not been approved for them. For example, if a user in the Internet Access only zone attempts to access the Wi-Fi lock on the home, he can be redirected to a captive portal Web page that informs the user that he does not have permission to interact with the door lock. Further, the captive portal can provide a mechanism for the guest to request an upgrade in access via the captive portal, e.g., including an explanation or rationale. This would then be communicated to the host of the network, and the host can approve or deny the request. In some circumstances, the captive portal to which the guest is directed upon trying to access barred devices or services could contain advertising or any other information.

The administrator can communicate the password and SSID to guest users in various convenient ways. For example, the password and SSID could be sent to the guest via a text message. On some platforms, the text message can be activated to directly load the SSID and password into the guest's device. However, in some cases this is barred by the operating system. In addition, on some platforms it can be difficult to copy a portion of a text message (the password) separately from other text. In this case, the text message can include a link to a web page. The Web page can include a password that is simpler to copy and paste, or it can include an action to automatically load the password onto the guest's device. The Web page to which the guest is directed to obtain the key and SSID may also have pictorial or written instructions on how to most easily enter the password and SSID into their device. Also, there can be a single click capability which can cause the associated device to associate based on the SSID and password automatically. Since the password sharing is convenient, it can support more complex passwords which are difficult to hack or crack, i.e., long strings of random data. Also, the information via a Web page, a text message, an email, etc. can expire in a certain time period. The Web page itself can be made to exist only temporarily, and its address can be a long, complicated string such that it cannot be discovered by anyone who has not been sent the link.

These methods can also support the delivery of a security certificate. The use of security certificates for gating access to wireless networks is well known in the art. However, the certificates are typically installed manually on each device by a system administrator. In this case, they could be distributed via the Web page process just described, and the certificates might be granted access for only a limited period of time, and as with the passwords, might map the user to a particular access zone or set of devices and services to which they would be allowed access. One convenience of either the password or certificate-based solution is that the guest can be delivered the password or certificate beforehand, before they come to the home. This delivery can be made by email, text message, or via a link to a Web page provided to the guest ahead of time. This allows the guest to pre-install the password or certificate, and can begin using the network immediately upon arrival, with all the correct permissions associated with that guest's intended zone.

Further, based on the cloud-based controller, the service supporting user access level control is running in the cloud and not local to a Wi-Fi network. That is, the cloud-based controller can manage multiple Wi-Fi networks concurrently. Thus, an owner can manage different locations from the same application interface, e.g., multiple homes, etc. For example, if an owner has a network in both their primary residence and a vacation residence, the guest access they provide to a given guest can immediately be applied to the networks in both their primary and vacation homes. Similarly, configurations of access zones can be copied across multiple locations. If the owner sets up an internet only zone, a no video zone, a no game zone, etc., these exact same zones can be created at both their primary residence and their vacation home. Also, the cloud-based controller allows the administrator to provide guest access remotely, move passwords between zones/permissions, etc. For example, while at work, if a visitor to the vacation home requests guest access, the owner can grant that using their application interface over the internet. If such guest had previously visited their primary home and received a password for that location, the password from the primary home could be moved to the vacation home such that the guest's already existing password will work in the vacation home. Another use of the cloud-based access controller is to populate any extensions to a Wi-Fi network with the same access rules. For example, if the owner adds several new access points 14 to the distributed Wi-Fi system 10, the guest access rules can be automatically added to these access points 14 from the cloud 12 without the owner having to configure each of the access points 14 individually.

There is a convenient control for the administrator to change zones for devices, provide access on a room-by-room basis, etc. For example, devices and resources on the Wi-Fi network can be based on where the user device is located, i.e., in the same room. Access levels can also be adjusted depending on the location of the guest. For example, if the guest is in the living room, they might be granted access to the Internet, and to the set top box by the television. If they are in the office, they might be granted access only to the Internet and a printer within the office. If they are in the bedroom, no access to the network at all might be enforced. Of course, various embodiments are contemplated.

§ 1.0 Wi-Fi Network Topologies

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only $\frac{1}{3}$ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high-definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems, as illustrated in the Wi-Fi networks 1A, 10B, 10C. The first approach (the Wi-Fi network 10A) is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location, as illustrated in the Wi-Fi networks 10B, 10C. This approach is a fundamentally better approach to achieving better coverage. By placing even a single repeater 20 in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters 20. A fully interconnected mesh adds the ability for all the mesh nodes 18 to be able to communicate with each other, opening the possibility of packets being delivered via multiple hops following an arbitrary pathway through the network.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
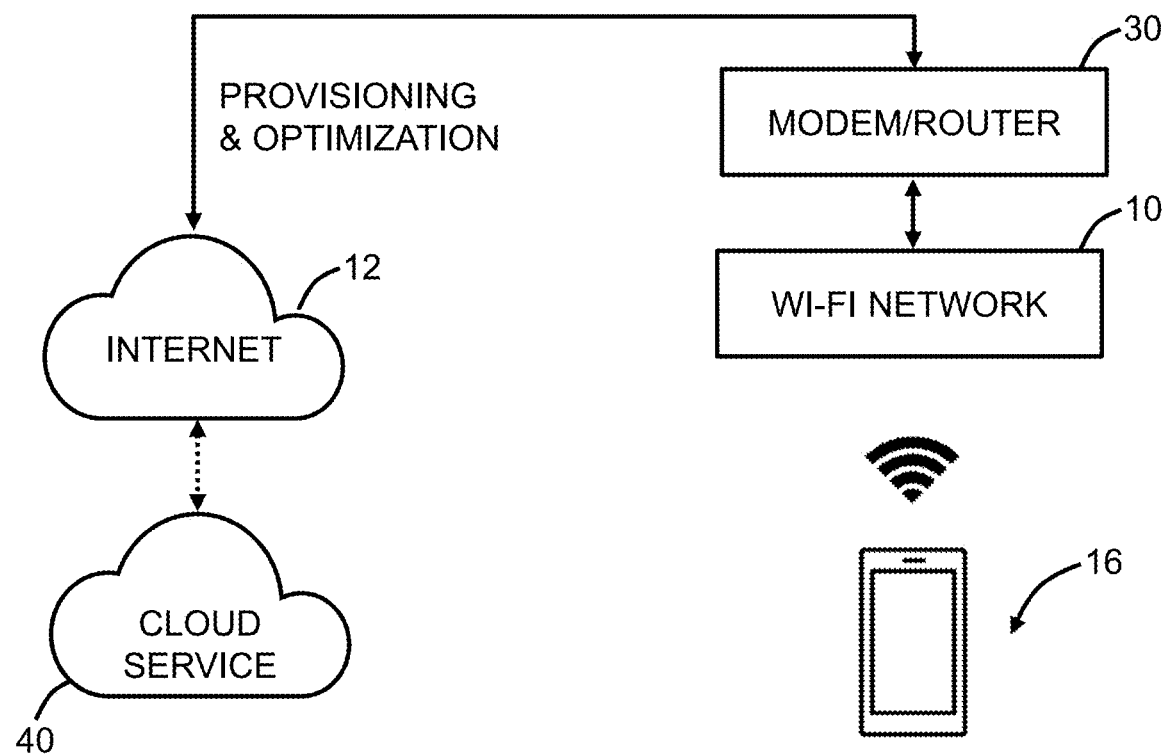
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
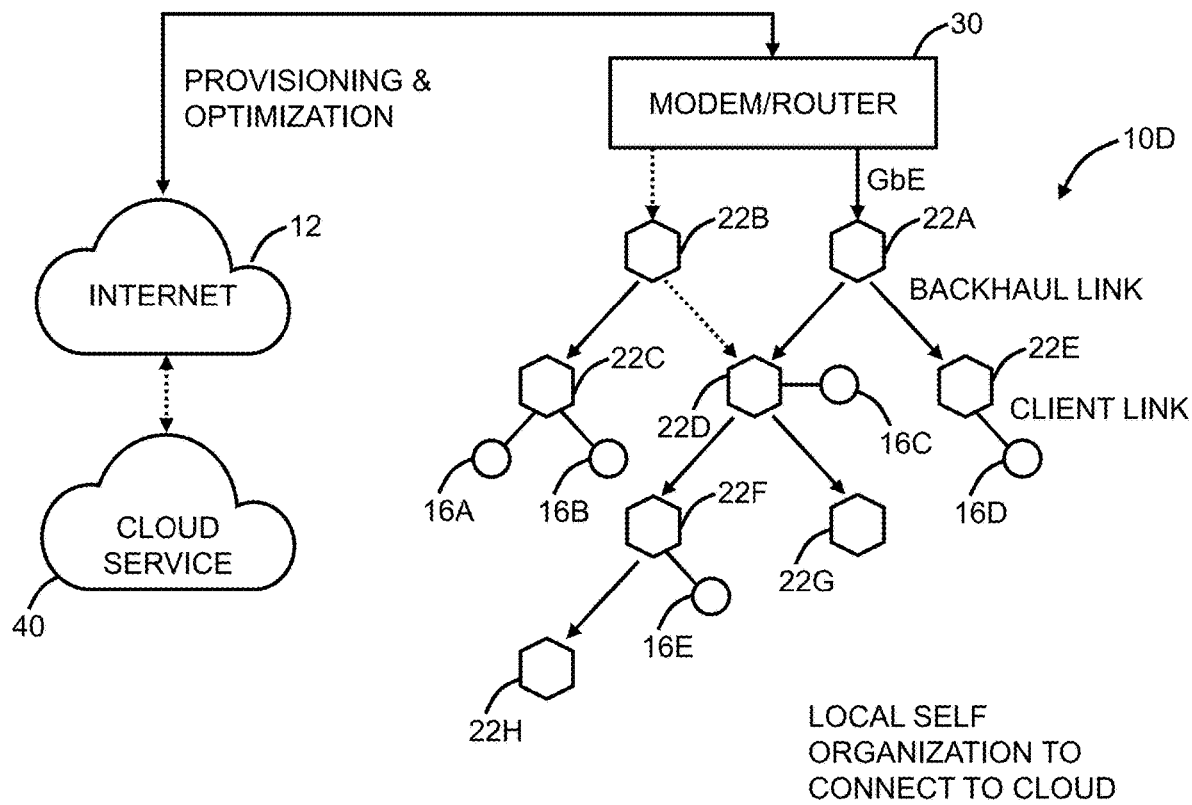
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an exemplary aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an exemplary gigabit Ethernet (GbE) wired connection to the modem/router 40. Optionally, the access point 22B also has a wired connection to the modem/router 40, such as for redundancy or load balancing. Also, the access points 22A, 22B can have a wireless connection to the modem/router 40. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10D differs from a conventional Wi-Fi mesh network in that the client links and the backhaul links do not necessarily share the same Wi-Fi channel, thereby reducing interference. That is, the access points 22 can support at least two Wi-Fi wireless channels— which can be used flexibly to serve either the client link or the backhaul link and may have at least one wired port for connectivity to the modem/router 40, or for connection to other devices. In the distributed Wi-Fi network 10D, only a small subset of the access points 22 require direct connectivity to the modem/router 40 with the non-connected access points 22 communicating with the modem/router 40 through the backhaul links back to the connected access points 22A, 22B. Of course, the backhaul links may also be wired Ethernet connections, such as in a location have a wired infrastructure.

§ 2.0 Access Point

Figure 3A:
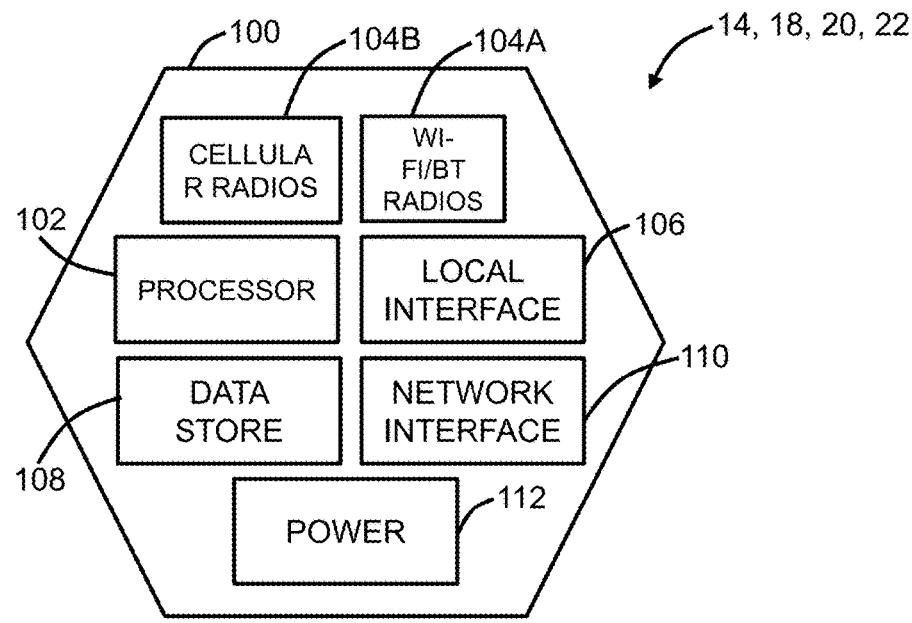
FIG. 3A is a block diagram of functional components of the access points, mesh nodes, repeaters, etc., in the Wi-Fi networks of FIG. 1.

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104A can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104A such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6

GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 40. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

Figure 3B:
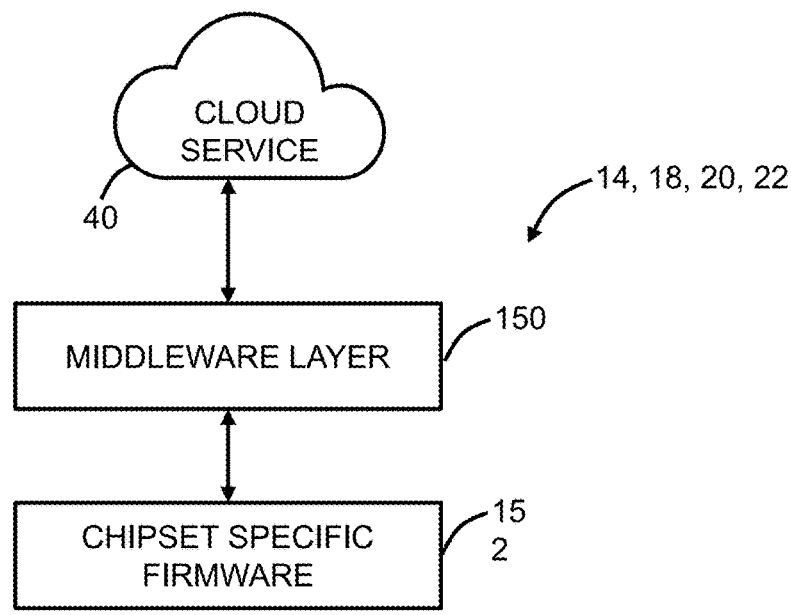
FIG. 3B is a logical diagram of the access points, mesh nodes, repeaters, etc. with a middleware layer to enable operation with the cloud service.

FIG. 3B is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as describe in www.opensync.io/documentation, the contents of which are incorporated by reference. Again, OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry
    Collecting measurements reported by the low-level drivers
    Compiling and pre-processing the measurements into statistics that are uniform across different devices
    Presenting the statistics using standardized formats
    Preparing the formatted statistics for transfer to the cloud using serialization and packetizing
    Communicating the statistics to the cloud using standardized and efficient telemetry Management/Control
    Defining a standard interface for control messaging from the cloud service 40
    Providing operations necessary to manage the services, such as onboarding and provisioning
    Providing rules-based networking configurations to block, filter, forward, and prioritize the messages
    Implementing software to manage the device maintenance functions, including logging, firmware upgrades, and debugging Cloud-Managed Services
    Wi-Fi, including mesh networks that dynamically adapt to their environments
    User access management
    Cybersecurity
    Parental controls
    IoT device management
    Additional services Through use of the middleware layer 150, it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with OpenFlow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 Cloud Server and User Device

Figure 4A:
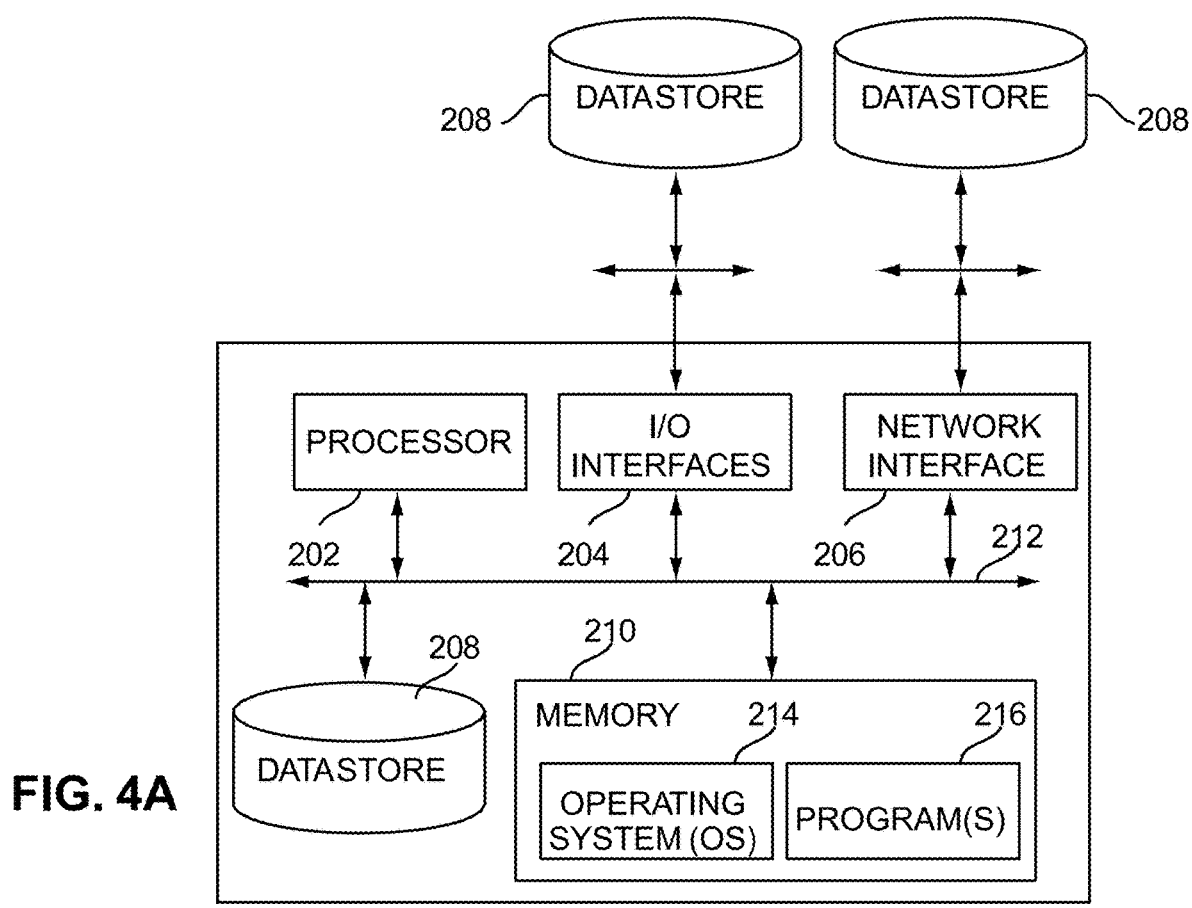
FIG. 4A is a block diagram of functional components of a server, a Wi-Fi client device, or a user device that may be used with the Wi-Fi network of FIG. 1 and/or the cloud-based control of FIG. 2A.

FIG. 4A is a block diagram of functional components of a server 200, a Wi-Fi client device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4A depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

§ 4.0 Wi-Fi Network with Wired and Wireless Connectivity

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 4B:
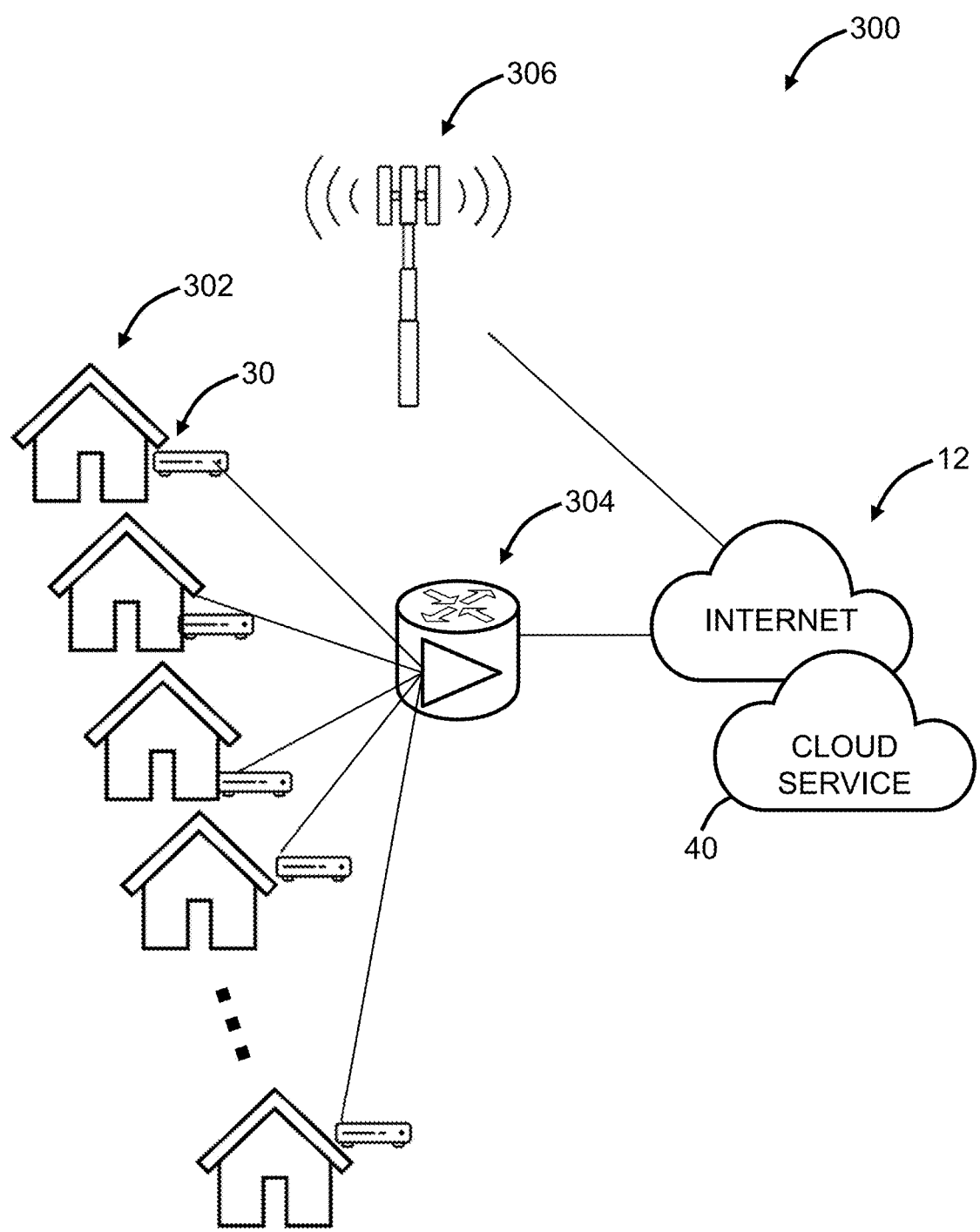
FIG. 4B is a network diagram of a portion of a network associated with a network operator.

FIG. 4Bb is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 4C:
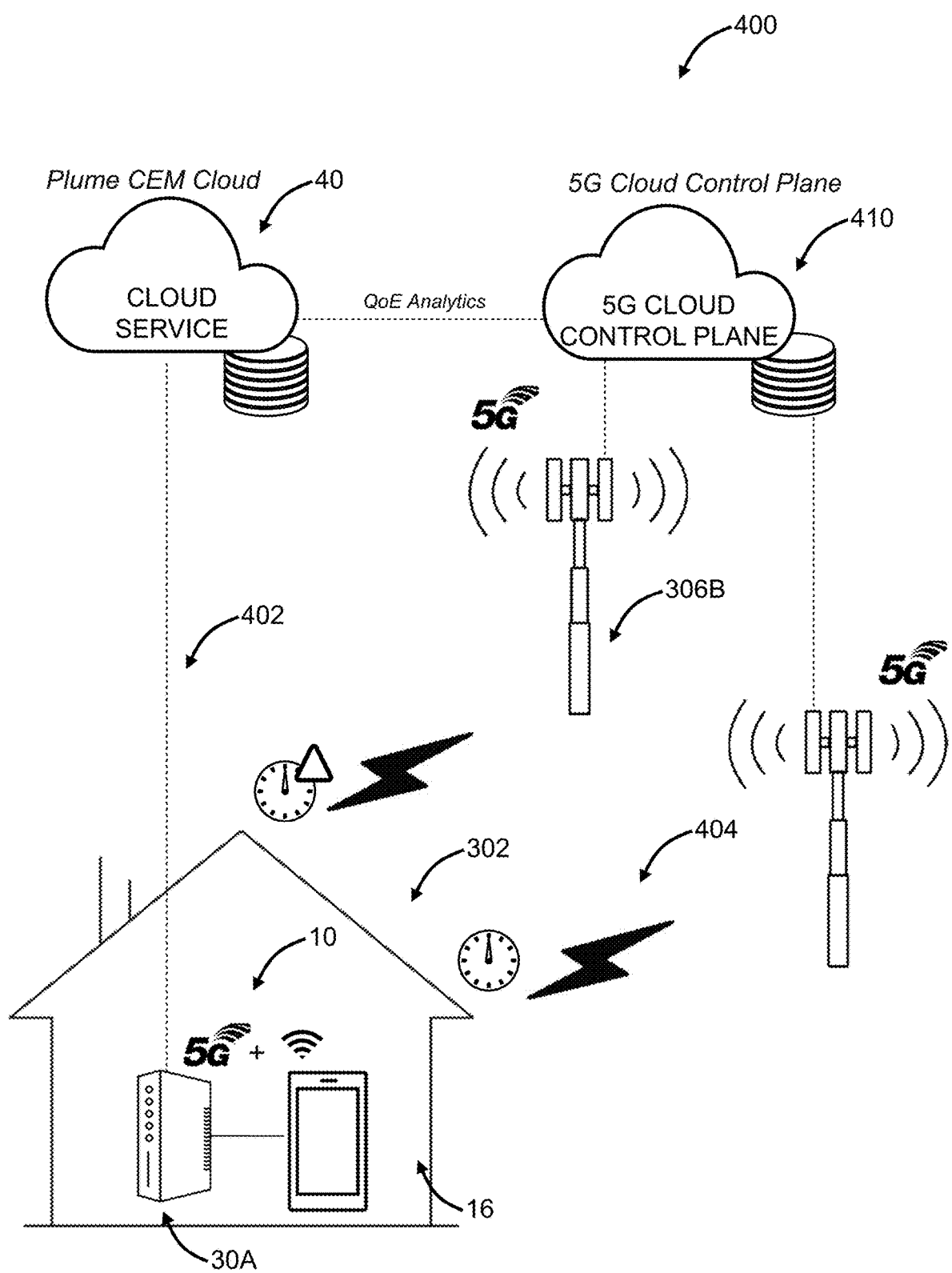
FIG. 4C is a diagram of a fixed wireless access system for wired and/or wireless connectivity.

FIG. 4C is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 Non-Host Access (NHA)

Again, in various embodiments, the systems and methods provide controlled guest access to Wi-Fi networks. As described herein, the controlled guest access can be referred to as Non-host Access (NHA), i.e., a host has full accessibility to the Wi-Fi network and associated devices and resources whereas a non-host is a guest with limited access. Instead of creating a separate "guest SSID," a single SSID is used at each location, a number of access zones are created to manage access privileges of connecting devices. Each access zone is accessible using a unique set of keys (i.e., Wi-Fi passwords), any of which can be used to access the SSID. There is no technical upper limit on the number of keys that can be assigned to each Zone, but to keep this manageable, a maximum limit can be set 10. access zone The key used to access the SSID determines the access zone for the connecting Device. Specifically, a device is automatically a part of an access zone to which it is connected, and if a device has been given multiple passwords, then its zone is determined by which password it most recently used to connect.

In an embodiment, three access zones can be defined for each location.

1) Home access zone—when a new client uses the Home Key, it gets automatically included in the list of Home devices and thereby can access other devices within the Home and be accessed from other devices within the Home. The Home access zone provides access to the Internet and to all devices connected to the Wi-Fi network as well as automatic access to new devices that join the network. Note, the original SSID/Key entered for the Wi-Fi network can by default be the Home access zone.

2) Guests access zone—when a new client uses a Guest Key, it can access the Internet and automatically gets included in a list of Guest devices and can access and be accessed from other devices in this Group. The Guest access zone would include devices in the home which the owner wishes to share with guests, such as a printer, but would not include devices that the owner does not wish to share, like a Wi-Fi door lock, etc. New devices added to the Home access zone are not made available to this Guest access zone until provisioned by the host.

3) Internet access Only access zone—clients in this group can only connect to the Internet and cannot access each other, or any other device within the home.

The following table shows the relationship between devices in each access zone. For example, Guests connected devices on different passwords may see each other, but they only have permission to see certain devices on the Home access zone controlled by the user. Devices connected to the Internet Only network are completely blocked from anything other than Internet access.

|  | Home | Guests | Internet Only |
|---|---|---|---|
| "Home Network" Devices | Open | Permission Based | Blocked |
| Access zone Devices password 1 | Open | Open | Blocked |
| Access zone Devices password 2 | Open | Open | Blocked |
| Access zone Devices password n | Open | Open | Blocked |

There is theoretically no limit to the number of access zones that can be created with different sets of permissions for devices within the home. The concept extends all the way to having a unique access zone per key, which is equivalently the ability to specify a unique set of access permissions for each individual guest allowed on the network.

Figure 5:
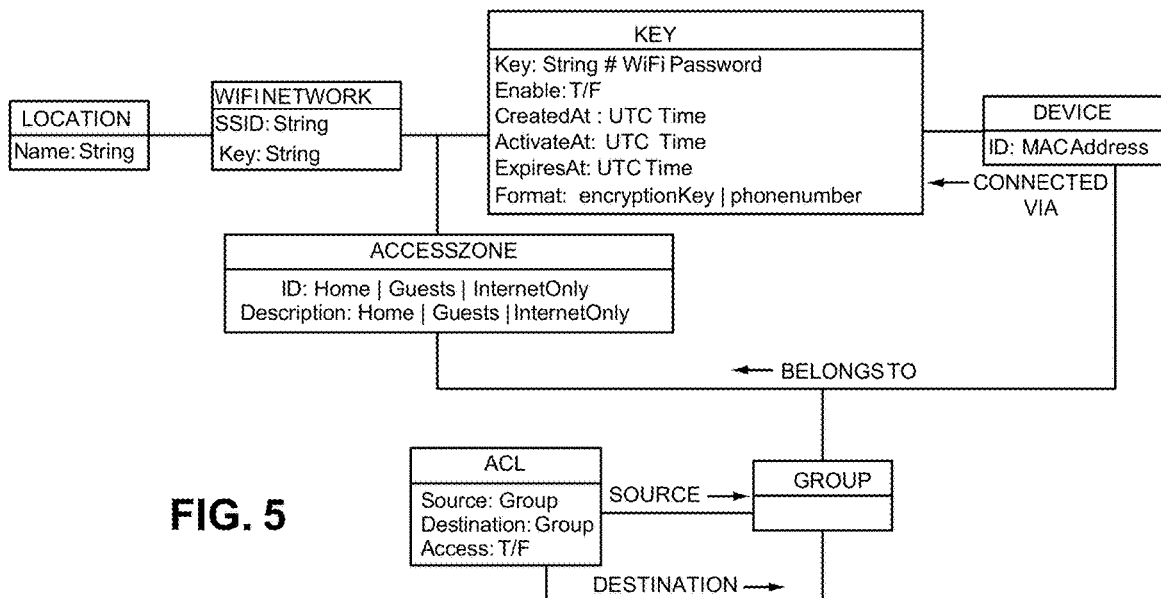
FIGS. 5 and 6 are diagrams of object models with FIG. 5 as business object model and FIG. 6 a logical object model for supporting access zones.
Figure 6:
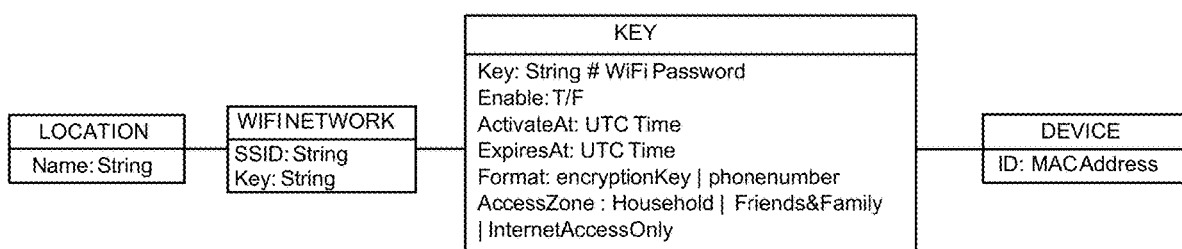

FIGS. 5 and 6 are diagrams of object models with FIG. 5 as a business object model and FIG. 6 a logical object model for supporting access zones. The key is an enumeration (ENUM) of the access zones, e.g., Home, Guests, or InternetAccessOnly. These object models can be hosted/managed by the cloud-based controller. The location is designated by a name which is a string. The Wi-Fi network is designated by the SSID which is a string and the Key which is a string. The Key is the Wi-Fi password, and different Keys are available for each Wi-Fi network. The Keys can be selectively enabled and set for different time activation and/or expiration. The device is designated by a MAC address and belongs to an AccessZone, e.g., Home, Guests, InternetOnly, etc. which is based on the Key. Also, an Access Control List (ACL) can be provided to a group which the device can belong.

Figure 7:
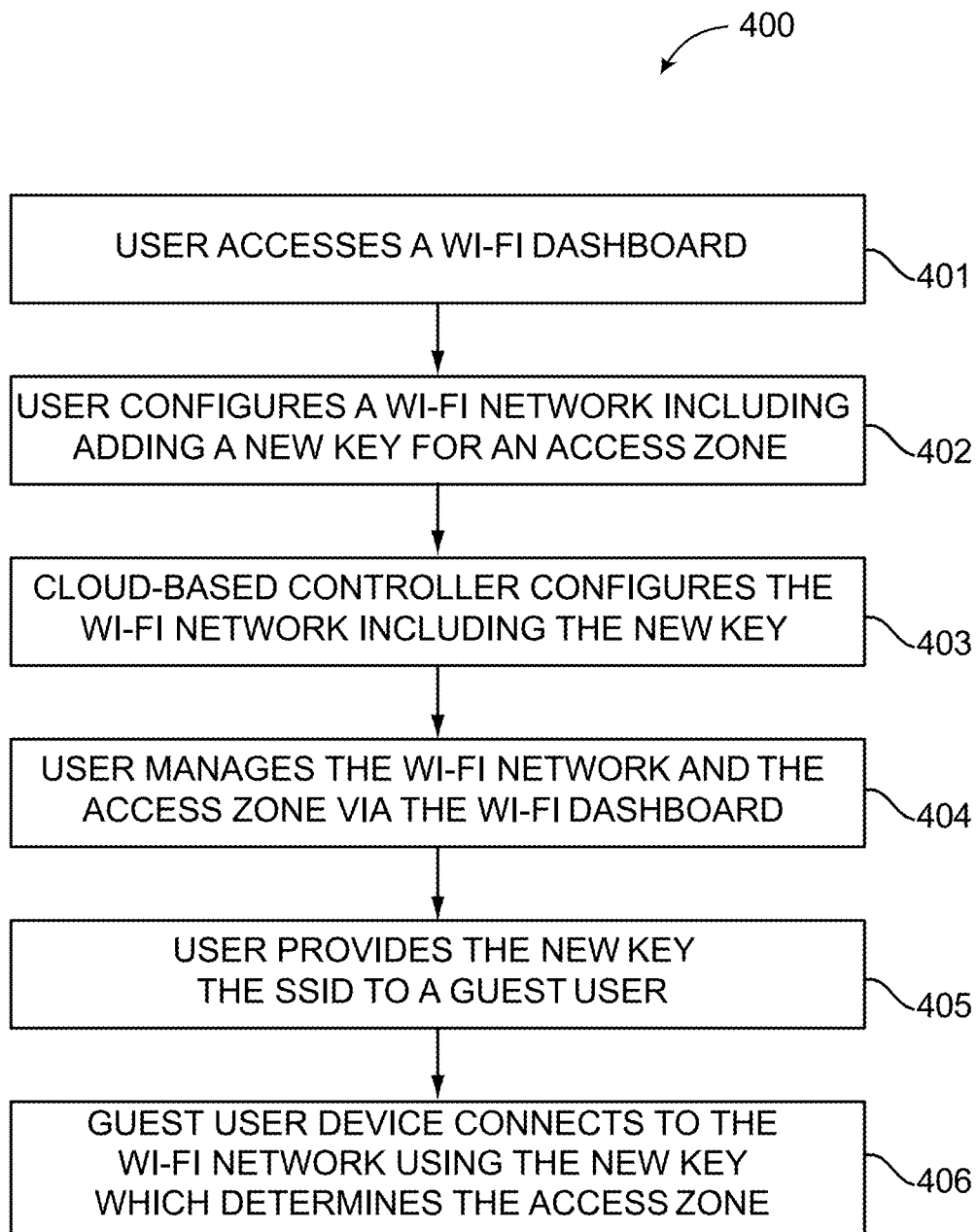
FIG. 7 is a flowchart of a non-host access process.

FIG. 7 is a flowchart of a non-host access process 400. The non-host access process 400 is performed for the Wi-Fi network, e.g., the distributed Wi-Fi system 10, the single access point system 30, the Wi-Fi mesh network 32, and the Wi-Fi repeater network 33, using the cloud-based controller, i.e., the cloud 12 and the servers 20, the user device 22, and one or more guest user devices, i.e., the Wi-Fi client devices 16. The user accesses a Wi-Fi dashboard. (step 401). Here, the Wi-Fi network is managed/controlled by the cloud-based controller which can operate the Wi-Fi dashboard. The user can access the Wi-Fi dashboard using the user device 22 and an application, Web browser, etc.

Figure 8:
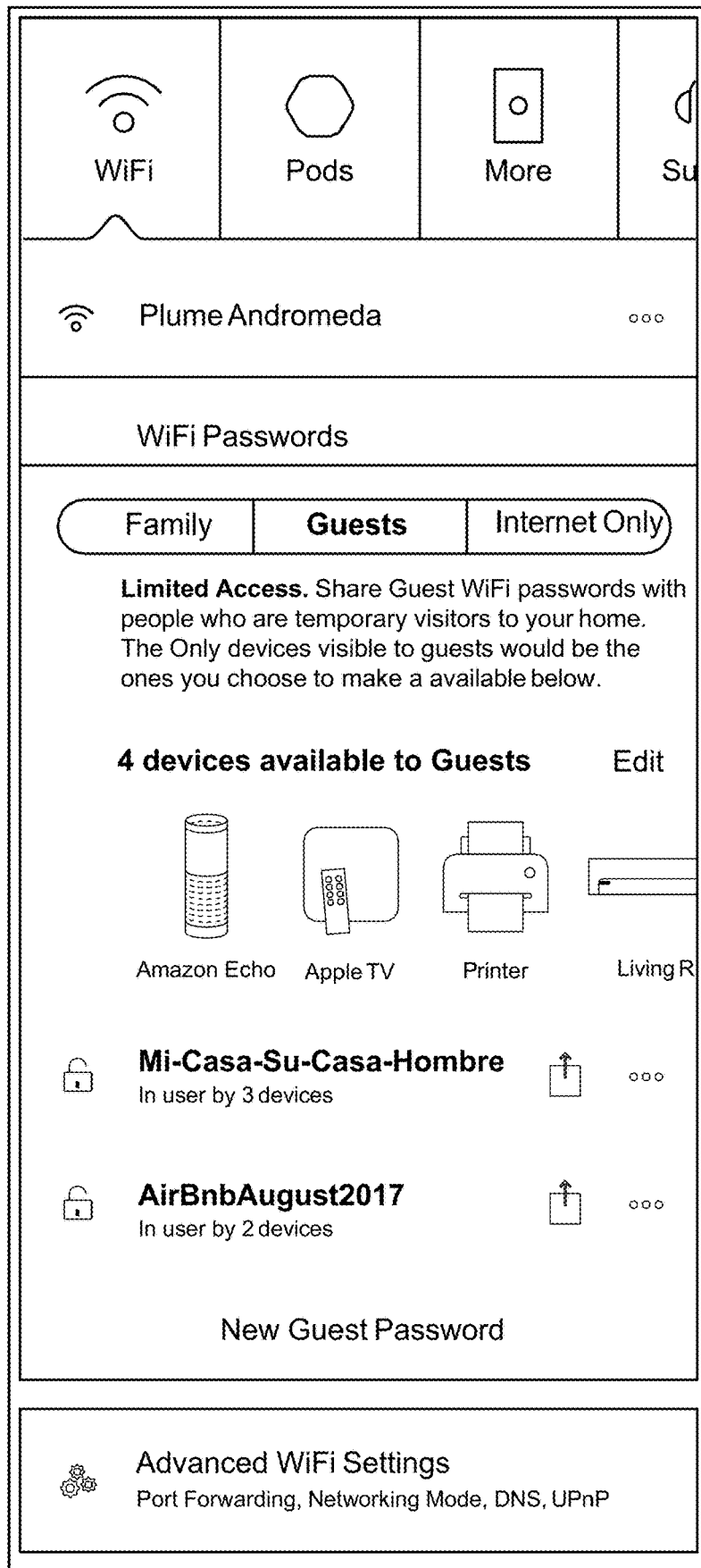
FIG. 8 is a screenshot of a Wi-Fi Dashboard.

FIG. 8 is a screenshot of the Wi-Fi Dashboard. The owner is an administrator for the Wi-Fi network. The owner can click on the Wi-Fi tab in FIG. 8, and the Wi-Fi Dashboard is displayed. The owner can view various access zones, keys defined in each zone, number of devices connected using each key.

Figure 9:
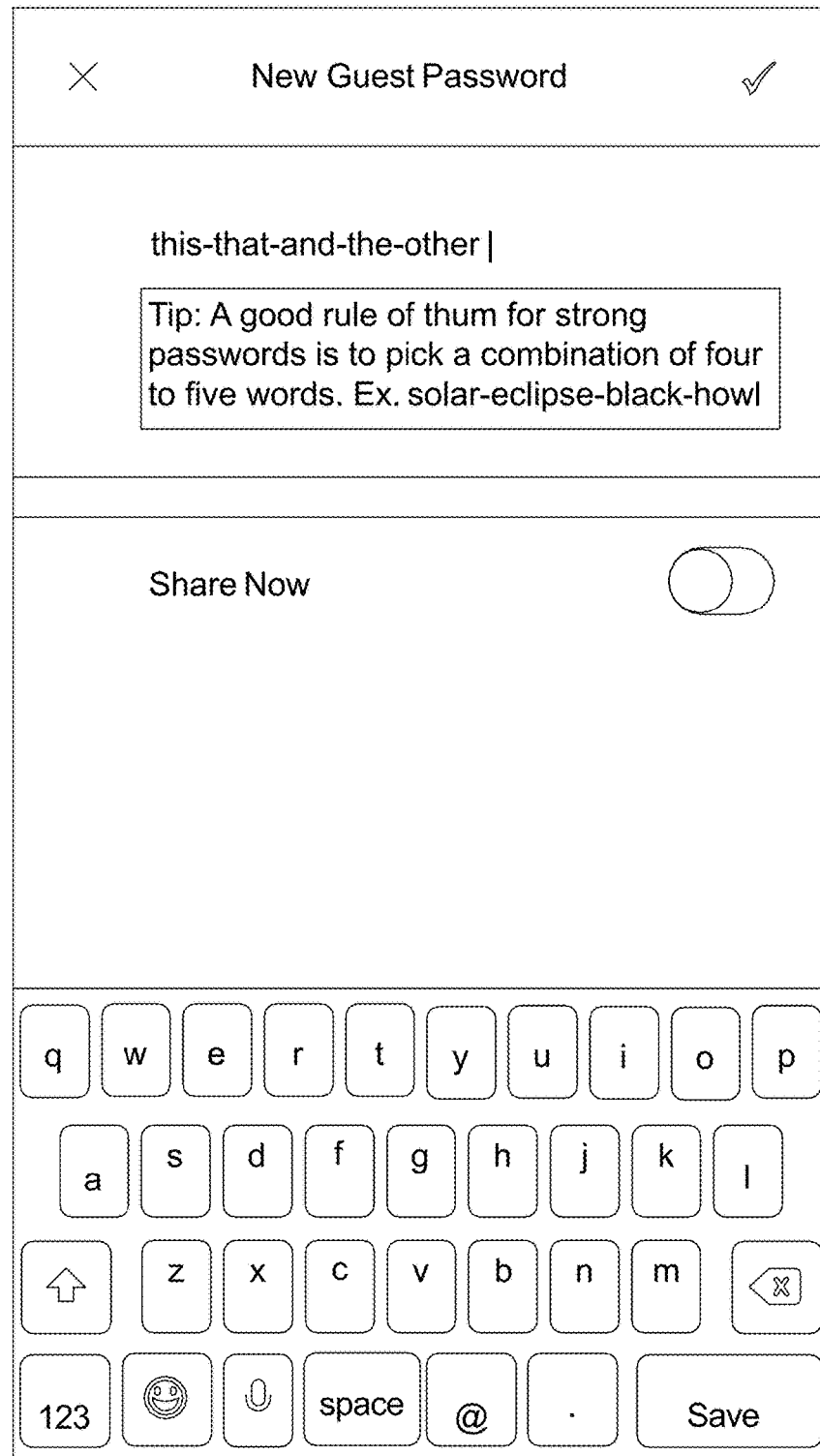
FIG. 9 is a screenshot for setting a new guest password.

Next, in FIG. 7, owner configured the Wi-Fi network including adding a new key for an access zone (step 402). For example, in FIG. 8, the owner can select NEW GUEST PASSWORD to bring up a screen illustrated in FIG. 9 for setting a new guest password. The mobile app on the user device 22 is used to set the new guest password (or multiple guest passwords). The guest password is a key as described herein and these keys are provided to the cloud-based controller. For example, the owner can publish one or more keys to the cloud-based controller which in turn maintains these in data structures (such as in the object models) and updates the device software in the Wi-Fi network, such as using the Open vSwitch Database Management Protocol (OVSDB).

Back in FIG. 7, the cloud-based controller configures the Wi-Fi network including the new key (step 403). Specifically, the cloud-based controller can communicate and initialize the Wi-Fi network upon startup including providing the SSID, keys, and configuration information. For purposes of the access zones, the cloud-based controller can update OVSDB Virtual Interface (VIF) tables for each node in the Wi-Fi network. The OVSDB VIF table can include a security column used to create multiple encryption keys for the same SSID.

Figure 10:
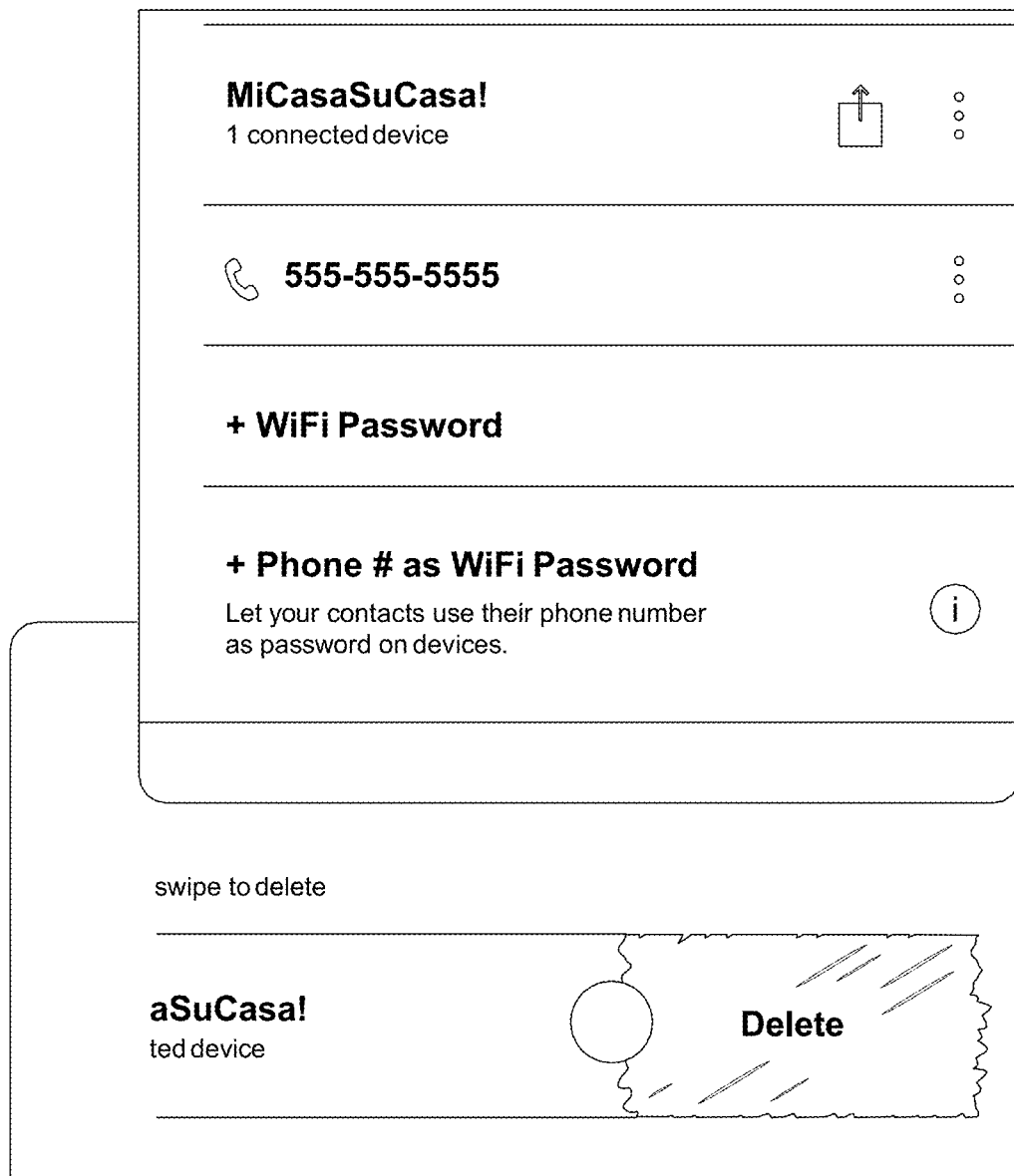
FIG. 10 is a screenshot for deleting a key.
Figure 11:
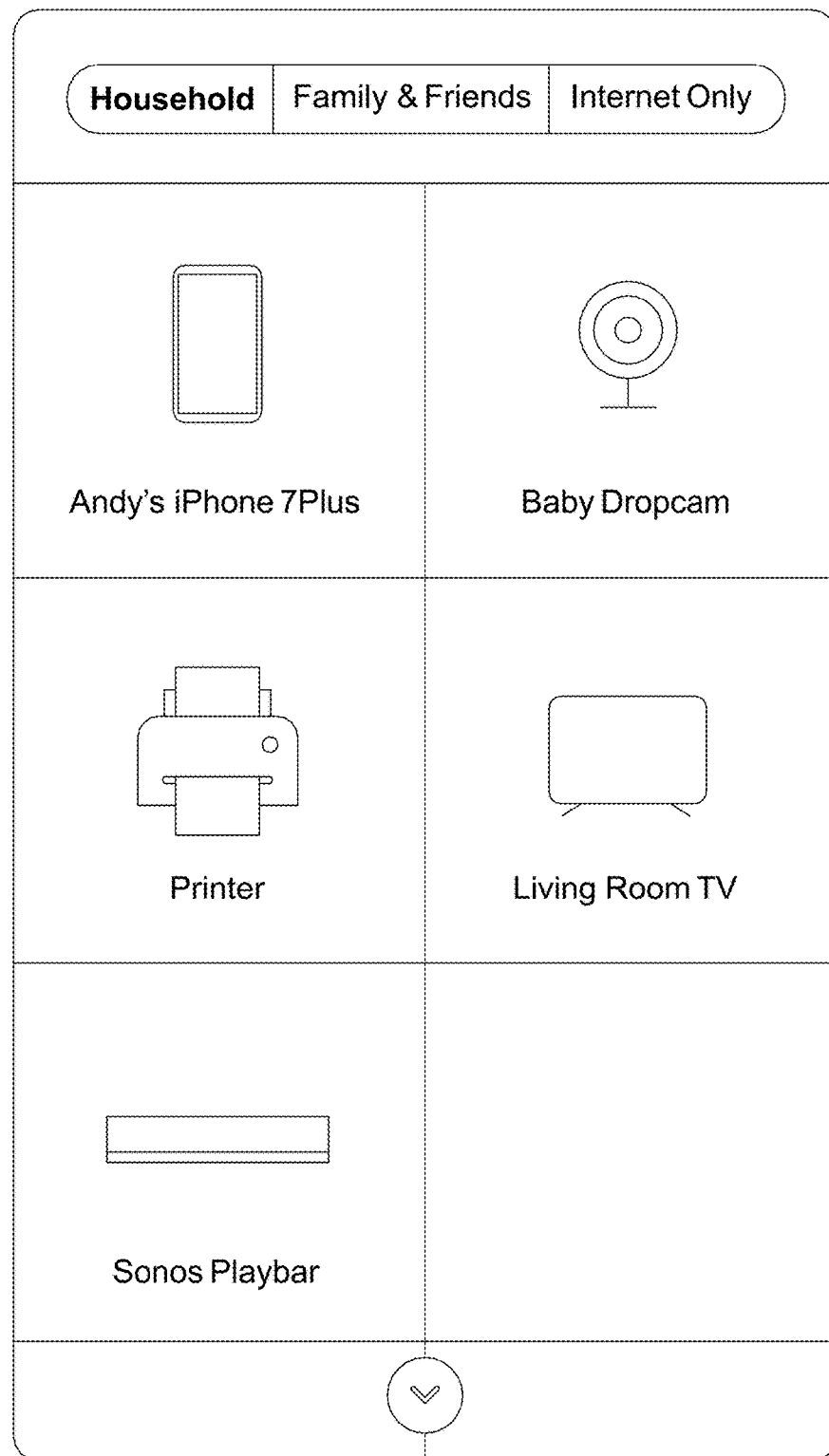
FIG. 11 is a screenshot for viewing devices for an access zone.
Figure 12:
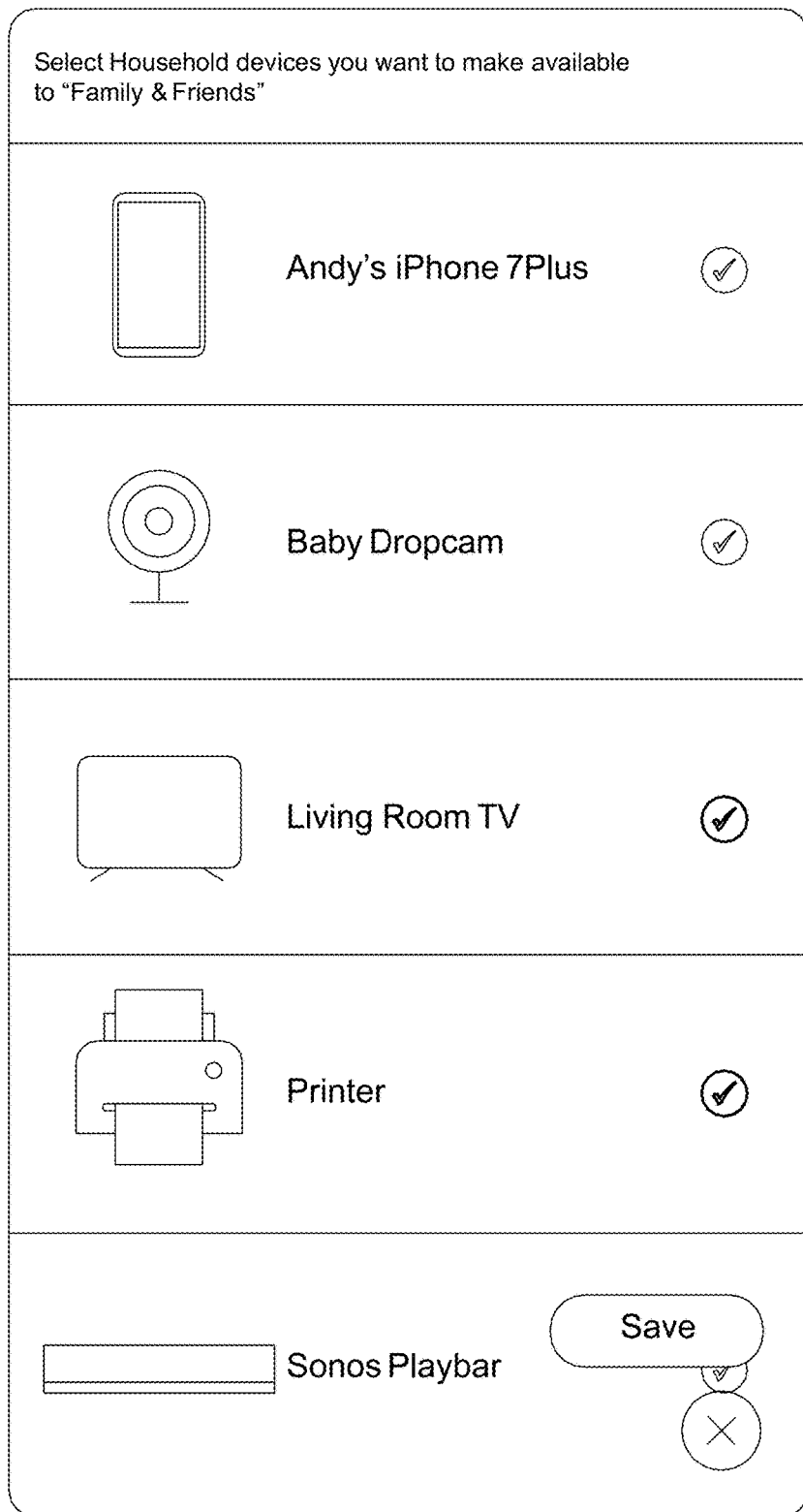
FIG. 12 is a screenshot for selecting devices for an access zone.

The owner manages the Wi-Fi network and the access zone via the Wi-Fi dashboard (step 404). The management can include deleting a key as illustrated in FIG. 10. The management can also include viewing devices for an access zone as illustrated in FIG. 11. For example, FIG. 11 includes three access zones—Household, Friends & Family, and Internet Only and devices can be added/removed selectively. The management can also include selecting devices for an access zone as illustrated in FIG. 12. Here, the user can select which devices are available for the Friends & Family access zone.

Figure 13:
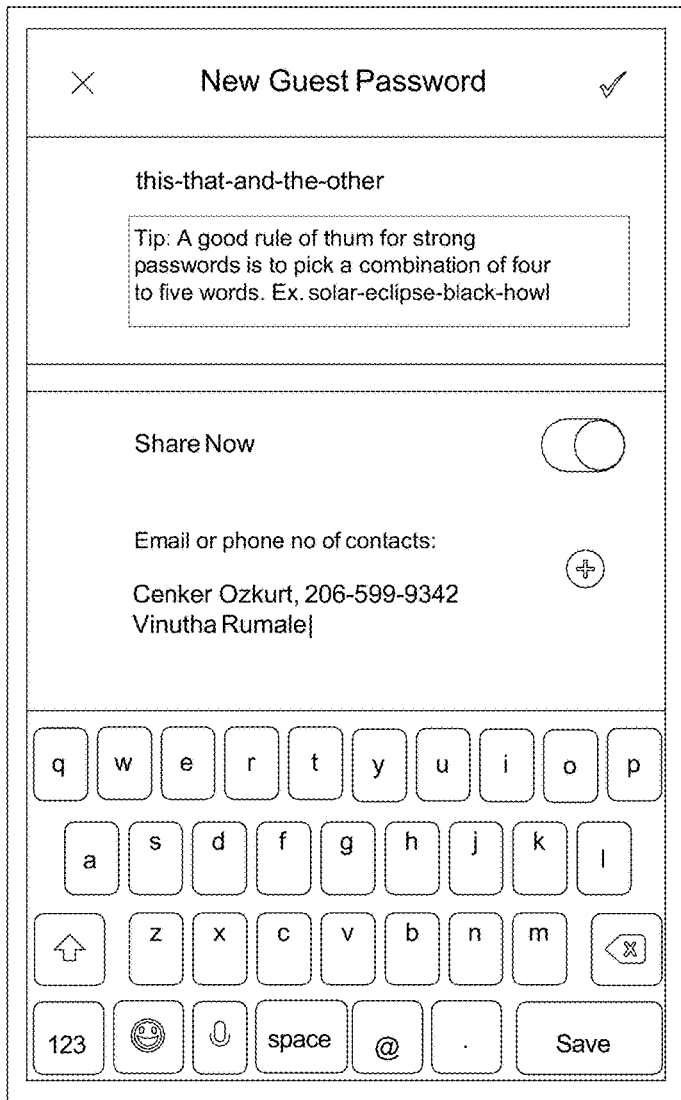
FIG. 13 is a screenshot of the new guest password and sharing thereof.
Figure 14:
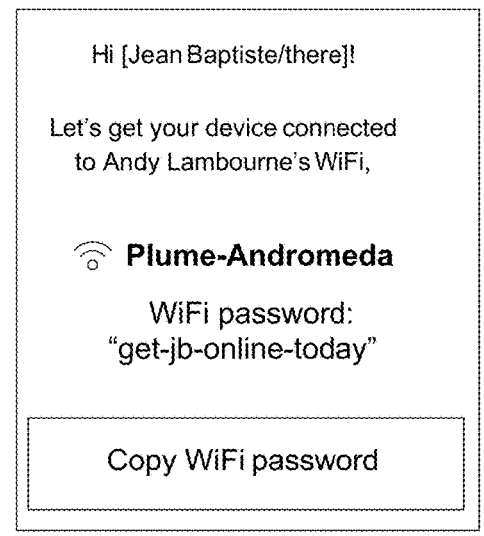
FIG. 14 is a screenshot of the Web page with a link to copy the Key (Wi-Fi password).

Back in FIG. 7, the owner provides the new key and the SSID to a guest user (step 405). FIG. 13 is a screenshot of the new guest password and sharing thereof. For example, the user device 22 can create an "invitation to join" which can be a shareable Uniform Resource Locator (URL) that points to a secure Web page containing the SSID and access zone Key for the guest user to login with. The Web page can expire after a relatively short time period. FIG. 14 is a screenshot of the Web page with a link to copy the Key (Wi-Fi password). Other embodiments are also contemplated such as a text, email, etc. Also, the Key and SSID can be automatically configured by the guest user.

Back in FIG. 7, the guest user device connects to the Wi-Fi network using the new key which determines the access zone of the guest user device (step 406). The Wi-Fi network devices have an OVSDB Wifi_Associated_Clients table with the Key used by the guest user device while connecting to the SSID. This table is maintained and shared with the cloud-based controller.

§ 5.1 Single SSID, Multiple Password Onboarding—Client Initiated

Figure 15A:
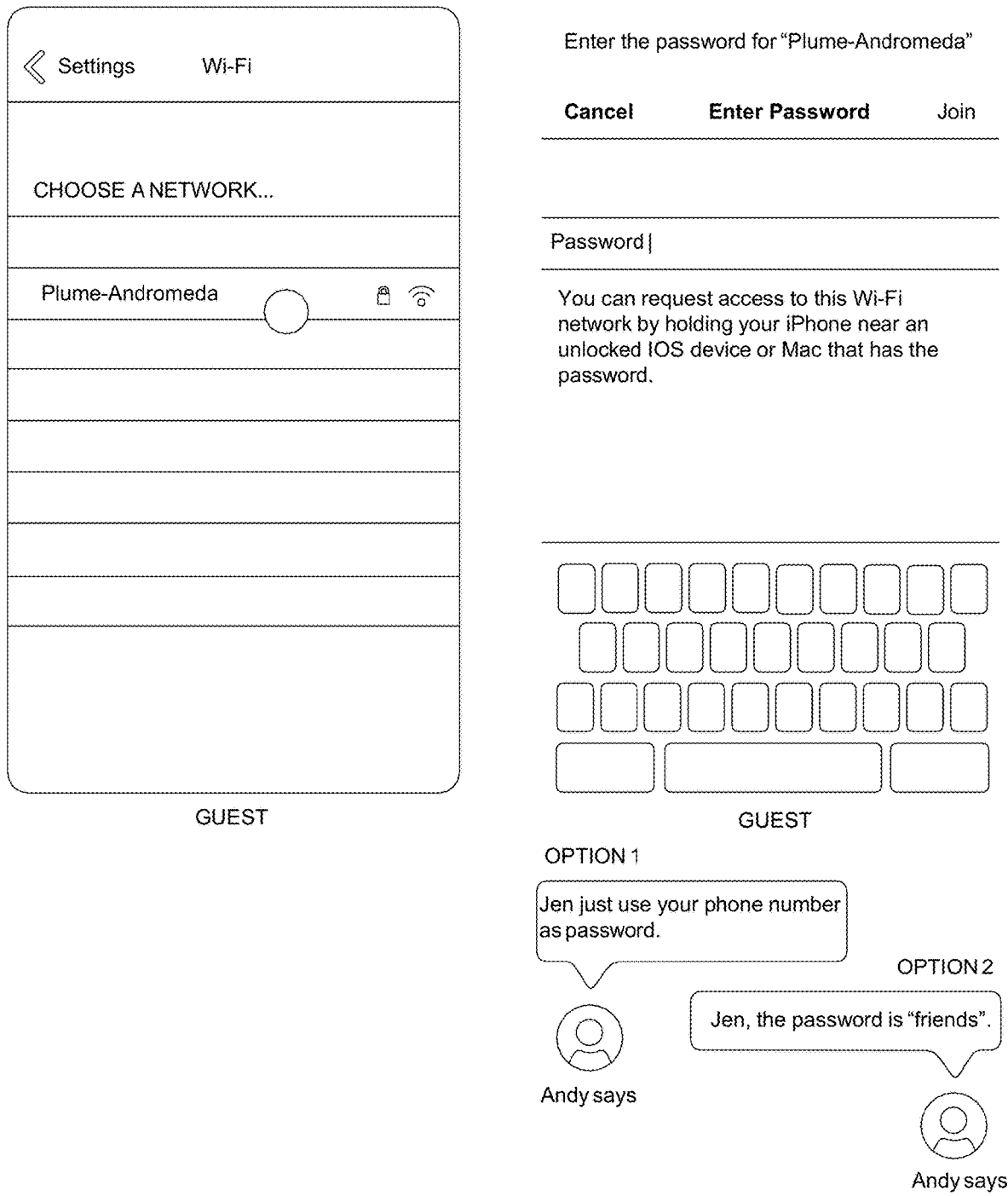
FIGS. 15A-15C are a series of screenshots illustrating a single SSID, multiple password (key) onboarding initiated by the guest client.
Figure 15B:
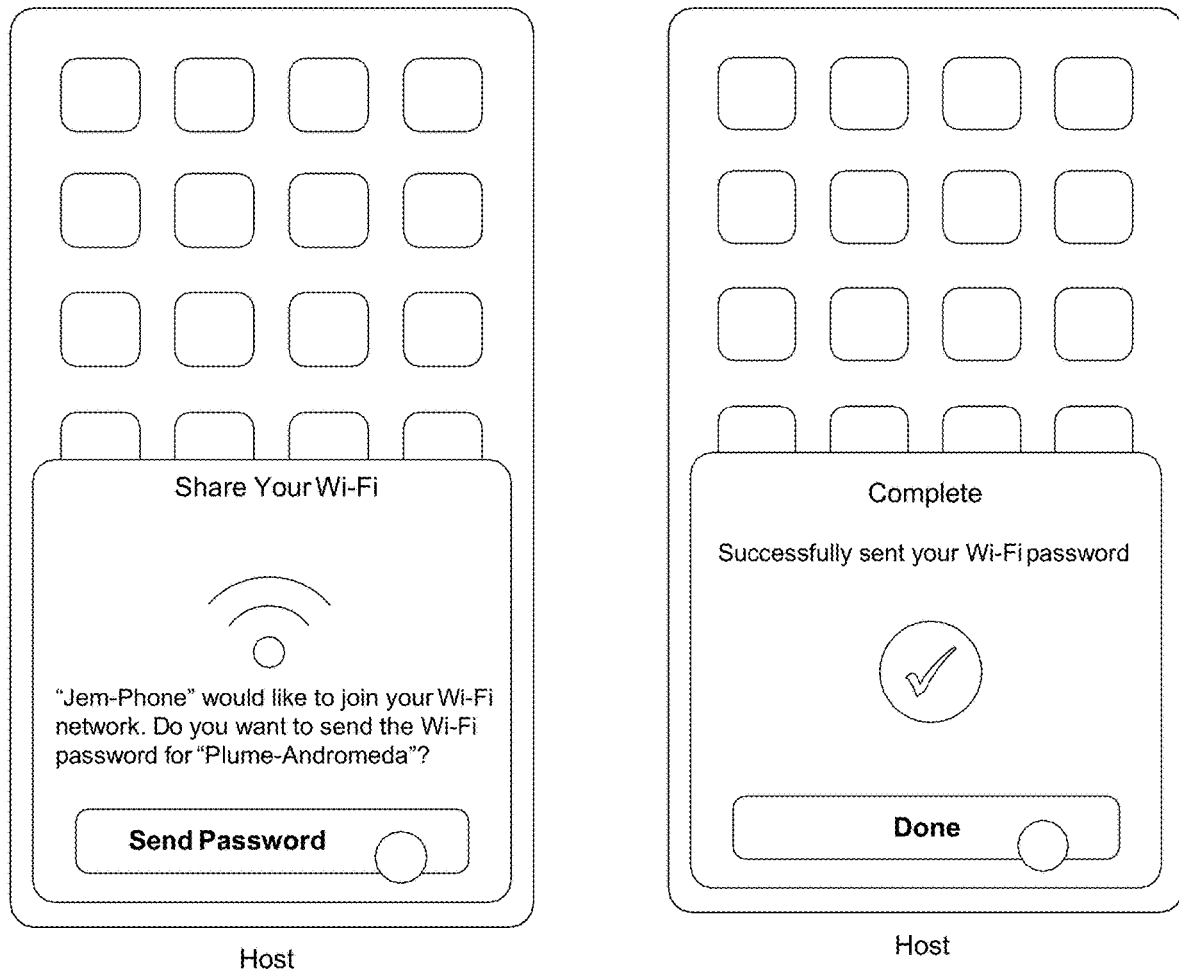
Figure 15C:
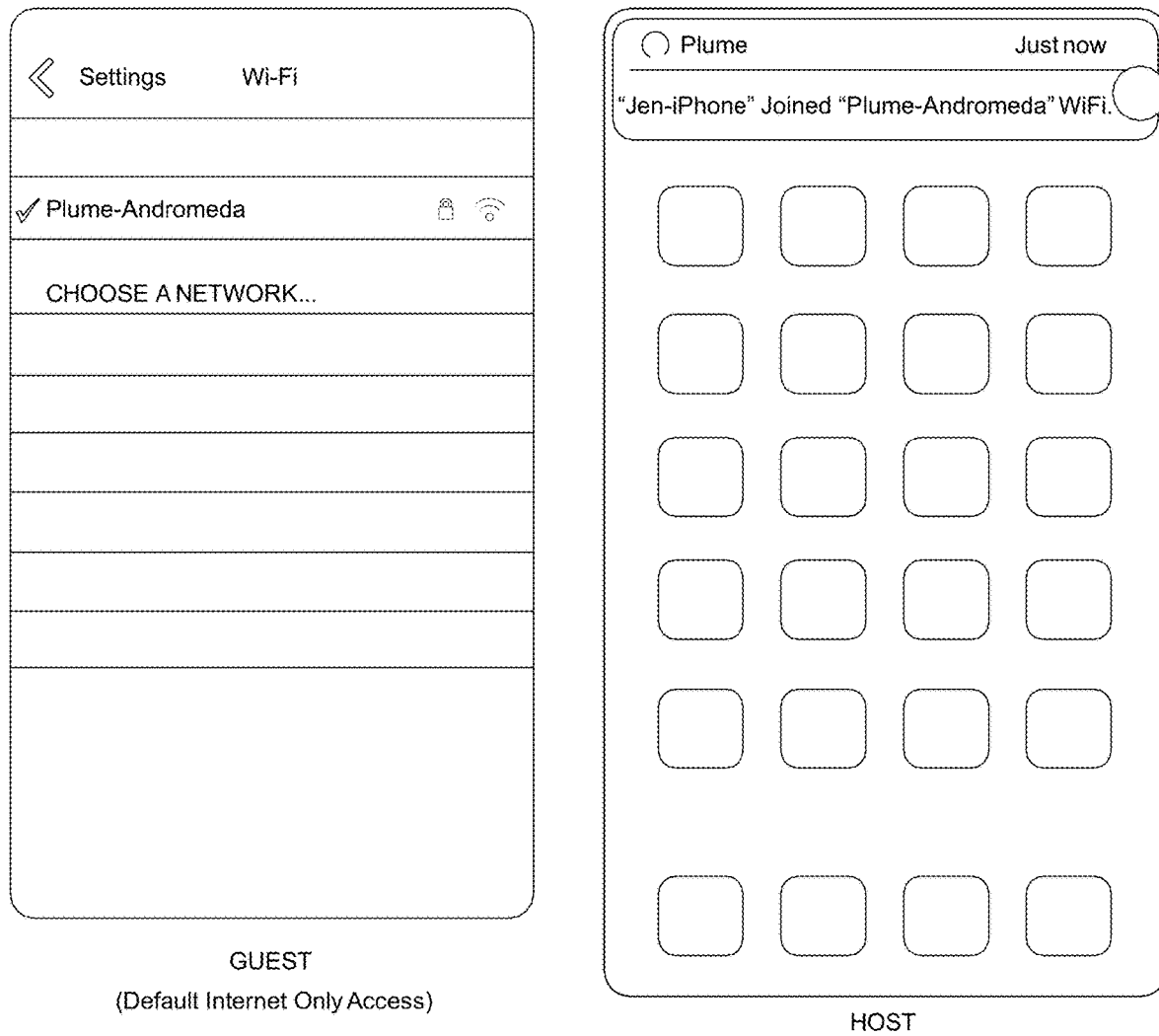

FIGS. 15A-15C are a series of screenshots illustrating a single SSID, multiple password (key) onboarding initiated by the guest client. The screenshots are performed through an app on the user device 22 (host) and a corresponding guest Wi-Fi device 16 (guest). The guest first connects to the Wi-Fi network (SSID Plume-Andromeda) and is presented with a screen to enter the password (key). The key can be the guest's phone number, email address, or some other unique information. Alternatively, the key can be provided, e.g., "friends." The host can send the password responsive to a notification that Jens-Phone (guest) wants to access the Wi-Fi network. The guest access the Wi-Fi network and the host are notified that the guest has joined the Wi-Fi network.

§ 5.2 Single SSID, Multiple Password Onboarding—Host Initiated

Figure 16:
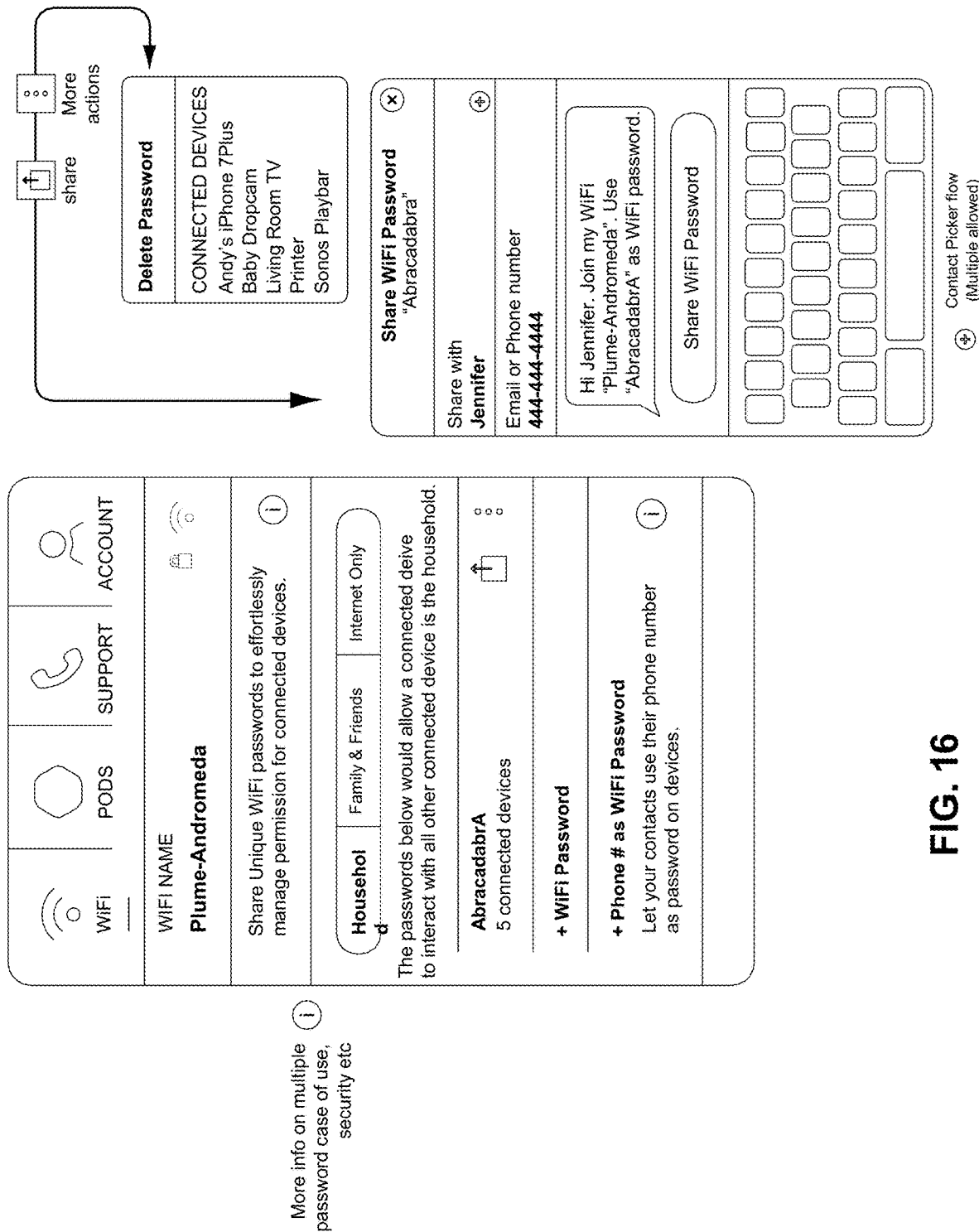
FIGS. 16-20 are a series of screenshots illustrating a single SSID, multiple password (key) onboarding initiated by the host.
Figure 17:
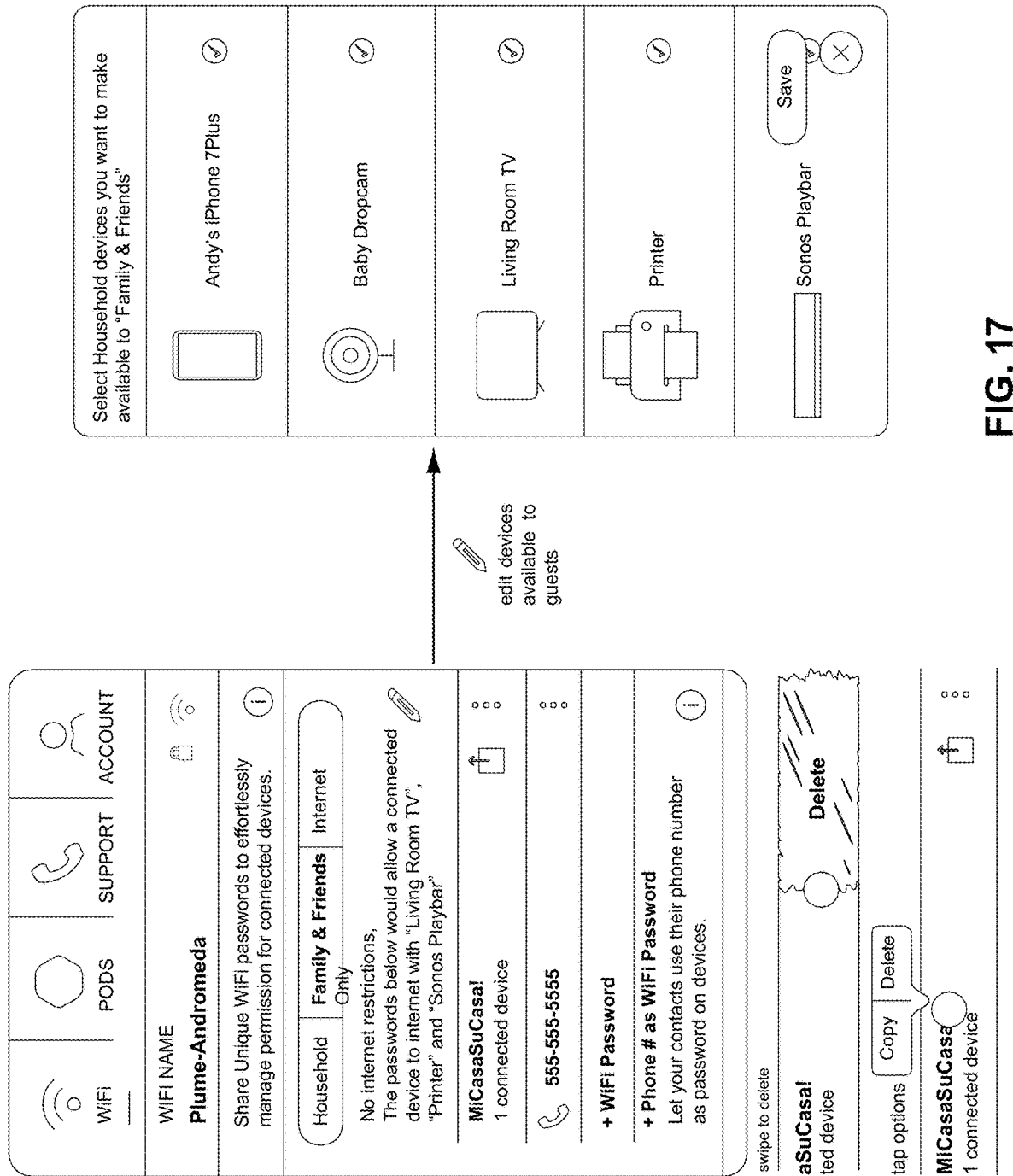
Figure 18:
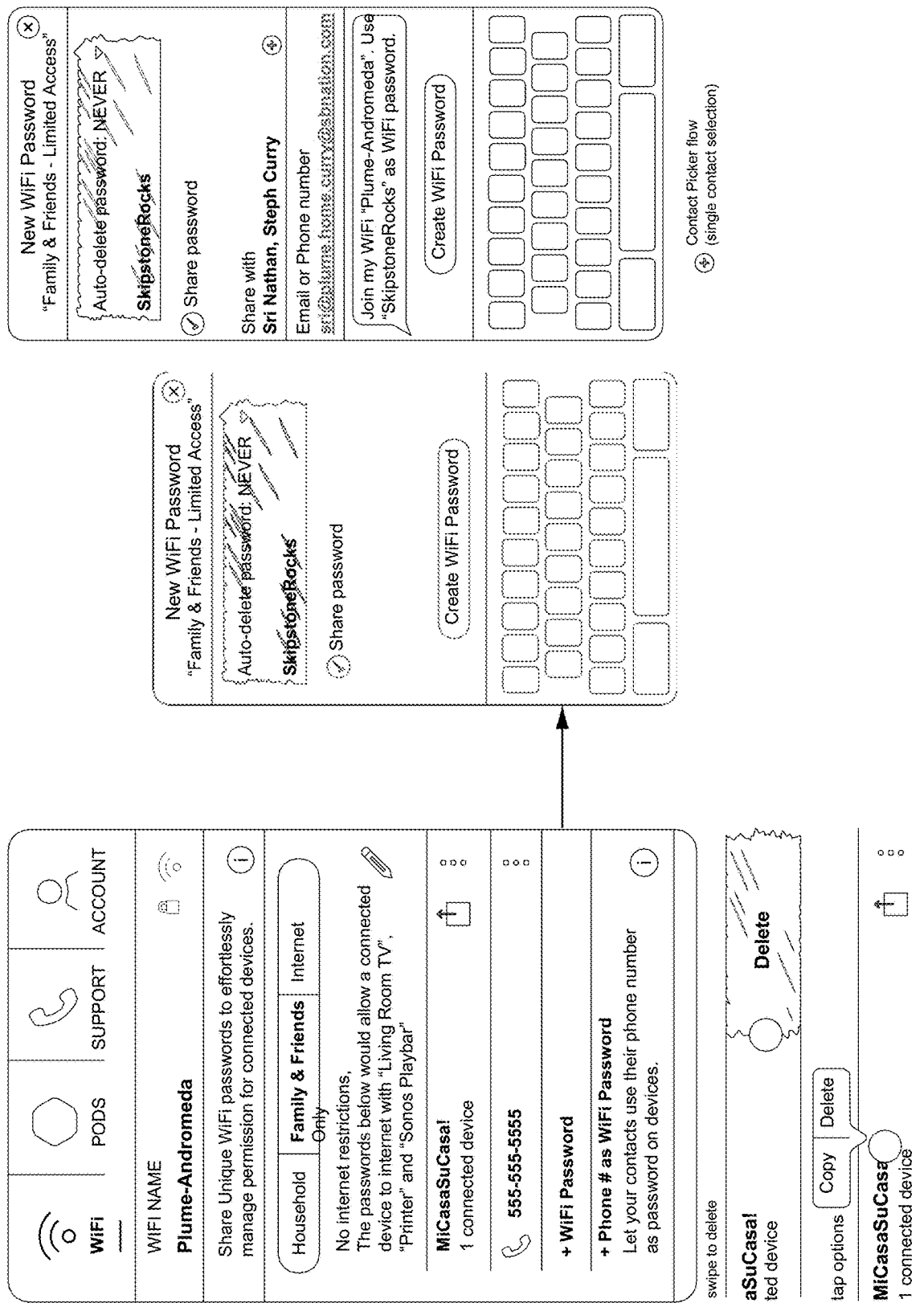
Figure 19:
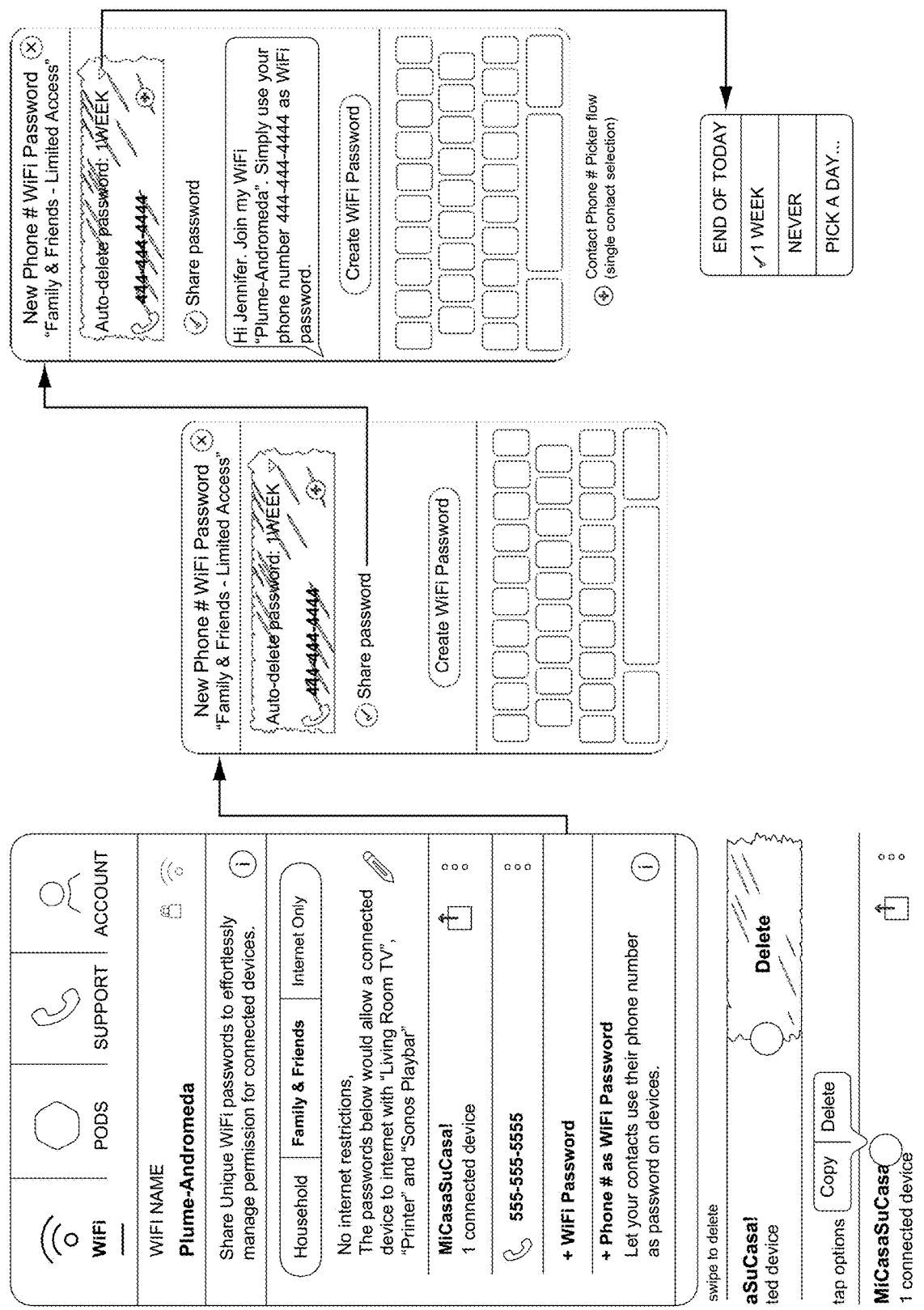
Figure 20:
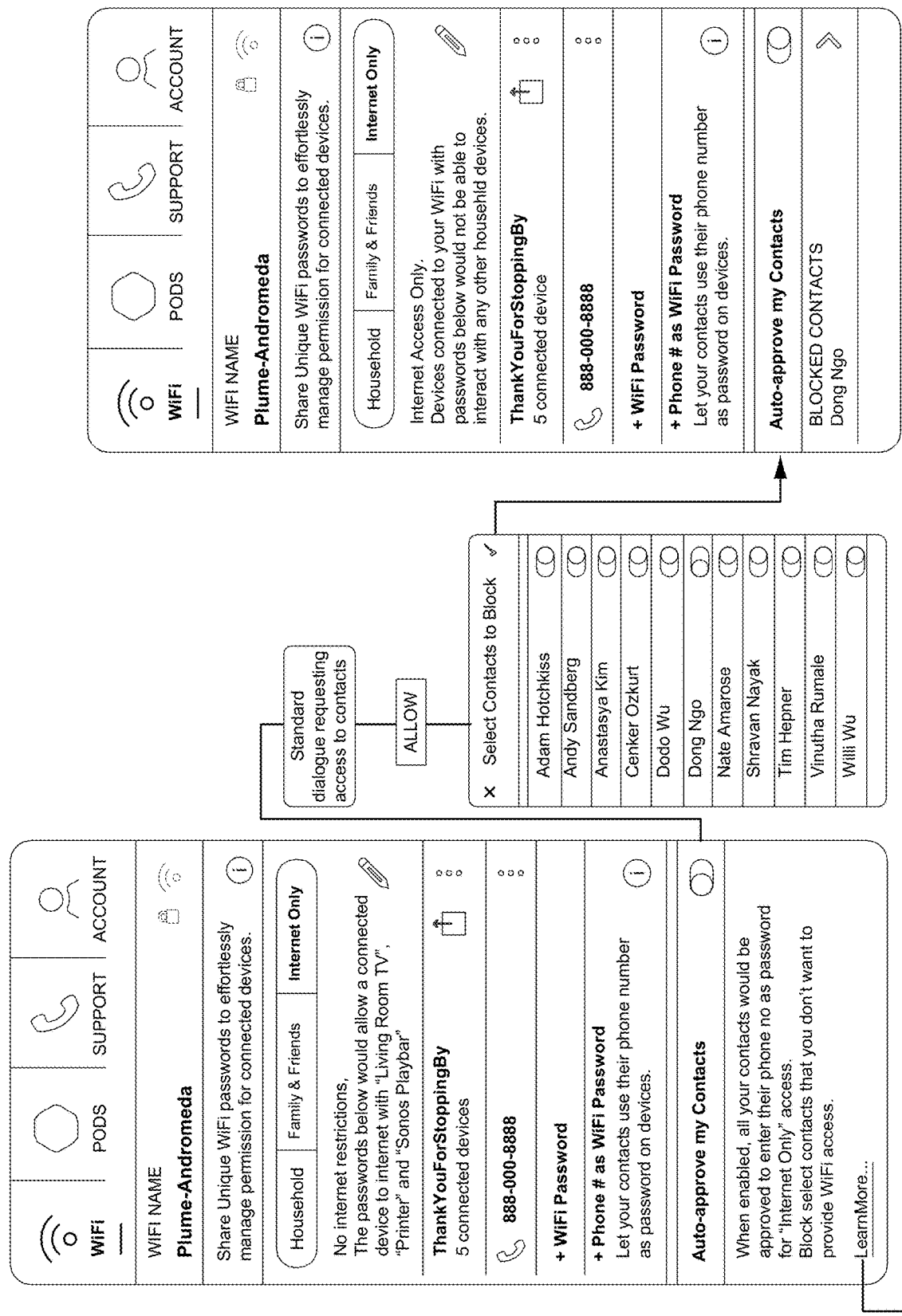

FIGS. 16-20 are a series of screenshots illustrating a single SSID, multiple password (key) onboarding initiated by the host. In FIG. 16, the host creates the key and then shares the key with designated guests. In FIG. 17, the host edits devices on the Wi-Fi network available to the guests in the Friends & Family access zone. In FIG. 18, the host creates a new Wi-Fi password (SkipstoneRocks) and shares this password with various guest users via email. In FIG. 19, the host uses a guest's phone number as a password for one week. In FIG. 20, the host can auto-approve contacts in the host's contact list for access to the Wi-Fi network, e.g., using each guest's email or phone number as the password.

§ 5.3 Single SSID, Multiple Password Onboarding—Guest Onboarding Experience

Figure 21A:
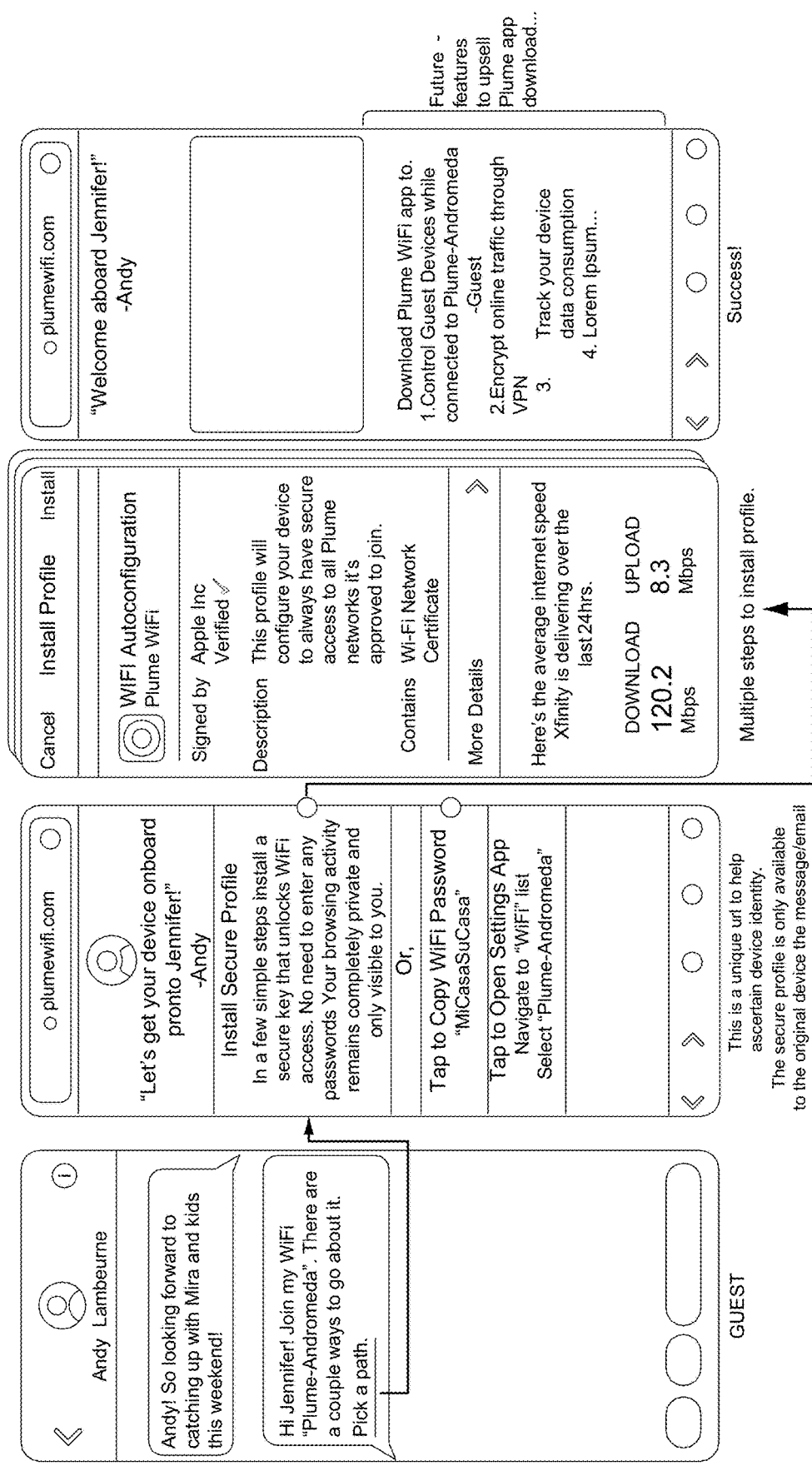
FIGS. 21A-21C and 22A-22B are a series of screenshots illustrating a single SSID, multiple password (key) onboarding from the guest's perspective.
Figure 21B:
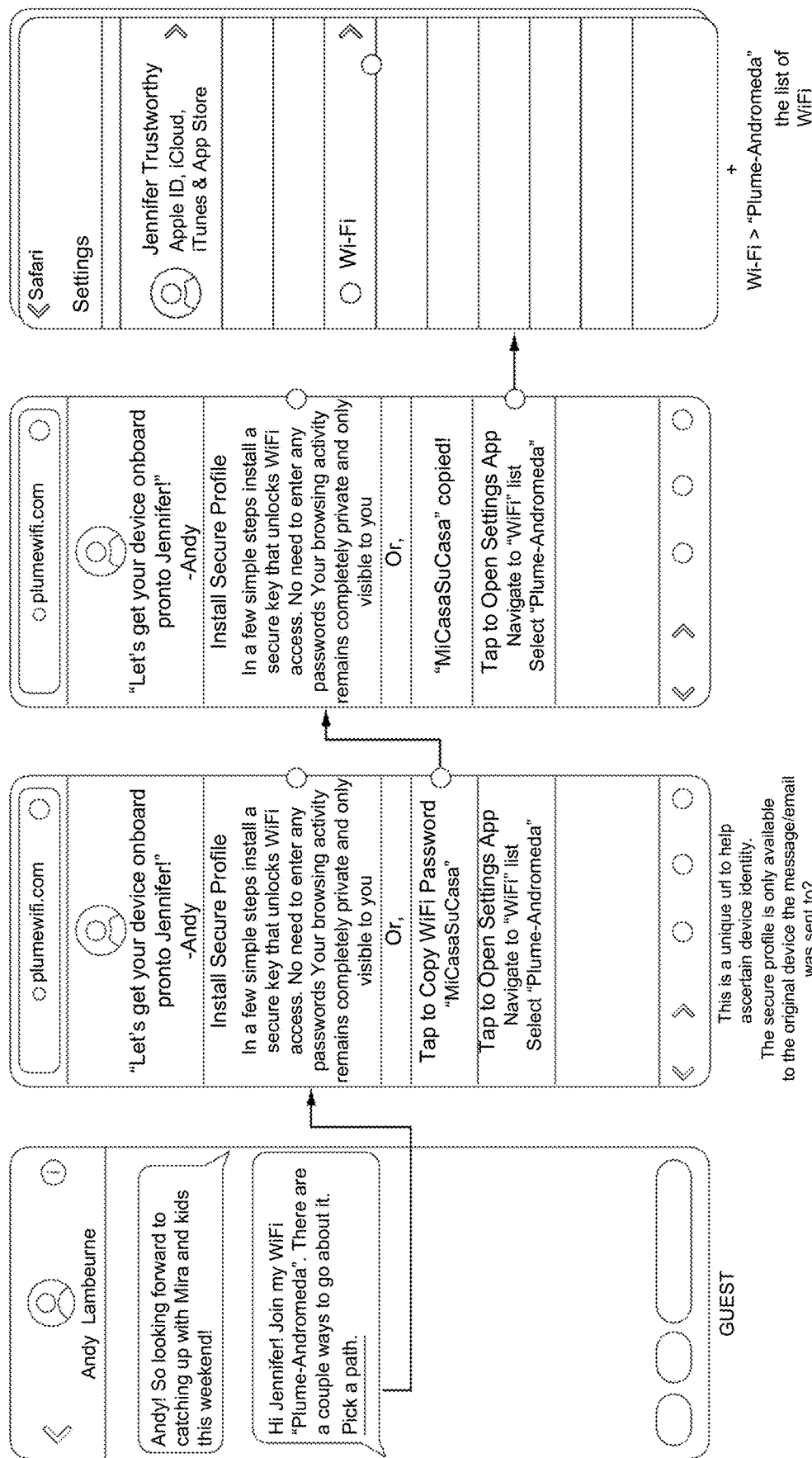
Figure 21C:
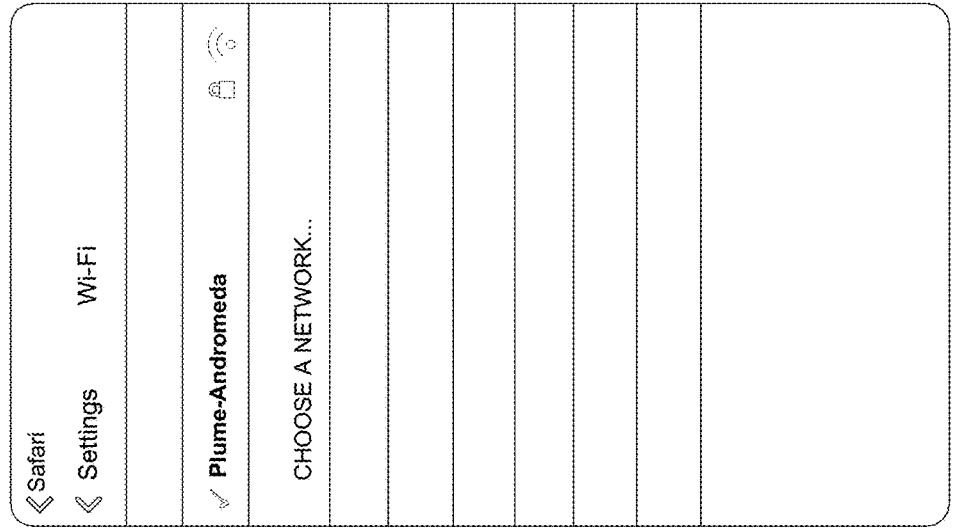
Figure 21C:
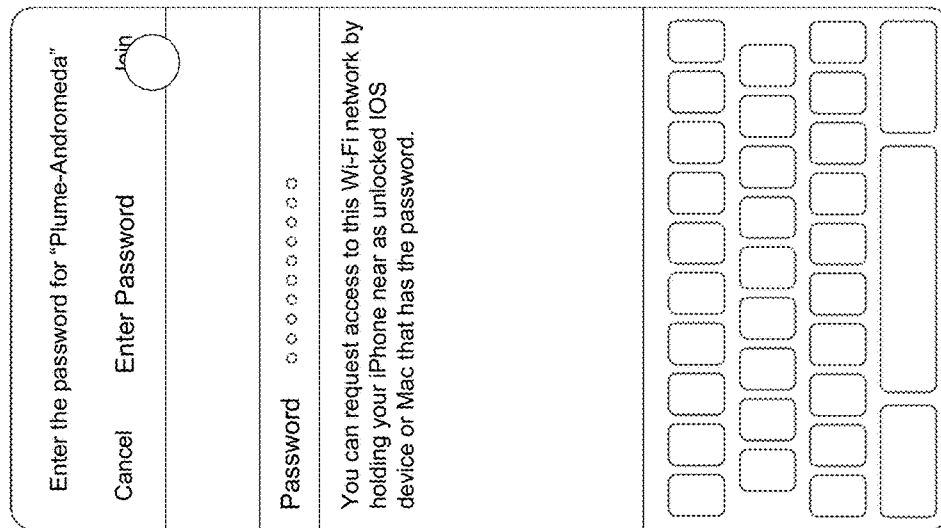
Figure 22A:
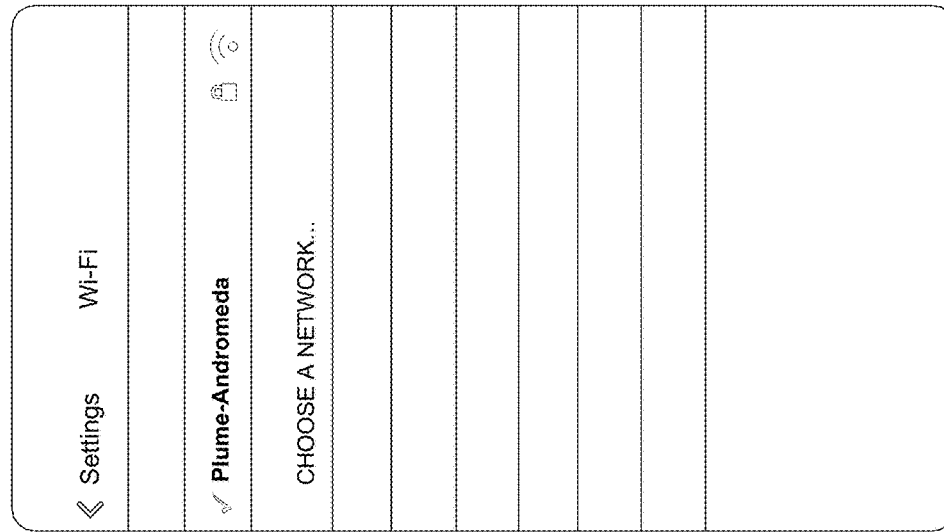
Figure 22A:
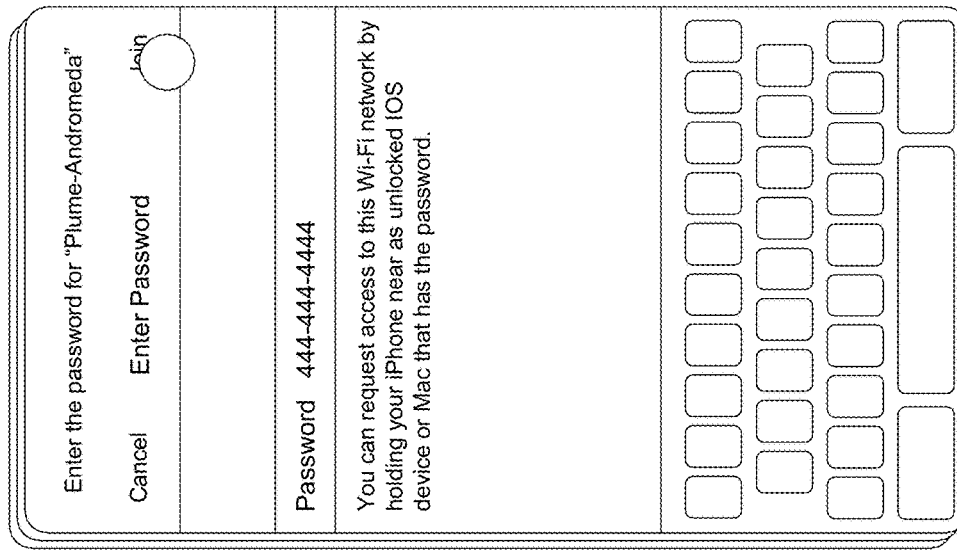
Figure 22A:
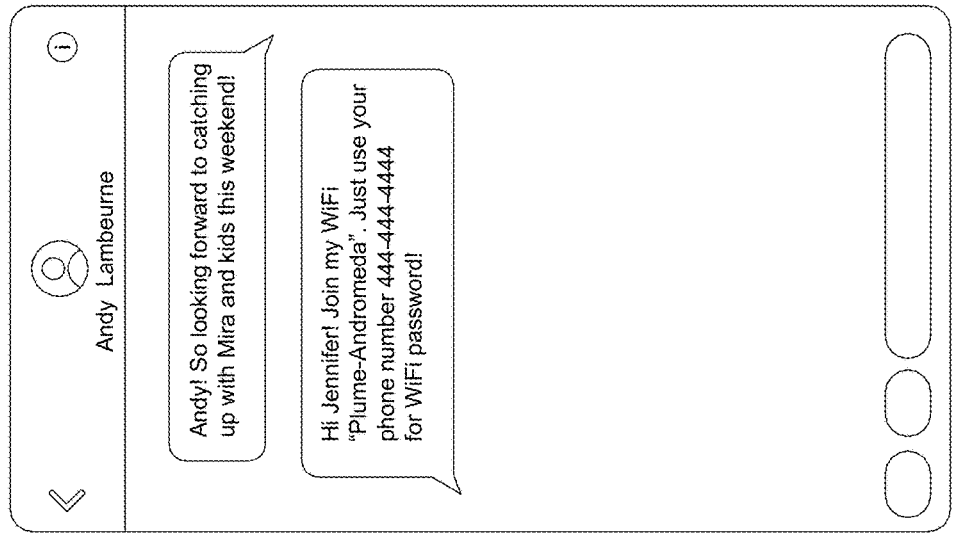
Figure 22B:
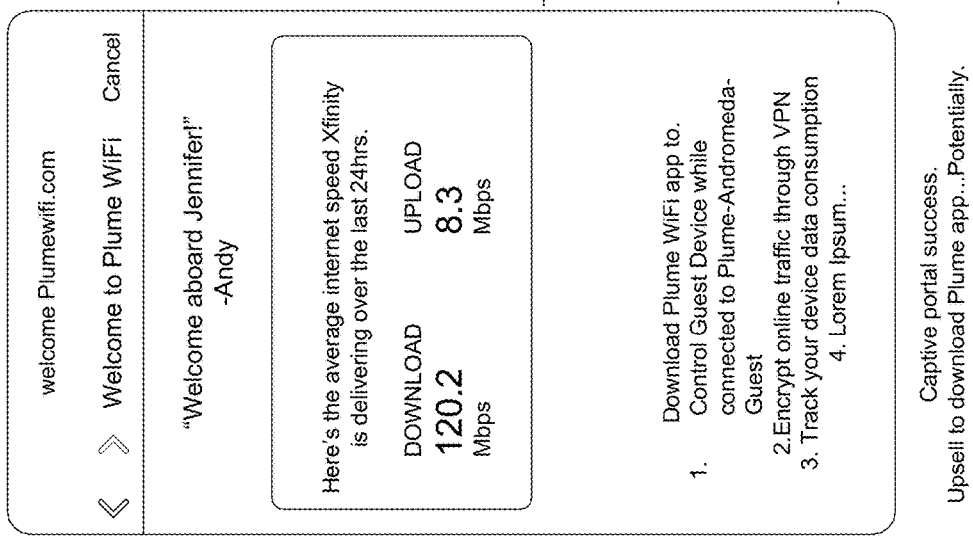
Figure 22B:
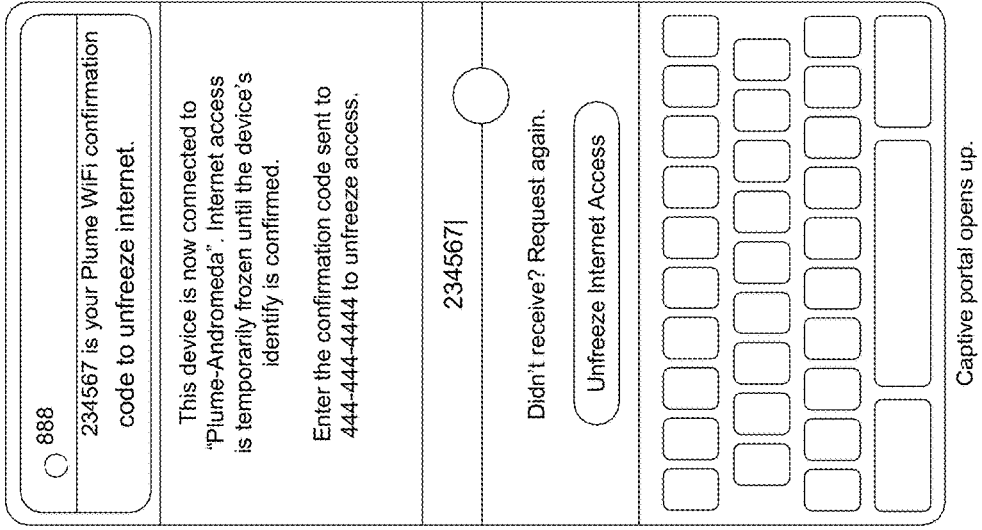

FIGS. 21A-21C and 22A-22B are a series of screenshots illustrating a single SSID, multiple password (key) onboarding from the guest's perspective. FIGS. 21A-21C illustrate a regular alphanumeric password and FIGS. 22A-22B illustrate a phone number as a password. In FIGS. 21A-21C, the alphanumeric password is sent to the guest via a text message. The guest can click on a (URL) which allows the guest to either install a secure profile (Wi-Fi certificate) or copy the password. In FIGS. 22A-22B, the guest can use their phone number for the key.

§ 5.4 Host Management

Figure 23A:
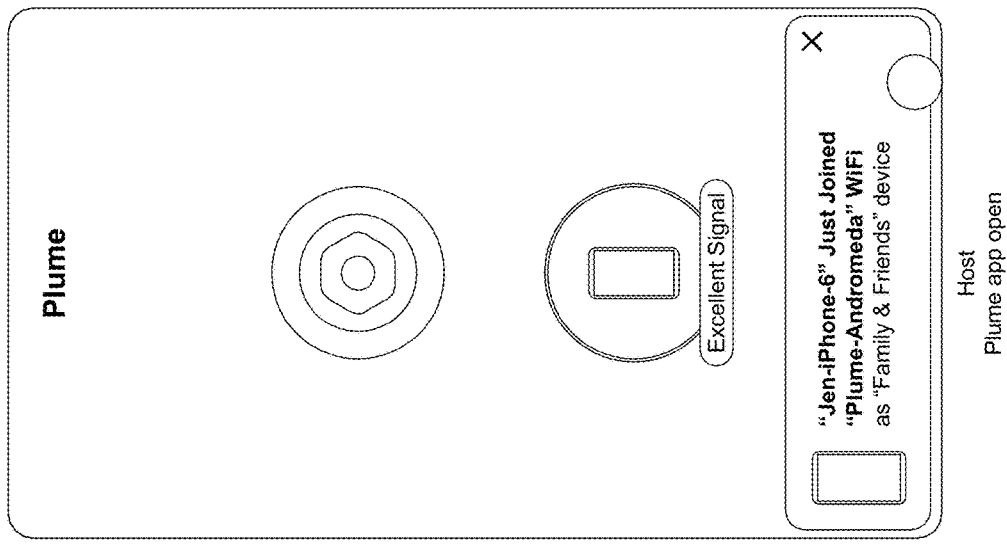
FIGS. 23A-23B and 24A-24A are a series of screenshots illustrating new device join notification (FIGS. 23A-23B) and guest device management (FIGS. 24A-24B).
Figure 23A:
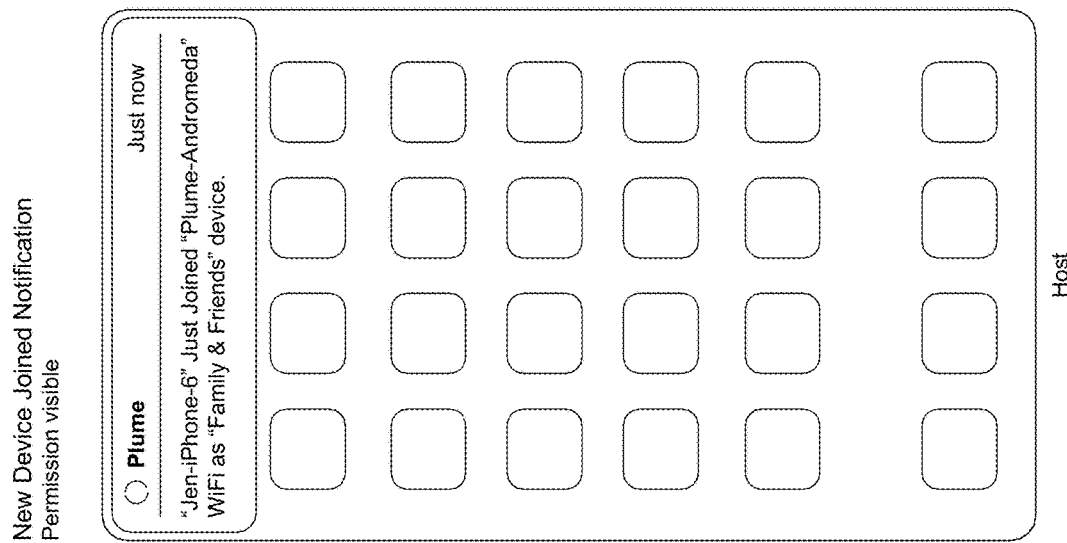
Figure 23B:
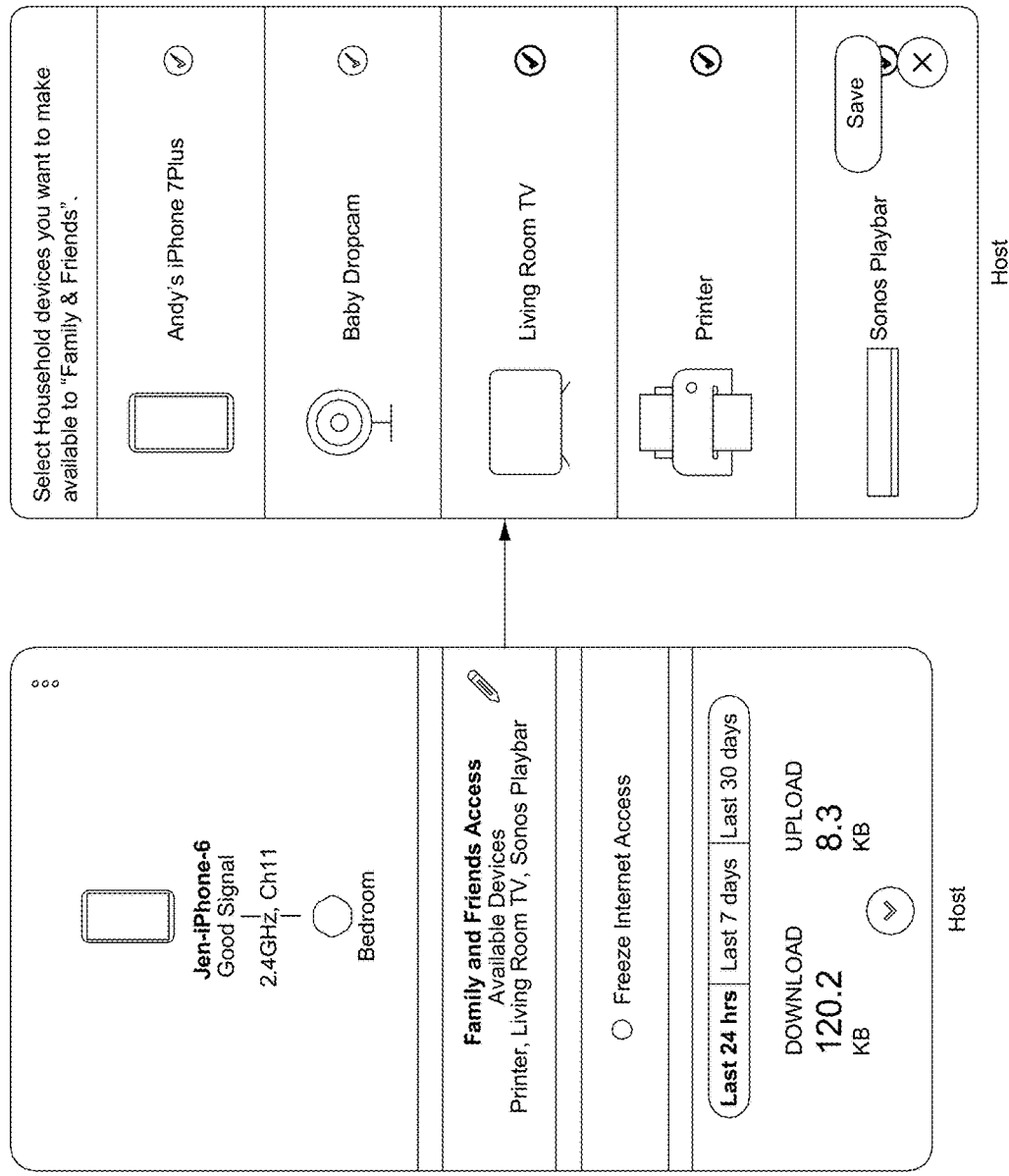
Figure 24A:
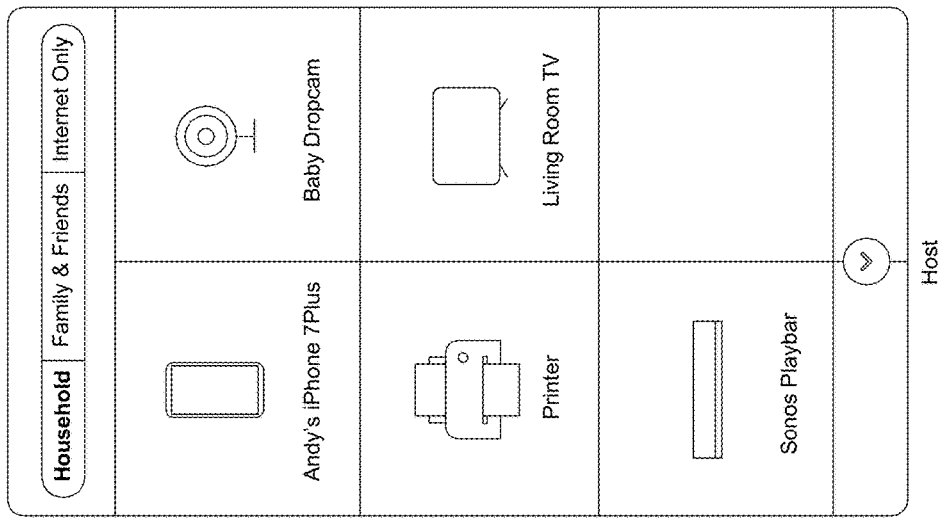
Figure 24A:
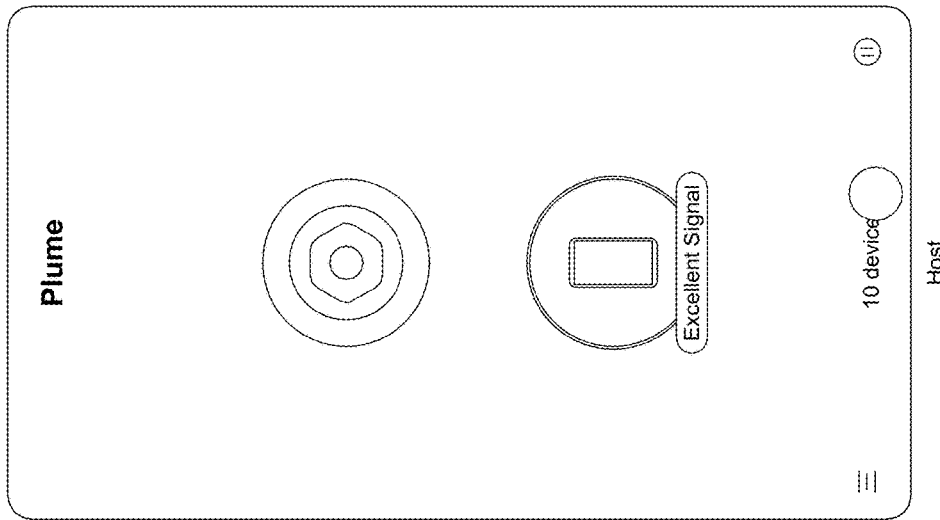
Figure 24B:
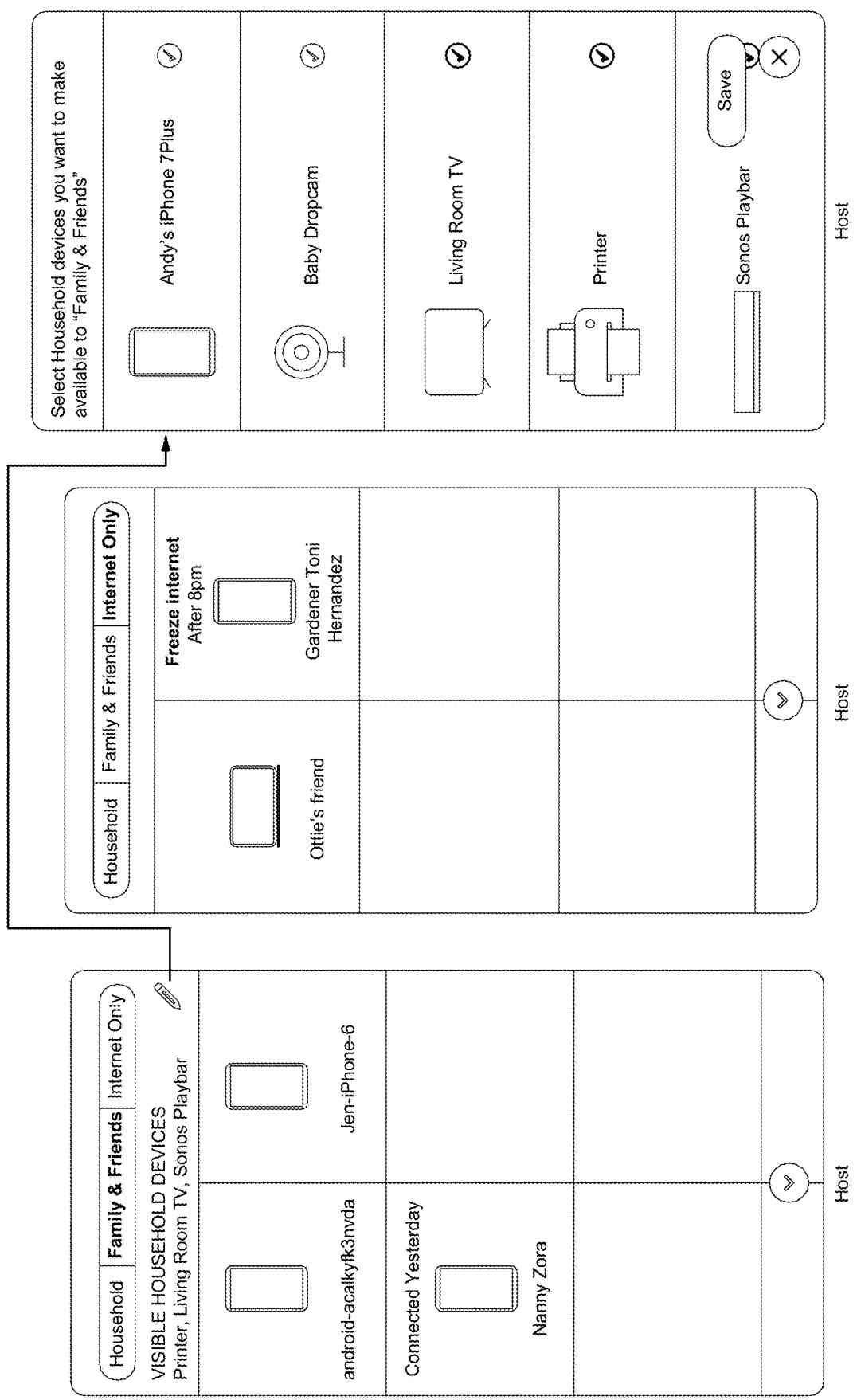

FIGS. 23A-23B and 24A-24A are a series of screenshots illustrating new device join notification (FIGS. 23A-23B) and guest device management (FIGS. 24A-24B). These screenshots are displayed to the host notifying new guests have joined as well as displaying activity and access zone capability.

§ 5.5 Passwords

As described herein, a password (key) for each access zone may be generated by the host. There can be any number of passwords for each access zone, although the count may be limited for practical purposes. For each access zone, a Wi-Fi password may be edited by the host. For each access zone, the user may disable any of the Wi-Fi passwords. When the disabling takes place, all devices that had connected using that password will be kicked off and the password removed. The Wi-Fi password may then be subsequently re-enabled, and all devices using that password are then allowed to reconnect automatically. For each Access zone, host user may delete any of the Wi-Fi passwords. When the delete takes place, all connected devices using that password will be kicked off the password removed. The time to add, edit, delete, disable or re-enable a password for any access zone can be less than 2 seconds before it becomes active on the Wi-Fi network, through the cloud-based controller.

The host can also disable or delete the original Home password. However, the last home password cannot be disabled or deleted. When the original home password is disabled, then the next oldest password becomes the primary password.

§ 5.6 Device Permissions

The host is able to select which devices on the Home access zone are allowed to communicate with devices connected to the Guests access zone. Devices that are selected have full layer 2 connectivity to the other devices on the Guest network. The host is able to deselect at any time the devices on the Home access zone that are allowed to communicate with the devices connected to the Guests NHA network. The selections and de-selections of Home AZ devices that are visible from the Guests NHA network can be applied to the Wi-Fi network within 3 seconds of making the selection, through the cloud-based controller. Similarly, devices may be added to or removed from any of the other access zones following the rules just described.

Devices connected to the Home access zone shall be able to see each other automatically. If a device is connected via Home access zone password, then it is a Home device, but if that same device connects with a Guest password, then it is now a Guest device and does not show up as a visible Home device. Devices connected to the Guests NHA access zone can be able to see each other automatically. Devices connected to the Internet Only access zone will be isolated from each other.

§ 5.7 Internet Only Access Zone

If a Wi-Fi client device 16 connects to the SSID using a key for the Internet only access zone, the Wi-Fi client device 16 should not see other devices on the same network/subnet and other Wi-Fi client devices 16 should not see the Internet Only access zone devices. There are two approaches for enforcing this—access lists in OpenFlow and Virtual Local Area Networks (VLANs).

§ 5.8 Implementation of Access Zones at the Networking Level

The network must control the flow of packets according to the access zones of the device originating the traffic, as well as the destination of the traffic. For example, the network must allow packets from an Internet Only zone device to travel from or to the Internet connection, but must block any packets that are destined for other devices in the home. This control is implemented via switching rules within the networking devices. Each access point 14 in a multi-AP environment, or the single access point 34 in a single AP environment contains a switch which is used to direct packets between ingress ports (reception) and egress ports (transmission). This switching control is controlled by switching tables that can direct arriving traffic to any number of egress locations. The switching control can also drop the packet, if there is no appropriate place for the traffic to be sent, or redirect the traffic, for example to a captive portal as described earlier.

There are a variety of ways of controlling and programming such switches known in the art. In the preferred embodiment, a Software Defined Network (SDN) is used for this purpose. Software Defined Networks, for example via an Open Virtual Switch (OVS), are particularly flexible and easily programmed dynamically, making them appropriate for this application. In the case of OVS, OpenFlow rules are used to specify the forwarding rules for packets from and to devices in the various access zones. Wi-Fi and Ethernet packets clearly identify their source and destination by MAC addresses. These MAC addresses are what the switch uses to identify source and destination, and therefore chose the correct action for the arriving packet. The OpenFlow rules are held within each access point 14, 34 or networking device within a database. In the case of OVS, the database within the device is the OVSDB. The rules within each OVSDB table are programmed by the cloud, specific to that access point and how that access point is connected into the Wi-Fi network. These tables hold the forwarding rules for all packets, including packets that violate the zone restrictions, and the proper forwarding ports for packets that are legitimate. The sequence is therefore that an app on the user device 22 or the like connects to the server 20 in the cloud 12 to specify the zones, keys, etc. The cloud 12 then configures the OVSDB tables in all of the access points 14, 34 to enable the OVS switch to implement the rules as desired.

The solution just described implements the access control in a distributed way, on each networking device in a distributed network system, rather than in a single networking device, for example, the gateway. This distributed switching control has a number of advantages. First, it supports blocking of extremely local traffic, for example between two devices, both connected to the same access point 14, but which should not be able to pass traffic to each other. Were the forwarding rules implemented only on the gateway in a distributed Wi-Fi system 10, such local traffic might not be routed through the gateway. In that case, the forwarding rules would not have a chance to block the traffic, and barred communication between devices in different access zones could occur. Second, it is efficient regarding network traffic flow by blocking illegal traffic (violating the access zone rules) at the first opportunity. Otherwise, illegal traffic would have to be carried through the network to the centralized gateway before the traffic would be identified as illegal and dropped. Similarly, a solution to the previously described problem of local traffic circumventing the forwarding rules would be to route all traffic to the gateway before passing it on to the destination. While this would allow the blocking of very localized traffic by the forwarding rules, it would be inefficient on network resources, requiring all traffic, even traffic destined for a device connected to the same access point, to be passed through the entire network to the gateway, and then passed back down again.

Again, each device in the Wi-Fi network can be managed using OpenFlow. For access lists, traffic is manipulated with an OpenFlow manager so that Internet Only clients can only reach a gateway along with various rules. On the device a guest client is connected, an access list is applied for Address Resolution Protocol (ARP) and IP traffic at the Ethernet level. For unicast traffic, two rules are needed—unicast traffic is only allowed between the client and gateway, and other unicast traffic is dropped. The ARP traffic is only broadcast to the gateway and replies only from the gateway. Also, to isolate the Internet Only access zone devices, the broadcast domain must be separated. A first approach can include redirecting broadcast traffic over proxies as unicast traffic to the gateway. A second approach can include rewriting the address of the broadcast to a unicast address of the gateway.

For VLANs, each client or group of clients can be tagged with VLAN, with which we separate broadcast domains. Tagged traffic is then transparently switched over the network encapsulated inside Generic Routing Encapsulation (GRE) tunnels towards the gateway. On the gateway itself, this VLAN with can be terminated with different subnet than other clients. This can also be a subnet of whole network using mask 30. Or it can proxy to the original. This subnet would then have only Network Address Translation (NAT) option on the gateway, without the possibility of intervlan routing to other networks.

§ 6.0 Wi-Fi Network in a Business Deployment

Again, the distributed Wi-Fi system 10, the single access point system 30, the Wi-Fi mesh network 32, and the Wi-Fi repeater network 33 can be deployed in a business location, i.e., office, store, warehouse, or any physical location. The same hardware and all of the same functionality described above can apply to the Wi-Fi networks in a business deployment. The business deployment does have differences from a home deployment including the fact that the Wi-Fi client devices 16 may come and go more often. However, the main principles are similar with respect to the access zones described herein. The home deployment described a home access zone, a guest access zone, and an Internet access only access zone. For a business deployment, there can be a secure access zone, an employee access zone, and a guest access zone. Similar functionality described herein for the home deployment can apply to the business deployment.

§ 6.1 Business Access Zones

The secure access zone can include sensitive devices and restrictive access. The employee zone is meant for a business's employees who have a need to access more secure resources, e.g., file shares, hosted applications, etc. The guest zone is meant for a business's customers, visitors, partners, etc. and is meant to have Internet access only and possible access to some devices, e.g., printers, streaming media devices, etc.

The following description is provided with these three zones. Those of ordinary skill in the art will appreciate the present disclosure contemplates a plurality of zones, such as only two zones, e.g., an employee/secure zone and a guest zone, as well as more than three zones. The description of the secure access zone, the employee access zone, and the guest access zone is presented for illustration purposes. Also, the description herein may simply refer to each as a "zone" without access, and that should be considered equivalent to the description herein referencing the access zones.

In an embodiment, each zone may have a unique SSID for the users to see separately. Although, the implementation of the business access zones can equally use a single SSID as described herein with respect to the home access zones. Having different SSIDs is more secure, and naturally leads network management to set things up correctly. Stated differently, having a single SSID is important for simplicity in the home, but less likely in a business Wi-Fi network.

§ 6.2 Business Zone Connectivity Via Two-Step and Two-Party Access

As described herein, the business zone connectivity can be referred to as two-step step access and two-party access. Again, the approach described herein is referred to as two-step, two-party access for the Wi-Fi network, e.g., the distributed Wi-Fi system 10, the single access point system 30, the Wi-Fi mesh network 32, and the Wi-Fi repeater network 33.

Figure 25:
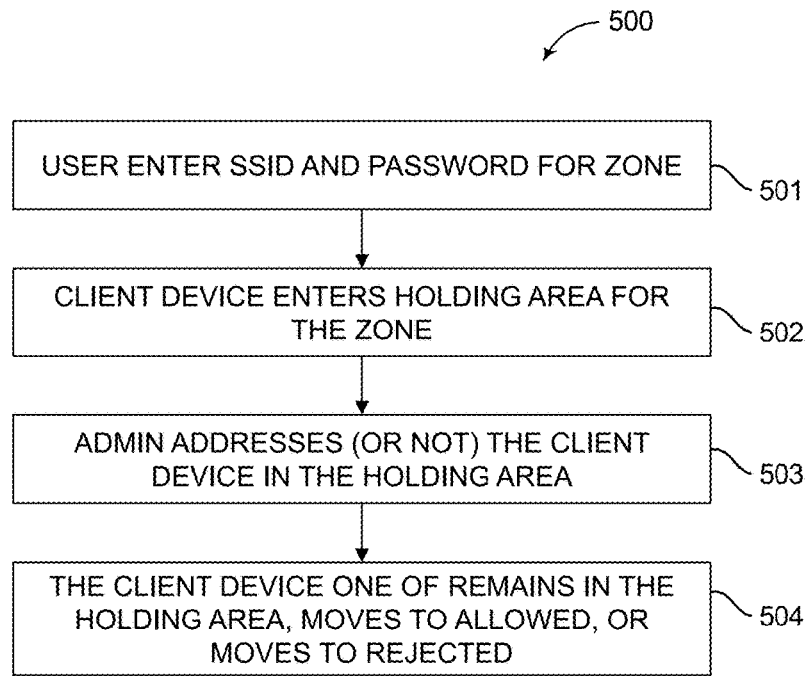
FIG. 25 is a flowchart of a two-step, two-party Wi-Fi network access process.
Figure 26:
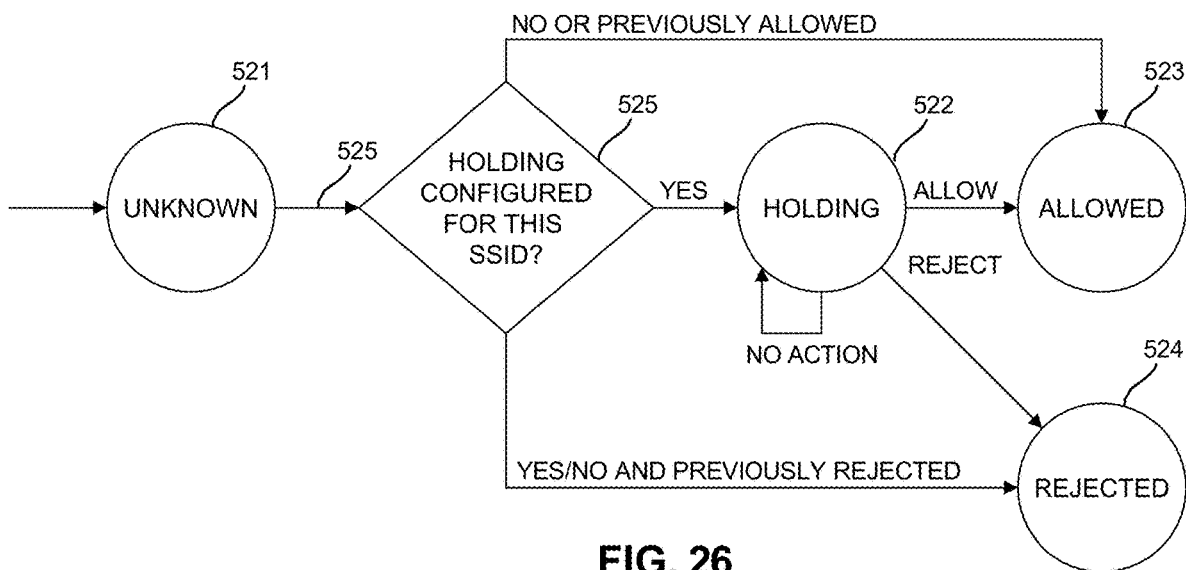
FIG. 26 is a state diagram of states and associated actions in a holding area of a zone.

FIG. 25 is a flowchart of a two-step, two-party Wi-Fi network access process 500. FIG. 26 is a state diagram of states and associated actions in a holding area of a zone. Again, this approach is referred to as two-step, namely SSID+password and the holding zone, and two-party, namely the user entering the SSID+password and the network administrator addressing the holding zone. The Wi-Fi network access process 500 includes a user of a Wi-Fi client device 16 entering an SSID and password for a zone of a Wi-Fi network (step 501). This is the first step of the two-steps and the first party (the user) of the two-party.

The Wi-Fi network access process 500 is described with reference to a generic zone. The zone in the Wi-Fi network access process 500 can be any of the zones described herein, including the zones for the home deployment, i.e., the home access zone, the guest access zone, or the Internet access only access zone. In a business deployment, the zone can be the secure access zone, the employee access zone, or the guest access zone. Again, the business deployment can have two zones as well, e.g., a secure/employee access zone and a guest access zone, as well as more than three zones.

There is an initial password required to access the zone, namely the SSID and the password for the first step. The initial password can be the same for all users and all Wi-Fi client devices 16 on a given SSID (zone). Of course, this approach is not the most secure, but it provides simplicity, while still requiring some degree of protection from random people obtaining free Internet access. That is, the shared password is used for simplicity because there is a second step and a second party involved for full access. The idea is a business deployment would post or otherwise make available the SSID and password to employees, customers, visitors, contractors, partners, etc. There is a balance between user experience and security here. That is, there is a need to widely distribute the SSID and password to a large number of users.

Upon entering the SSID and password, the Wi-Fi client devices enters a holding area for the zone (step 502). This holding area can be referred to as "purgatory," i.e., a state of limbo, in-between, etc., with some level of access to resources associated with the zone, but not full access. In between the two-steps by the two-parties, new Wi-Fi client devices 16 are place in the holding area.

The Wi-Fi network access process 500 contemplates operation at or in a combination of the access points 14, 34, 36, 38 in the Wi-Fi network and the cloud 12. In an embodiment, the Wi-Fi network access process 500 is performed at a single access point. In another embodiment, the Wi-Fi network access process 500 is performed across multiple access points, such as in the distributed Wi-Fi system 10, the Wi-Fi mesh network 32, and the Wi-Fi repeater network 33. In a further embodiment, the Wi-Fi network access process 500 is performed in the cloud 12 and/or via the server 20. When the Wi-Fi network access process 500 is performed in the cloud 12 and/or via the server 20, the cloud 12 and/or the server 20 can receive information from and forward configurations to the associated access points for implementation of aspects of the Wi-Fi network access process 500. Other configurations are also contemplated. That is, the functions performed with the Wi-Fi network access process 500 can be performed at any of the locations shown in FIGS. 1 and 2.

As part of the Wi-Fi network access process 500, there is a requirement to track the Wi-Fi client devices 16 for the purposes of uniquely identifying each device. That is, is this a new device to the zone in the Wi-Fi network that first joins and needs to be placed in the holding area. Conversely, is this a device that has already connected to zone in the Wi-Fi network and needs to be placed in the appropriate area (i.e., holding, allowed, rejected). In an embodiment, the Wi-Fi client devices 16 can be tracked and uniquely identified based on their Media Access Control (MAC) addresses. In another embodiment, such as where the Wi-Fi client device 16 utilizing MAC randomization, it is possible to use other information such as a hostID, user provided information, etc. In a further embodiment, such as where the Wi-Fi client device 16 utilizing MAC randomization, it is possible to just identify the device with the randomized MAC address just for the session. In yet another embodiment, it is possible to use other information such as a hostID, user provided information, etc.

Once a user has connected the Wi-Fi client device 16, an administrator of the Wi-Fi network is notified. This can be via a holding message, email, push notification, in-app notification, text message, etc. This can also be via updating a dashboard listing, network monitoring software, etc. That is, the notification can be a push notification to the administrator or a pull notification where the administrator goes to a dashboard. The notification includes information about the Wi-Fi client device 16 in the holding area, such as device type, hostname, whether the device has been in the holding area before (or any other history of the device with the Wi-Fi network), possibly a username or other personal identifier such as gathered by a captive portal or splash page, and the like.

The administrator can address the Wi-Fi client device 16 in the holding area or simply ignore it and leave it there (step 503). This is the second step of the two-steps and the second party (the administrator) of the two-party. Based on the action of the administrator, the Wi-Fi client device 16 one of remains in the holding area, moves to an allowed area, and moves to a rejected area (step 504). The administrator is someone who has management control of the Wi-Fi network, i.e., a network manager. In a business deployment, the administrator may be the business owner, an office manager, an IT administrator, etc. In a home deployment, the administrator may be the homeowner.

With Wi-Fi client devices 16 in the holding area in the zone, the administrator can approve the Wi-Fi client device 16 (move it to the allowed area), can disapprove the Wi-Fi client device 16 (move it to the rejected area), or take no action (let it remain in the holding area). For the zone, the approved area, the Wi-Fi client device 16 has full rights to the zone for which they have connected, including access to devices, the Internet, etc. The disapproved area means the Wi-Fi client device 16 gets no access rights at all. The Wi-Fi client device 16 is shown connected (as they had the correct password) in management tools, but the Wi-Fi client device 16 is not allowed to send or receive traffic to/from any destination or device, including Internet access.

In the holding area, the Wi-Fi client device 16 is waiting for a decision. However, this decision does not need to come. This advantageously allows some ability for connectivity and access. The holding area can allow the Wi-Fi client device 16 to have Internet access only, but no access to any devices or local resources in the zone. The Internet access only can also include other settings, which are customizable, such as no Internet access, Internet access for certain types of devices, policy restrictions, etc. The policy restrictions can include bandwidth limits, URL limitations, content filtering, etc.

Again, the Wi-Fi network access process 500 includes remembering the Wi-Fi client devices 16 that connect thereto and the decisions made based thereon for applying consistent policy. A Wi-Fi client device 16 that had full access approved to a zone, is automatically allowed full access on subsequent reconnection based on an identifier (e.g., the MAC address). A Wi-Fi client device 16 that was rejected is allowed to join the Wi-Fi network with password, but is not allowed to transmit or receive any information (including Internet access). There may be a notification or message alerting the administrators that a denied device is seen again.

A Wi-Fi client device 16 that is left in the holding area goes into holding area when it returns. In an embodiment, push type notifications may be suppressed for devices that return—once ignored they stay ignored, but an app or dashboard might have a list of all devices that have been ignored and are in the holding area. This list can potentially age out devices over time so that only recently connecting devices are maintained on the list.

The administrator (network manager) can revoke or change status of Wi-Fi client devices 16 at any time. This functionality and other functionality associated with the Wi-Fi network access process 500 can be controlled from an app (e.g., mobile application) or a dashboard (e.g., via a Web browser, etc.). In general, the Wi-Fi network access process 500 can include a UI for interaction by the administrator. The UI can include a listing of all known devices and their current permission state, known devices has above information shown for devices (hostname, device type, MAC address), and other relevant information. The administrator can move any device to full access, no access, or potential back to the holding area (Internet only). It is also possible to display an association between devices and users in the UI.

Again, the zone in the following description can be any type of zone—the secure access zone, the employee access zone, and the guest access zone. In an embodiment, the guest access zone can be treated differently, such as requiring no password (open to all), or having the passcode displayed or handed out openly. It is possible to configure the guest zone so messages are limited, sent in bulk, or omitted completely for the guest zone. Of course, it is possible to display in a passive manner the devices in the UI. The guest zone includes restrictive permissions—perhaps Internet access only, as well as more restrictive settings relative to content protection, perhaps prevents streaming video to save bandwidth, etc.

FIG. 26 is a state diagram of the states in the Wi-Fi network access process 500. The states include an unknown state 521, a holding area 522, an allowed area 523, a rejected area 524, and an optional decision point 525. Unconnected Wi-Fi client devices 16 are all in the unknown state 521, i.e., they are not presently connected to the Wi-Fi network. A Wi-Fi client device 16 connects to a zone in the Wi-Fi network with the SSID and the password, if the holding area is configured for this zone (point 525), the Wi-Fi client device 16 is moved to the holding area 522. If the holding area is not configured or if the Wi-Fi client device 16 was previously allowed, the Wi-Fi client device 16 is moved to the allowed area 523. If the holding area is configured and the Wi-Fi client device 16 was previous rejected, the Wi-Fi client device 16 is moved to the rejected area 524. Note, the decision point 525 is configurable as well as optional.

§ 6.4 Software Defined Networking (SDN)

As described herein, SDN techniques can be used where each access point is configured as an SDN switch to gate traffic when devices have not been granted full access, and to gate different zones having different access levels.

§ 6.5 Pin Holing

Again, the present disclosure includes a concept of pin holing where a particular device in one zone is granted some access to another zone. With pin holing, users, via their Wi-Fi client device 16 can be granted access to particular devices or capabilities that are in a different zone than where the person "naturally" resides. For example, security cameras may be deployed on the secure zone, but employees on the employee zone may need to access these devices. Similarly, Point of Sale (PoS) devices may be deployed on the secure zone, but employees on the employee zone may need to access these devices. The present disclosure enables configuration so that the employee's Wi-Fi client device 16 remains on the employee zone, but it can be granted access to devices on the secure zone.

The administrator can perform pin holing configuration via the app, dashboard, UI, etc. For example, the devices to be access can be visualized (e.g., see FIG. 23B, 24A, etc.) and selected and assigned to Wi-Fi client devices 16 in other zones. The access rules utilize SDN and the new rules are plumbed down to allow the SDN network to allow these pin holed connections. A "Person" who is being granted special access is actually the person's device(s). UI of app or dashboard might automatically enable all devices. This concept is called a "group". It might include the devices associated with a given person. This allows efficient management as an entire group can be configured at a particular time. A group might also be a group of similar devices, or devices with the same desired properties such as all web cams in a group. This pin holing involves devices being granted access to each other that are on different SSID which is unique in Wi-Fi to allow connections across different SSIDs. This again is handled by the SDN switch that can move traffic from one SSID to another.

§ 6.6 Screenshots

Figure 27:
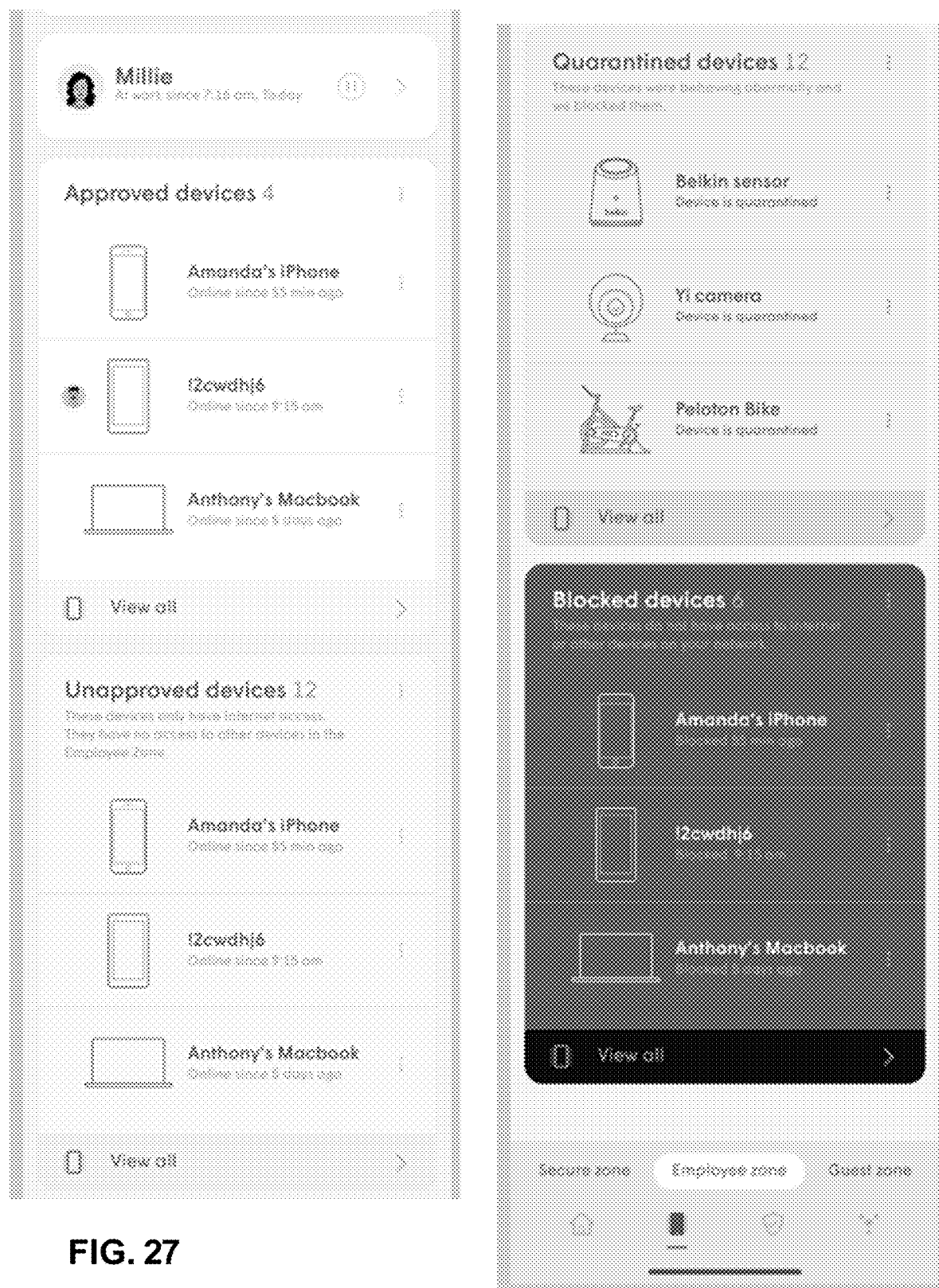
FIG. 27 is a screenshot of various devices in different areas of different zones based on the two-step, two-party Wi-Fi network access process of FIG. 25.

FIGS. 27-31 are various screenshots in an app, such as a mobile app, for performing various functions associated with the two-step, two-party Wi-Fi network access process 500, including pin holing. In an embodiment, the app is a mobile app configured to operate on a user device, i.e., the administrators of the Wi-Fi network. FIG. 27 is a screenshot of various devices in different areas of different zones based on the two-step, two-party Wi-Fi network access process 500. This screenshot can be scrollable with the left side being on top and the right side being on the bottom. The screenshot includes the three zones at the bottom right, with the employee zone shown for example. The first block includes approved devices ("allowed"). The second block includes unapproved devices ("holding area"). The third block includes quarantined devices which are devices that are isolated because of suspicious activity. The fourth block includes blocked devices.

Figures 28, 29:
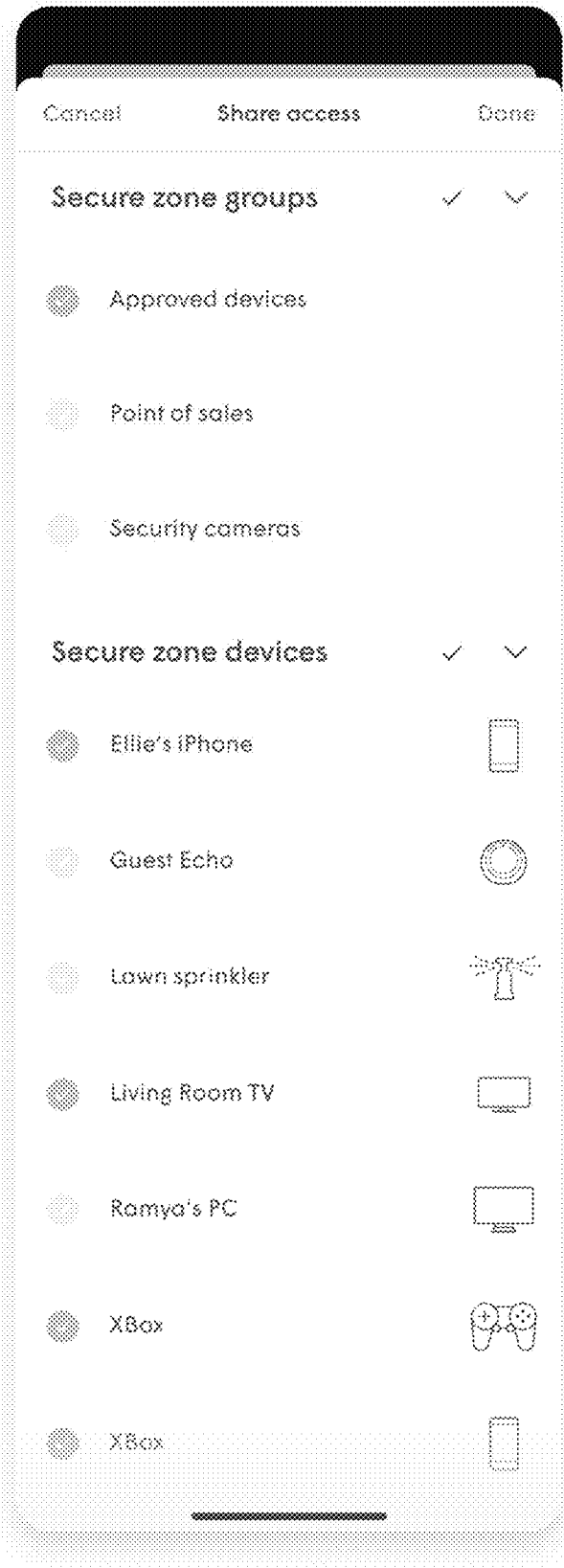
FIG. 28 is a screenshot of a menu in an app to share access of a device or group in the secure zone with the employee zone, for pin holing.
FIG. 29 is a screenshot for selecting a device or group to share in the secure zone, for pin holing.
Figure 30:
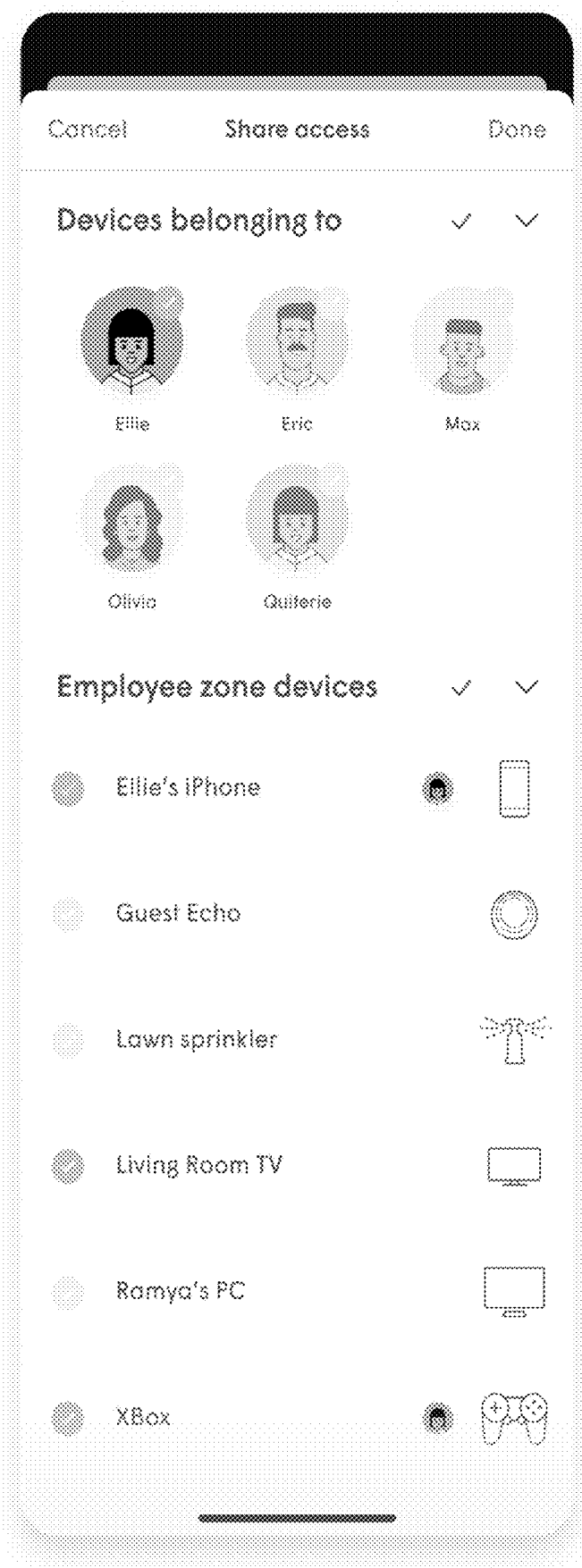
FIG. 30 is a screenshot for selecting a device or group to share in the employee zone, for pin holing.

FIG. 28 is a screenshot of a menu in an app to share access of a device or group in the secure zone with the employee zone, for pin holing. FIG. 28 is a menu in the app to share access of a device or group in secure zone with the employee zone. FIG. 29 is a screenshot for selecting a device or group to share in the secure zone, for pin holing. Here, a user selects the device or group that is to be shared from the secure zone. FIG. 30 is a screenshot for selecting a device or group to share in the employee zone, for pin holing. Here, the user selects the device or group in the employee zone that is to be shared from the screenshot in FIG. 29. A "group" is a group of devices the user sets up. Typically, this would be a person, but it could also be a group of like devices (e.g. all cameras).

Figure 31:
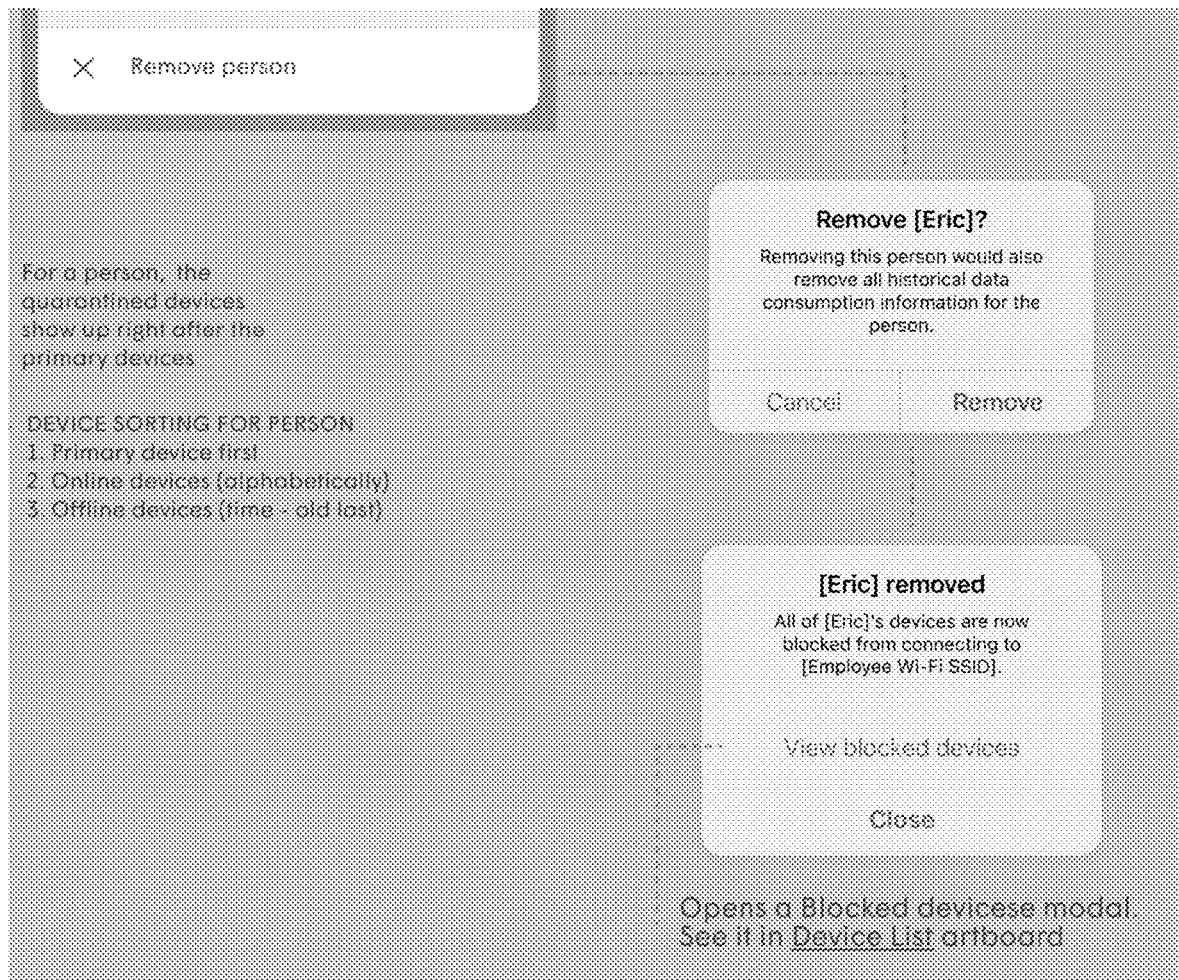
FIG. 31 are screenshots of showing steps for removing an employee.

FIG. 31 are screenshots of showing steps for removing an employee. Of course, when an employee is fired or quits, it is necessary to remove them. FIG. 31 shows how that happens. All their devices are moved to the blocked state when this happens.

§ 7.0 Multiple Party Control and Management

The present disclosure relates to a multiple tier management approach including the cloud service 40 for the Wi-Fi networks 10. One use case is shared Wi-Fi for multi-dwelling units (MDU), office space, retail space, mixed-use space, common areas, etc. For illustrative purposes, the present disclosure is described with reference to MDUs, but those skilled in the art will recognize it could be anywhere.

In an apartment, the Wi-Fi network 10 can include control/configuration/customization by the end user as well as the apartment manager, landlord, or service provider. In fact, the apartment manager/landlord can have multiple apartments, each with a different Wi-Fi network 10.

In general, the following are the "customizable" features that are set up unique to each apartment:

Parental controls
Health monitoring
Digital wellness (app time)
App time observation and display
Motion detection and the display of historical motion
Thresholds/sensitivity associated with motion detection
Notification configurations associated with motion detection SSID, password Guest passwords Zone permissions (what guest devices can see and do) work VPN etc.

LTE settings—if there is LTE backup, you have settings regarding the failover of that AP. This can be present or not, and configured, on an apartment-to-apartment basis.

In an embodiment, the present disclosure includes a three-tier management approach including an end user, property manager, and service provider. The end user can be a resident in the MDU. The end user has control over their private Wi-Fi network 10, including an ability to set the SSID and passwords. In an embodiment, the end user control is via a mobile app or the like and this control only affects any access points in their own apartment.

The property manager has ability to turn on/off service, perform move in move out functions, and the like. The property manager control can be via a dedicated dashboard, such as one that is shared with service provider, but login credentials determine what the property manager can see and control in the dashboard. With respect to scheduled move in and move out, the property manager can schedule ahead of time that someone is moving out, and someone else is moving in. Actions included in the move in move out process include changing the SSID and password for the private network, establishing a user specific password and/or username for the community network, blacklisting the devices of the previous tenant from joining the community or guest networks in the case that the password is common among all users. The property manager can notify the new tenant ahead of time, before they have moved in. The switch is then scheduled that exactly on the day of move in the new tenant's access becomes active. The discontinuation of the previous tenants access can be scheduled independently, before, after, or on the day of the new tenant moving in.

The property manager dashboard

Can show things about individual tenants, including uplink (UL) and downlink (DL) speed, online or offline, active or inactive, list of APs associated with each apartment Can also show aggregated stats across the entire property such as histograms of average speeds, counts and lists of homes with QoE alarms Can show multiple MDUs that might be geographically dispersed Includes move in/move out controls, enables the addition/definition of new apartments or common areas Can show things about the networks in public areas (community networks)

Includes a page that can track the inventory of APs—which ones have been assigned to which tenants, which are still in stock, which have problems, etc.

Includes a page where users can be configured to have access to the property manager dashboard with different levels of permissions The dashboard makes use of tags which indicate for example a location in the building(s) that a particular AP is connected to.

The service provider has ability to control what they normally control (virtually everything. Even in the case of individual APs per apartment, and the end user being able to configure aspects of their "private" AP, the service provider and/or the property manager can have the ability to apply configuration and policies to all the APs in an apartment complex from a dashboard. Also, configurations and controls may extend across multiple apartment complexes, perhaps all operated by the same management company, that may be geographically co-located or geographically dispersed etc.

Extending end consumer configurations, and potentially other configurations, requires providing APs with instructions for operating with specific client devices. MAC addresses are traditionally used to identify individual clients, but with MAC randomization becoming common, MAC address stitching will be a necessary co-capability in order to get this vision of consumer customization working across multiple APs and virtual networks. MAC address stitching means tying two different MAC addresses together to identify a same device, where each MAC addresses is randomized to prevent such identification. Examples of MAC address stitching are described in U.S. patent application Ser. No. 17/731,397, filed Apr. 28, 2022, and entitled "Identifying Wi-Fi devices based on user behavior," the contents of which are incorporated by reference in their entirety.

§ 7.1 Independent Virtual Networks

Figure 32:
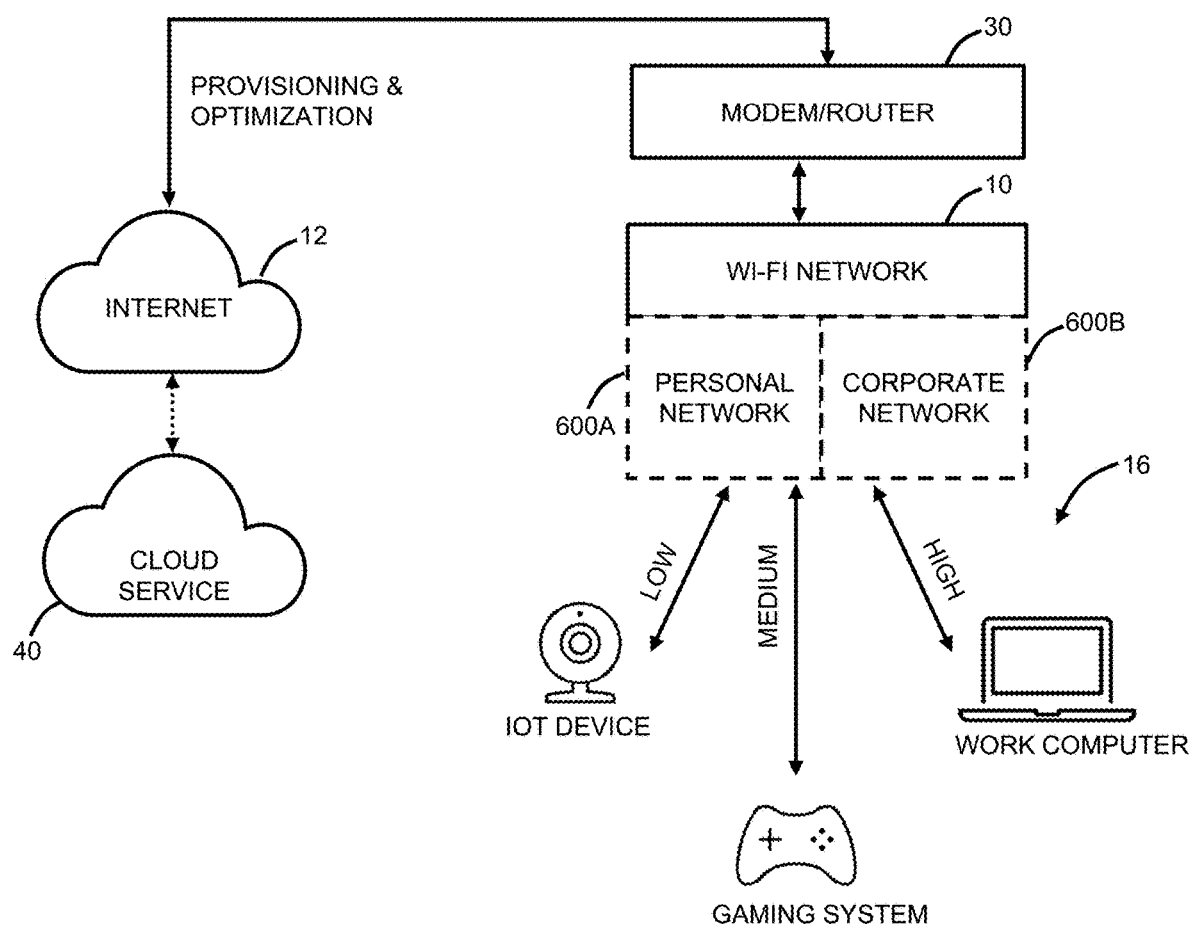
FIG. 32 is a network diagram of a Wi-Fi network that has virtual networks configured therein.

FIG. 32 is a network diagram of a Wi-Fi network 10 that has virtual networks 600A, 600B configured therein. The Wi-Fi network 10 can be any of the Wi-Fi networks 10A-10D as well as any different configurations, and the Wi-Fi network 10 can include the access point 14, the mesh node 18, the repeater 20, the Wi-Fi device 22, and combinations thereof, which are referred to herein collectively as Wi-Fi nodes or simply nodes in the Wi-Fi network 10. The virtual networks 600A, 600B are configured on the Wi-Fi nodes, as opposed to a user device 16. That is, a specific user device 16 can concurrently send traffic to any of the virtual networks 600A, 600B. For example, a user can send work traffic via the virtual network 600B and personal, non-work traffic via the virtual network 600A, concurrently.

Note, for illustration purposes, the present disclosure describes two example virtual networks 600A, 600B, such as a personal network and a corporate network. Those skilled in the art will recognize there can be more virtual networks 500 as well as different virtual networks 600. The virtual networks 600 can be user and/or IT configurable. In an embodiment, there can be different quality of experience (QoE) and/or quality of service (QoS) configurations for the different virtual networks 600A, 600B. For example, for work at home, it is desirable to provide a high QoE for corporate traffic, e.g., video conferencing and the like. Also, it would be desirable to provide lower QoE for personal traffic, e.g., gaming, IoT, streaming media, etc. In the example of FIG. 32, an IoT device is given low priority, a gaming system is given medium priority, and the work computer is given high priority. Of course, there can be various, configurable priority levels.

The prioritization can be on an application level, e.g., prioritize by application across both private and corporate network. It is also possible to prioritize the same application (e.g., Zoom) differently if two sessions are running one on personal network and one on the corporate network. The prioritization can be done on both in-home network and access network. Capacity reservations can be made on both the personal and corporate network, considering applications and traffic on both. The reservations could be static or dynamic.

The objective of the present disclosure is to provide a single networking system, i.e., the Wi-Fi network 10, to support both a private/home network and a corporate work network as two virtual networks 600A, 600B. In addition, the cloud service 40 is available for configuration, monitoring, etc. Additionally, there can be a third virtual network 600 for common areas in the MDU.

The following describes an example embodiment of the networking configuration in the Wi-Fi hardware to support two virtual networks 600A, 600B, on the same physical network. The virtual network 600A and the virtual network 600B, in this embodiment, are separated and devices on one network cannot communicate with devices on the other. In this embodiment, the virtual network 600A is configured on the Wi-Fi hardware in a router mode, and the corporate virtual network 600B is configured as a separate virtual local area network (VLAN). In other embodiments, multiple virtual networks can be configured each as a VLAN.

Figure 33:
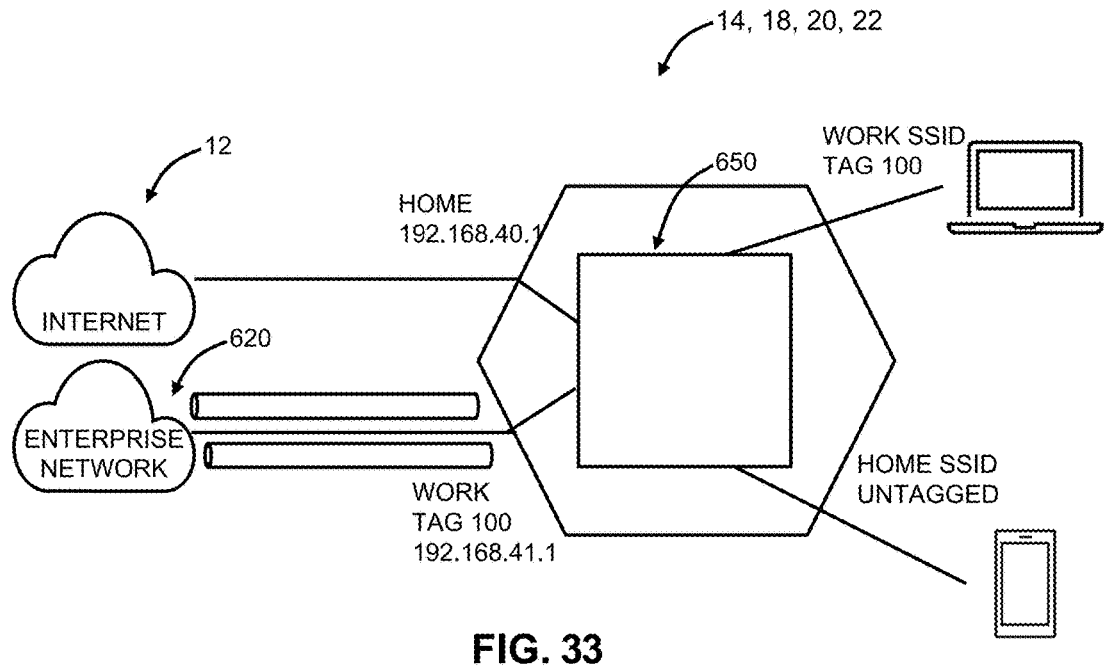
FIG. 33 is a network diagram of a Wi-Fi access point for implementing multiple virtual networks.

FIG. 33 is a network diagram of a Wi-Fi access point 14, 18, 20, 22 for implementing multiple virtual networks. The Wi-Fi hardware, i.e., access point including any of the devices 14, 18, 20, 22 described herein, includes an Open vSwitch 650 which can separate the virtual networks 600 via VLAN tags, or via some of the virtual networks 600 being untagged.

This approach includes a network combining 2 virtual networks (Work and Home) residing on the same physical network. Networks will be separated between each other and devices will not be able to communicate between each other. In an embodiment, the Home network is performed with the Wi-Fi access point in a router mode and a VLAN separated Work Network, e.g., with a VLAN example tag of 100. The Open vSwitch 650 includes a TAP interface tagged with VLAN 100. Those skilled in the art will recognize multiple virtual networks can be supported with different VLAN tags and configuration in the Open vSwitch 650.

In an embodiment, a multi-location system can support multiple independent virtual networks, on the same physical network. There can be three (virtual) networks: a private network for each resident, a community network for residents to roam throughout apartment complex/public areas, and a maintenance network for people who work for the apartment complex or equipment that is owned by the apartment complex. There might also be a guest network for each resident, and/or a public network. These are all on the same Wi-Fi network 10 hardware. For example, each resident can have a Wi-Fi network 10 that includes their private network, but which also supports the community network, the maintenance network, and the like. That is, only the resident can access the private network, but any resident that is roaming may be able to access the community network whereas property management and maintenance may be able to access the maintenance network. Also, IoT devices such as security cameras can access the maintenance network.

Multiple virtual networks all have features configurable by the user via an app, including security, Device freeze, policies, reporting of usage data, app time, content protection, screening for inappropriate content, and the like. In an embodiment, the policies such as parental controls, security restrictions, etc. go with any device 16 as it roams from for example private to community network, or from one private network to another. This can be accomplished by "preloading" the policies for each device 16 between the virtual networks in the cloud service 40. Individual devices 16 can be identified via MAC address, including some process to address MAC randomization (MAC stitching).

VLANs are one method to provide multiple independent virtual networks. Specifically relating to the private network in a given apartment, this can be extended to all APs in the apartment complex by extending a VLAN that represents the specific apartment to all APs in the complex. This extension could be done in a static way (every AP always has a VLAN for every apartment in the complex, causing each AP to have a large number of VLANs configured at all times), or it could be done dynamically.

§ 7.2 App

In general, a single app, such as a mobile app, desktop app, etc., supports the virtual networks 600. In an embodiment, the single app is a mobile app and it is used to set up any of the virtual networks 600, even if a virtual network 600 is automatically pre-configured from the cloud service 40. In the mobile app, the user can see which devices 16 are on the personal virtual network 600, connection status, etc. The mobile app can also include privacy control—people may fear they are being spied on by corporate IT. The mobile app includes capability for the employee to approve or deny the corporation requesting to observe things that are going on in the community network, maintenance network, etc.

In an embodiment, the mobile app is HomePass, available from the Applicant, Plume Design, Inc., and FIGS. 8-24 are example screenshots of a mobile app. Example features of the mobile app include, without limitation:
  Wi-Fi hardware is discovered over Bluetooth so the system is up and running in minutes
  Intuitive self-install feature, which eliminates the need for technician costs and scheduling
  Advanced, automatic identification of devices in the home, complete with icons and names.
  View how the network is connecting with a visual topology representation of all access points and connected devices
  Creates flawless connectivity across device types, rooms, and complex environments using AI-based optimization
  Provides complex network visibility with unique device fingerprinting and speed tests
  The cloud-coordinated system harmonizes legacy deployments via OpenSync-compatible hardware
  Privacy Manager to temporarily freeze visibility
  Parental control tools to set healthy boundaries for access and usage
  Guest Manager for access permissions and passwords
  Content Manager to filter and block unwanted websites and ads for parents and more
  Digital Wellbeing monitors screen time with scheduled freezes and pauses
  Online protection from malicious content—Learn more about protecting homes in the connected age
  Real-time threat database
  IoT anomaly detection and device quarantine
  Intrusion detection and outside threat blocking
  Motion detection via radio waves to let subscriber-owned devices become sensors to detect expected and unexpected movement
  No need to remember to enable the system, the system turns on and off automatically through GPS of primary devices
  See movement patterns over the course of time within the mobile app

§ 7.3 MDU Optimization

Figure 34:
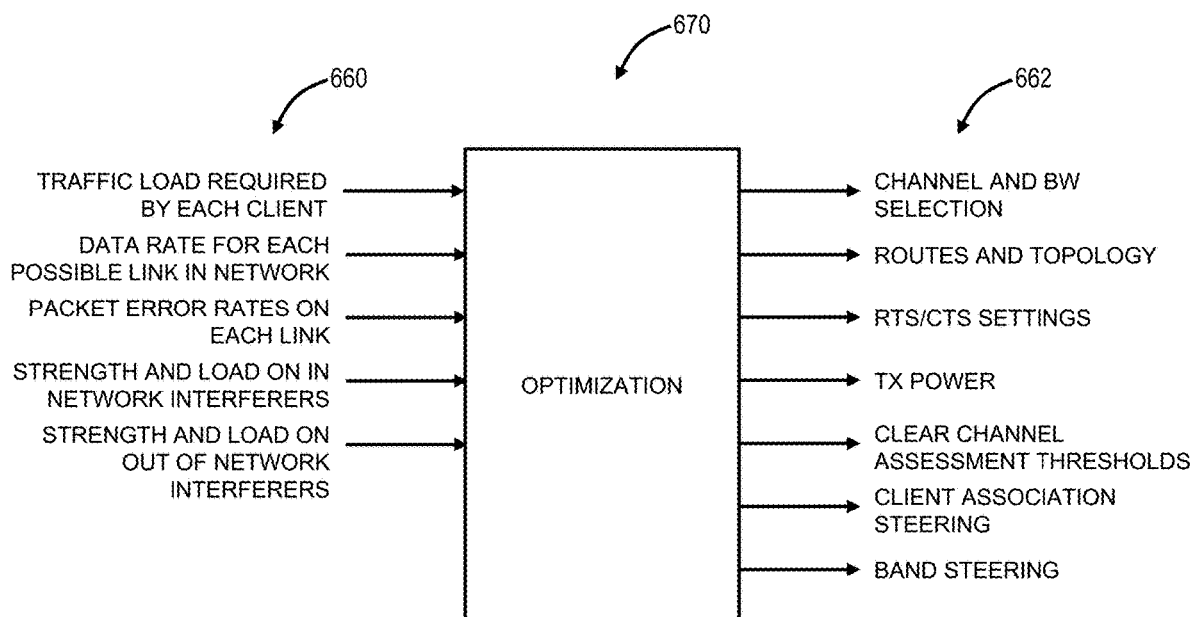
FIG. 34 is a block diagram of an optimization that can be performed by the cloud service for configuring the Wi-Fi networks.

FIG. 34 is a block diagram of an optimization 670 that can be performed by the cloud service 40 for configuring the Wi-Fi networks 10. Inputs 660 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs 660 are based on measurements and data gathered by the plurality of access points 14 and communicated to the cloud service 40 which can be configured to implement the optimization 670. Outputs 662 of the optimization 670 include, for example, channel and bandwidth (BW) selection, routes and topology, Request to Send/Clear to Send (RTS/CTS) settings, Transmitter (TX) power, clear channel assessment thresholds, client association steering, and band steering.

Figure 35:
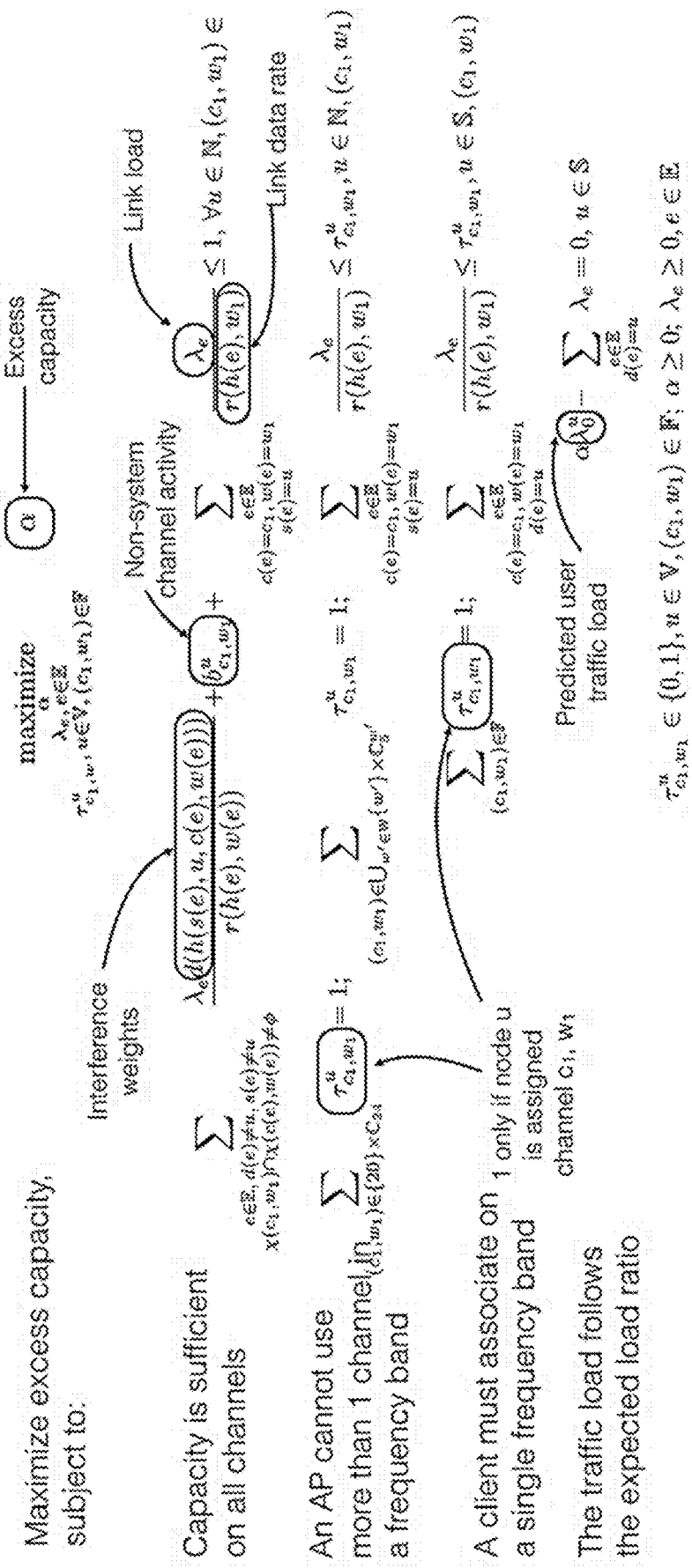
FIG. 35 is a diagram of equations for an example Mixed Integer Linear Program (MILP) for the optimization.

FIG. 35 is a diagram of equations for an example Mixed Integer Linear Program (MILP) for the optimization 670. With the inputs 60, and objective function known, it becomes a mathematical problem to find the set of outputs 62 that will maximize the objective function. A very efficient way of doing this is to formulate the problem as a Mixed Integer Linear Program (MILP). There are several advantages to this formulation. First, it fits the nature of the problem as there are both continuous and discrete variables involved. For example, channel selection is an integer variable. Second, efficient methods for solving MILP problems are well known. Third, the formulation is fairly generic, accommodating a wide variety of objective functions and constraints on the solution. FIG. 35 shows a mathematical representation of an example MILP formulation, with annotations describing the various elements of the equations.

Ideally, this optimization would be done across not a single home, but all homes that are within Wi-Fi range of each other, and therefore generate interference to each other, including the MDU. Of course, the homes that interfere with the first home have themselves interferers that are even farther away. Proceeding in this way could result in attempting to optimize a very large number of homes all in a single optimization, for example, all homes in Manhattan. The computation time for MILP solutions goes up exponentially with the number parameters being optimized, so it goes up exponentially with the number of homes across which a single optimization is run. A solution to this is to do clustering.

Figure 36:
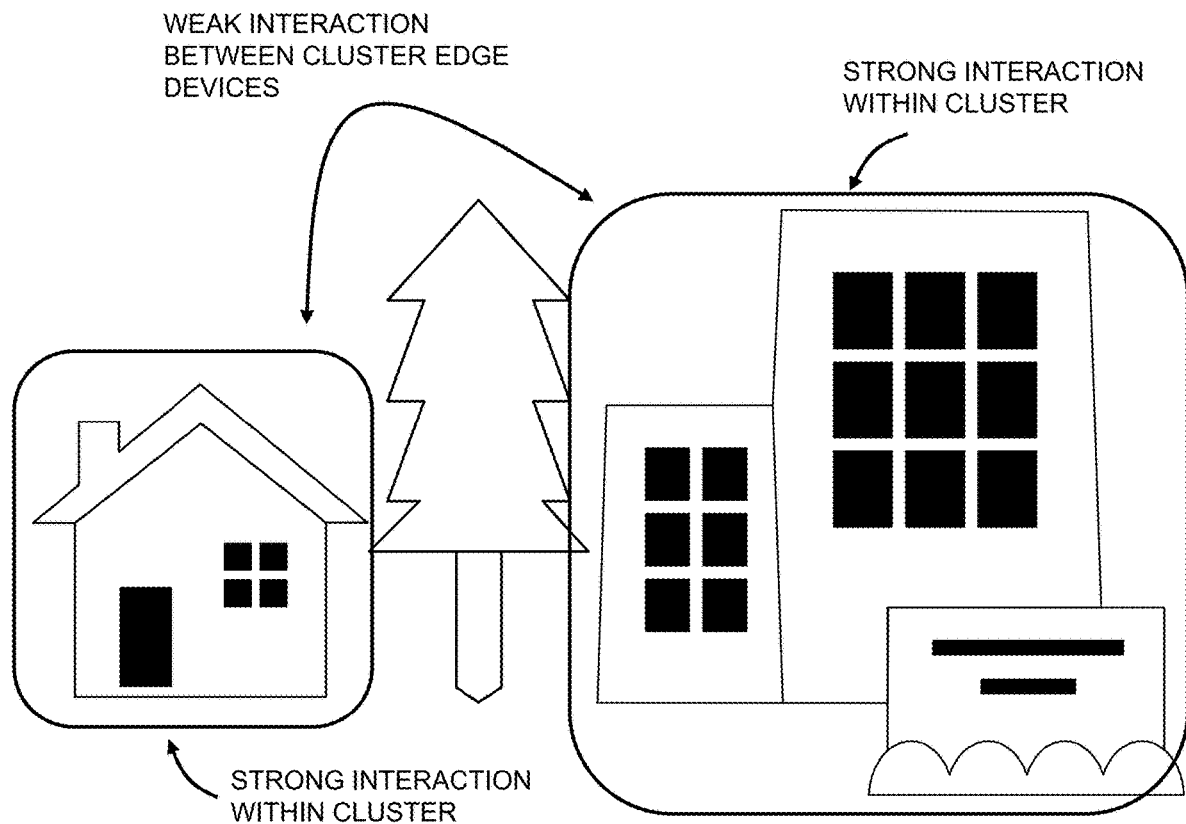
FIG. 36 is a diagram of an example of clustering to reduce the number of Wi-Fi networks being jointly optimized, thereby making the computational complexity manageable.

FIG. 36 is a diagram of an example of clustering to reduce the number of Wi-Fi network 10 being jointly optimized, thereby making the computational complexity manageable. If the separate clusters still have a high level of overlap at their boundaries, an iterative approach could be applied. In a first pass, it could be assumed there would be no interference between clusters. In a second pass, the interference from the second cluster to the first cluster could be calculated, and then the best configuration for the first cluster re-calculated with that information. The second cluster could then be re-optimized, accounting for the new interference from the first cluster. Because iterations increase the computation load linearly, while cluster size increases computation exponentially, several iterations would still be far less computation than solving the entire problem jointly.

There can be complexities within the optimization 670. Several optimization parameters will alter the inputs to the optimization 670 itself. For example, changing the band or channel may change the transmit power that the access points 14 put out, thereby changing the interference they present to other access points 14. Similarly, different data rates are often transmitted with different power levels, so as Wi-Fi client device 16 or access point 14 associations are changed, interference effects must be re-calculated as well.

There are also specific Wi-Fi client device 16 behaviors to be considered. For example, some Wi-Fi client devices 16 dynamically switch on a packet-by-packet basis between different bandwidths of transmission (20, 40, 80 MHz, etc.). Other Wi-Fi client devices 16 are much less flexible, and if asked to use 40 MHz channels will only send 40 MHz packets. The first group of Wi-Fi client devices 16 almost always benefit from the allocation of a 40 MHz bandwidth channel, as they will use it when they can, but will also transmit in a lower bandwidth mode if there is interference on a part of the 40 MHz channel. Wi-Fi client devices 16 in the latter category can only benefit from a 40 MHz channel if that channel has very little interference anywhere on it. The differences between Wi-Fi client device 16 behaviors is something that can be learned over time from the network measurements that are being reported to the cloud service.

The present disclosure contemplates the cloud service 40 or the like performing optimization of multiple Wi-Fi networks 10 together in the MDU or the like. The optimization of frequency, multi-AP connections (mesh), etc. can be performed by considering the entire apartment complex as a single unit. This includes considering adjacent Wi-Fi networks when optimizing a given Wi-Fi network. Auto-discovery of clusters to be jointly optimized, or can be based on groups created by the property managers.

§ 7.4 AP Hardware

AP hardware can be distributed in the MDU in various different approaches. This can include:
- AP in every apartment, no common area APs so depends on roaming between apartments, that is the APs in the apartments provide the common network, etc.
- AP per apartment plus common area APs to handle public areas
- AP's only in public areas with a given AP serving multiple apartments and "masquerading" as an AP per unit
- APs spread among multiple apartment complexes, but managed together (single management company). This includes setting of SSIDs and passwords for community network, but also configurations of behaviors (content controls, whitelists, blacklists, etc.)
- APs do not need to be on the same subnet: In order to get a system to work across APs that are not connected to the same core network or switch, and still support both local personalization and community wide networks, we would need to use a Generic Routing Encapsulation (GRE) tunnel in which each apartment would send its data to a GRE concentrator and this would allow the establishment of movement of traffic securely between the disparate apartments that do not share a networking switch.
- No need for centralized management switch that all APs connect to, as would be done by our competitors. Rather, each AP can have it's own internet access directly to the cloud service 40 (as in unmanaged apartment complexes), and the centralized management can come from forming groups (they can be arbitrary) in the cloud service 40.

§ 7.5 Portability of Account

If a tenant moves from one unit to another, their private configuration can go with them even if the physical AP does not (this is made possible by the cloud service 40). This can be true if the tenant is moving from a private home with management by the cloud service 40 to a managed apartment, or vice versa. This is because the user sets the SSID and password, while the cloud service 40 controls other things that a typical user would not configure.

Take it with you: This property can be enhanced with a business process as follows: When a user indicates they are going to be moving out of an apartment complex with the cloud service 40 management, the cloud service 40 or the service provider can email them an advertisement to sign up for the cloud service 40 as an individual subscriber. The cloud service 40 can then send them a set of APs with their account already configured just the way they had it at the apartment, so that when they move into their new place, the network is ready to go, works the same and has all the same features as where they were before.

Bring it with you: Similarly, if the consumer already has the cloud service 40, and moves into an apartment complex that uses the cloud service 40, the cloud service 40 can unify or exchange information between their old and new account, and they will have the same private network settings and capabilities as they did before. However, as part of the apartment complex, their Wi-Fi can be partially managed by the property manager (and the service provider as always).

§ 7.6 Network Operations Center Dashboard

In addition to the mobile app, there is a network operations center (NOC) dashboard, an example of which is described in U.S. patent application Ser. No. 16/897,371, filed Jun. 10, 2020, and entitled "Network operation center dashboard for cloud-based Wi-Fi systems," the contents of which are incorporated by reference in their entirety. The NOC dashboard can be available via the cloud service 40 and can be used by a service provider (e.g., cable provider, Internet provider) as well as by corporate IT. There can be segmentation in the NOC dashboard, e.g., a service provider can see all users in its network whereas corporate IT can only see its employees. In this sense, the NOC dashboard via the cloud service 40 can be multi-tenant.

In an embodiment, there can be multiple NOC dashboards—one for service providers for visibility of all networks of its users, including both the personal virtual network 600. Visibility in the NOC dashboard can be based on login credentials to determine what will be seen when in the dashboard. This may be only the corporate network, the private network, or both. This one dashboard may be accessed by the corporation, or it may be accessed by the service provider, and based on their log in credentials you can see (or not see) types of information. In an embodiment, there is a single NOC dashboard for a given corporation that anyone can log into and get visibility/control based on the role associated with their login credentials. In another embodiment, there is a NOC dashboard for the service provider that is used to view only the personal virtual network 600 of the Wi-Fi network 10. Also, the property manager can use the NOC dashboard for viewing Wi-Fi networks 10 under its control.

Figure 37:
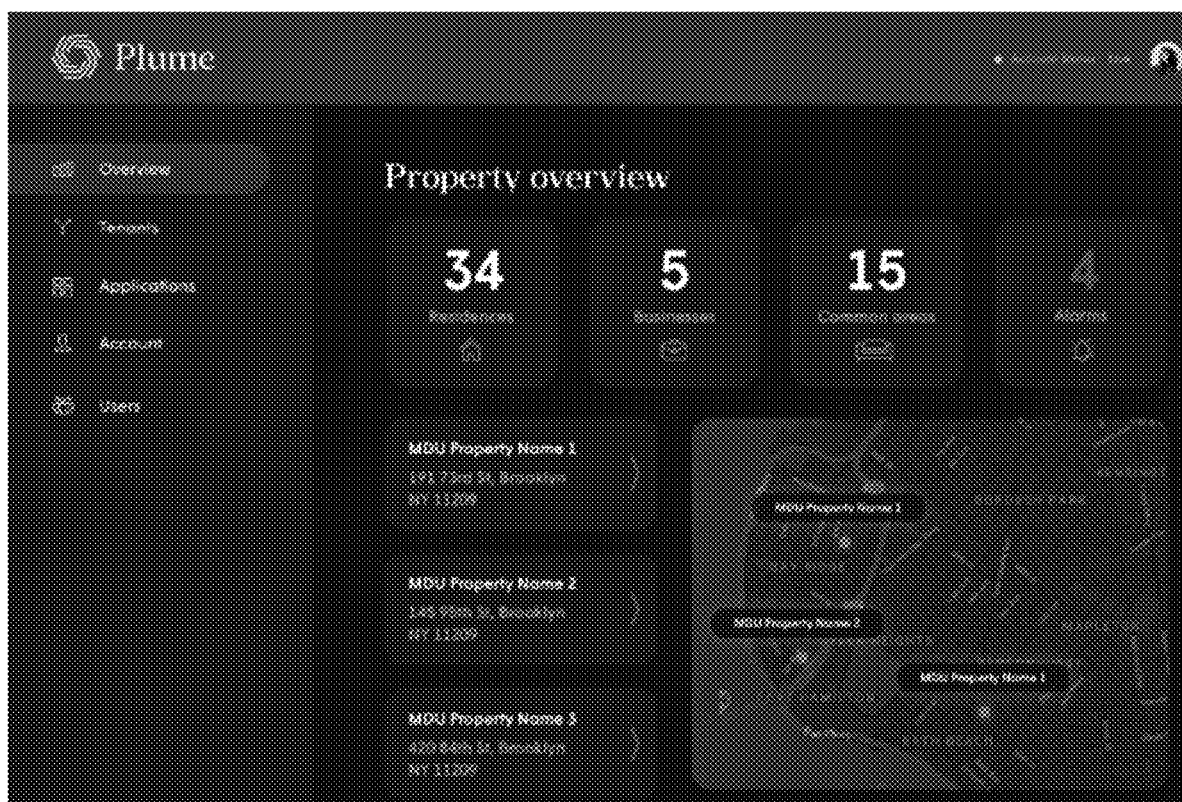
FIG. 37 is an example screenshot of a NOC dashboard for property management.

FIG. 37 is an example screenshot of a NOC dashboard for property management. This can include a panorama style (aggregated data) dashboard. network 10 to the user or the software to update an existing Wi-Fi system 10.

For the service provider, unlike traditional SD-WAN that is a relationship between the corporation and the employee, in which the service provider is just a generic pipe that is not involved or aware, the service provider can be involved in the following ways:

Can allocate/reserve broadband bandwidth for the corporate traffic

Can fix a route for the corporate network that is optimal

Offer low latency and high BW service for the corporate traffic above and beyond what the employee or private network would get based on their subscription.

Effectively the service provider can bundle private line service together with the Flex SD-WAN like service if they want to

§ 8.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   communicating to a plurality of access points associated with a plurality of Wi-Fi networks, wherein the plurality of access points are deployed in a location;
   providing end user management access to a plurality of end users each associated with one of the plurality of Wi-Fi networks;
   providing property manager management access to a property manager associated with the location and with any additional locations; and
   providing service provider management access to a service provider associated with the location, the service provider management access providing the service provider functionality to apply configurations and policies to the plurality of access points at the location.

2. The method of claim 1, wherein each of the plurality of end users performs the end user management access via an app to configure, on a respective Wi-Fi network, any of parental controls, health monitoring, app time, motion detection and associated notifications, service set identifier (SSID) and password, guest passwords, and zone permissions.

3. The method of claim 1, wherein each of the property manager and the service provider are configured to access a dashboard with associated login credentials users to determine visibility and control.

4. The method of claim 1, wherein the property manager management access includes scheduling move in and move out for any of the plurality of end users, wherein the move in and move out includes any of changing service set identifier (SSID) and password, establishing user specific credentials for a community network, blacklisting devices of a previous tenant, and notifying a new tenant.

5. The method of claim 1, wherein each of the plurality of Wi-Fi networks include a plurality of virtual networks including at least a private network and a community network.

6. The method of claim 5, wherein a user device at the location is configured to access the private network associated with a user and on the community network of other users.

7. The method of claim 5, wherein the plurality of virtual networks include a maintenance network for the location, wherein Internet of Things devices associated with the location are configured to access the maintenance network.

8. The method of claim 1, wherein the location is multi-dwelling unit (MDU), and wherein the plurality of Wi-Fi networks include a plurality of access points distributed in the MDU.

9. The method of claim 8, wherein the plurality of access points are any of each only in an apartment in the MDU, each only in common areas of the MDU, each in a plurality of apartments in the MDU and in the common areas, and each only in a subset of the plurality of apartments.

10. The method of claim 8, wherein the plurality of access points are configured in a distributed Wi-Fi network with some of the plurality of access points having wired links and some having wireless backhaul links.

11. The method of claim 8, wherein the plurality of access points are connected to a cloud service via the Internet.

12. The method of claim 8, wherein the plurality of access points are on different subnets and connect to a tunnel concentrator in the location.

13. The method of claim 1, further comprising the steps of:
   performing an optimization to configure the plurality of Wi-Fi networking including considering adjacent Wi-Fi networks when optimizing a given Wi-Fi network.

14. The method of claim 1, further comprising the steps of:
   allowing a user to move an associated account with the cloud service with the user.

15. A non-transitory computer-readable storage medium having computer readable code stored thereon for programming a device to perform steps of:
   communicating to a plurality of access points in a plurality of Wi-Fi networks, wherein the plurality of access points are deployed in a location;
   providing end user management access to a plurality of end users each associated with one of the plurality of Wi-Fi networks;
   providing property manager management access to a property manager associated with the location and with any additional locations; and
   providing service provider management access to a service provider associated with the location, the service provider management access providing the service provider functionality to apply configurations and policies to the plurality of access points at the location.

16. The non-transitory computer-readable storage medium of claim 15,
   wherein the steps further include:
   performing an optimization to configure the plurality of Wi-Fi networking including considering adjacent Wi-Fi networks when optimizing a given Wi-Fi network.

17. A distributed Wi-Fi network in a multi-dwelling unit (MDU), the distributed Wi-Fi network comprising:
   a plurality of access points providing a plurality of Wi-Fi networks collectively forming the distributed Wi-Fi network that includes a plurality of virtual networks on the plurality of access points,
   wherein the plurality of virtual networks include a private network for each tenant and a community network for a plurality of tenants; and
   a cloud service for:
      communicating to a plurality of access points;
      providing end user management access to the plurality of tenants;
      providing property manager management access to a property manager associated with the MDU and with any additional locations; and
      providing service provider management access to a service provider associated with the MDU, the service provider management access providing the service provider functionality to apply configurations and policies to the plurality of access points at the location.

18. The distributed Wi-Fi network of claim 17, wherein each of the plurality of end users performs the end user management access via an app to configure, on a respective Wi-Fi network, any of parental controls, health monitoring, app time, motion detection and associated notifications, service set identifier (SSID) and password, guest passwords, and zone permissions.

19. The distributed Wi-Fi network of claim 17, wherein each of the property manager and the service provider include functionality for accessing a dashboard with associated login credentials users to determine visibility and control.

20. The distributed Wi-Fi network of claim 17, wherein the property manager management access includes scheduling move in and move out for any of the plurality of end users, wherein the move in and move out includes any of changing service set identifier (SSID) and password, establishing user specific credentials for a community network, blacklisting devices of a previous tenant, and notifying a new tenant.

* * * * *